United States Patent [19]

Onishi et al.

[11] Patent Number: 5,750,213

[45] Date of Patent: May 12, 1998

[54] POLYMERIZABLE COMPOUND AND LIQUID CRYSTAL DISPLAY DEVICE USING THE SAME

[75] Inventors: Noriaki Onishi, Nara; Nobuaki Yamada, Higashiosaka; Masahiko Yoshida, Soka; Hoyo Mizobe, Soka; Kenji Suzuki, Soka, all of Japan

[73] Assignees: Sharp Kabushiki Kaisha, Osaka; Kanto Kagaku Kabushiki Kaisha, Tokyo, both of Japan

[21] Appl. No.: 806,100

[22] Filed: Feb. 25, 1997

[30] Foreign Application Priority Data

Feb. 26, 1996 [JP] Japan .................. 8-038517

[51] Int. Cl.$^6$ .................. C09K 19/30
[52] U.S. Cl. .................. 428/1; 252/299.01; 252/299.63; 560/221; 526/245; 526/246
[58] Field of Search .................. 428/1; 252/299.01, 252/299.63; 560/221; 526/245, 246

[56] References Cited

U.S. PATENT DOCUMENTS

| | | |
|---|---|---|
| 4,762,912 | 8/1988 | Leslie et al. . |
| 5,087,672 | 2/1992 | Babirad et al. . |
| 5,198,149 | 3/1993 | Reiffenrath et al. .............. 252/299.61 |
| 5,333,074 | 7/1994 | Hikmet . |
| 5,380,462 | 1/1995 | Kelly et al. .............. 252/299.63 |
| 5,473,450 | 12/1995 | Yamada et al. . |
| 5,558,813 | 9/1996 | Akashi et al. . |
| 5,599,480 | 2/1997 | Tarumi et al. .............. 252/299.63 |

FOREIGN PATENT DOCUMENTS

| | | |
|---|---|---|
| 58-501631 | 9/1983 | Japan . |
| 61-502128 | 9/1985 | Japan . |
| 1-269 922 A | 10/1989 | Japan . |
| 4-212 928 A | 8/1992 | Japan . |
| 4-338 923 A | 11/1992 | Japan . |
| 5-27 242 A | 2/1993 | Japan . |
| 5-257 135 | 10/1993 | Japan . |
| 6-265 902 A | 9/1994 | Japan . |
| 6-301 015 | 10/1994 | Japan . |
| 6-324 337 | 11/1994 | Japan . |
| WO 83/01016 | 3/1983 | WIPO . |
| WO 85/04262 | 9/1985 | WIPO . |

*Primary Examiner*—Mark Nagumo
*Attorney, Agent, or Firm*—David G. Conlin; Cara Z. Lowen

[57] ABSTRACT

A polymerizable compound represented by Formula (I):

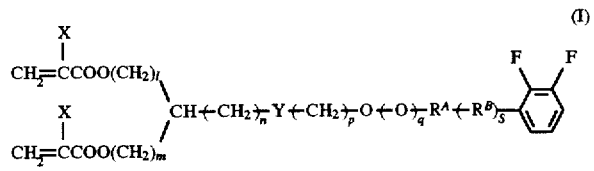

where X is a hydrogen atom or a methyl group; l and m are independently an integer of 0 to 14; Y is a single bond, —COO—, —OCO—, or —O—; n and p are independently an integer of 0 to 18; q and s are independently an integer of 0 or 1; and $R^A$ and $R^B$ are independently represented by Formula (II) or (III):

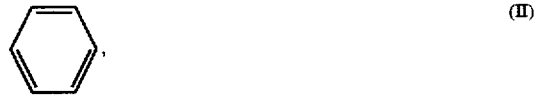

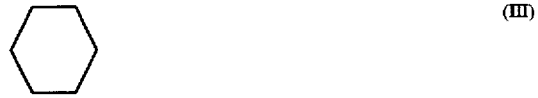

provided that, when q=1, p≧2; and when $R^A$ is represented by the Formula (II), $R^B$ is represented by the Formula (II).

8 Claims, 28 Drawing Sheets

Synthesis route 1

FIG. 2
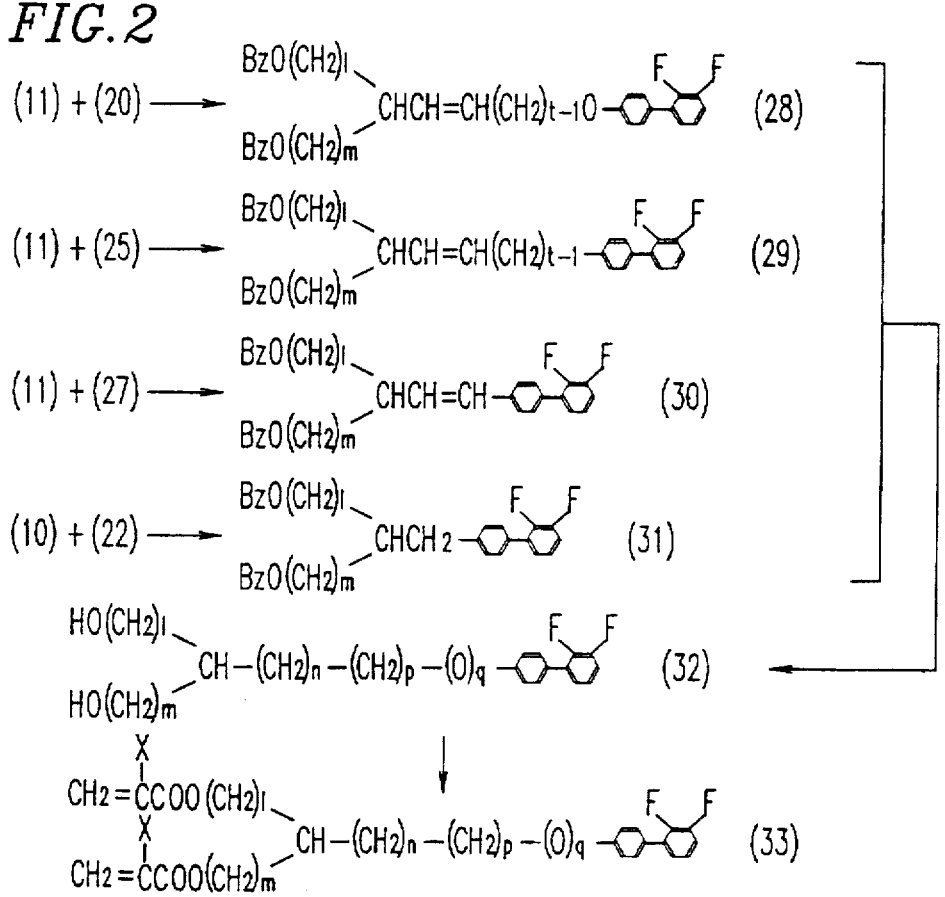
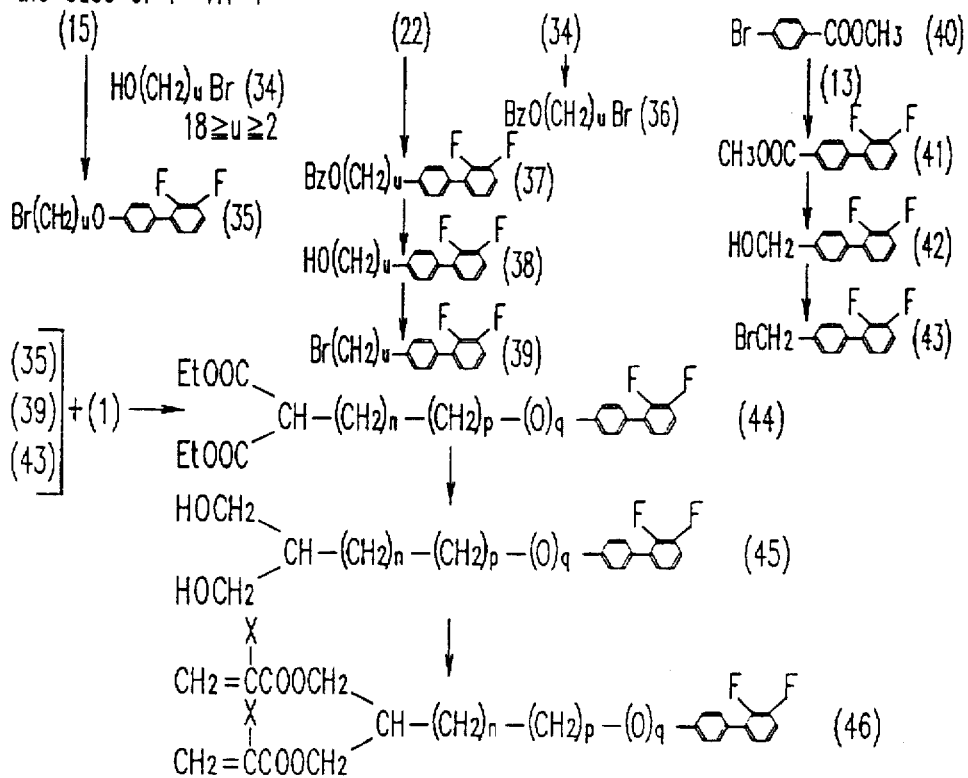

FIG. 3
Synthesis route 2  In the case of Y= Single bond, $R^A$=●◯, s=0
l, m≠1   (12)
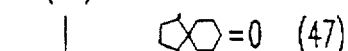
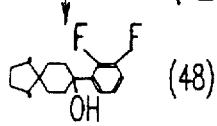
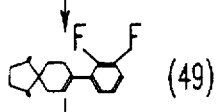
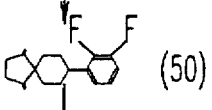
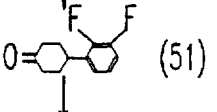
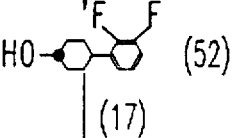
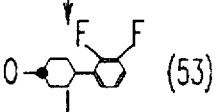
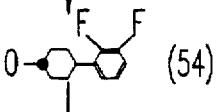
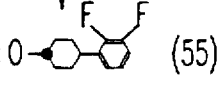
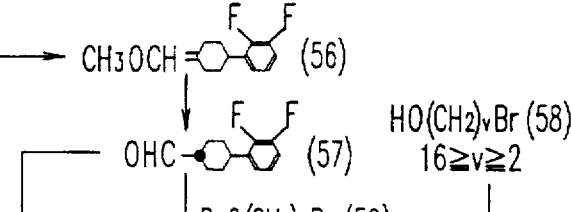
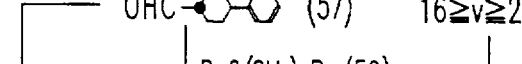
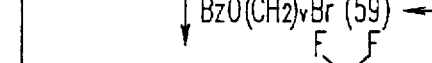
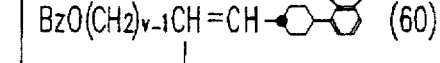
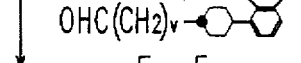
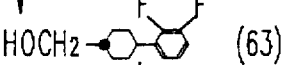
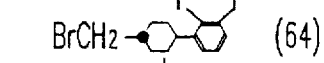
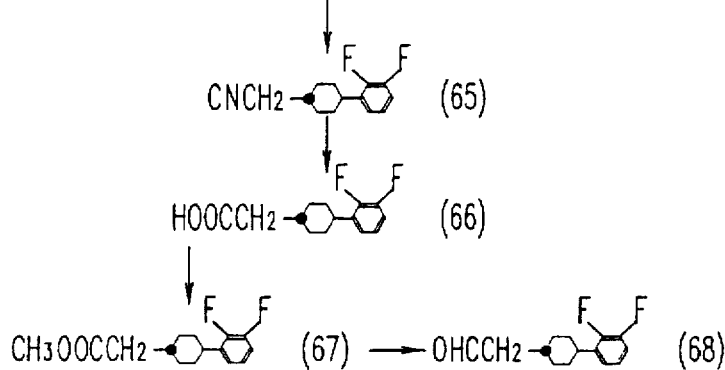
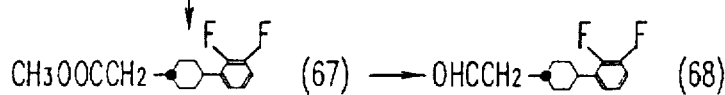

FIG. 5
Synthesis route 3  In the case of $Y = -COO-$, $R^A = \bigcirc$, $s = 0$
l, m≠1
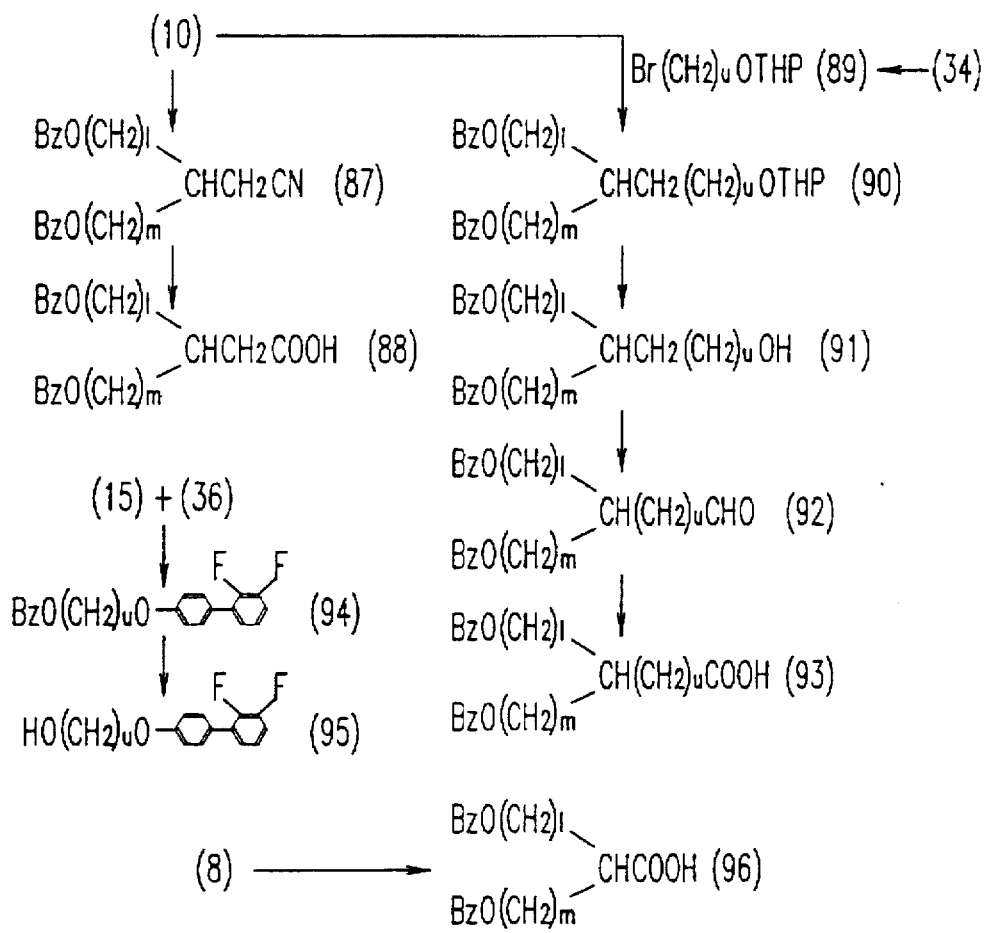
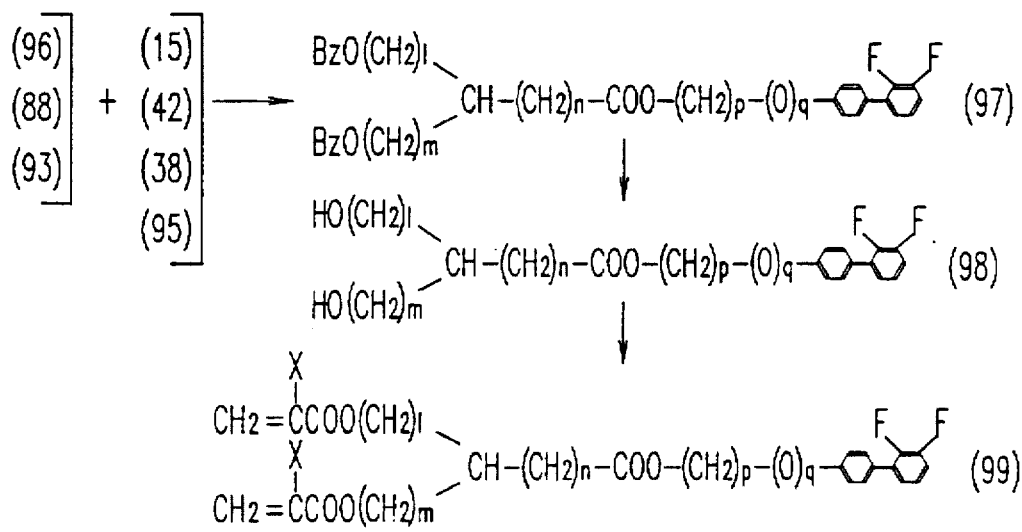

FIG. 6
Synthesis route 4   In the case of Y= —COO—, $R^A$= , s=0
l, m≠1
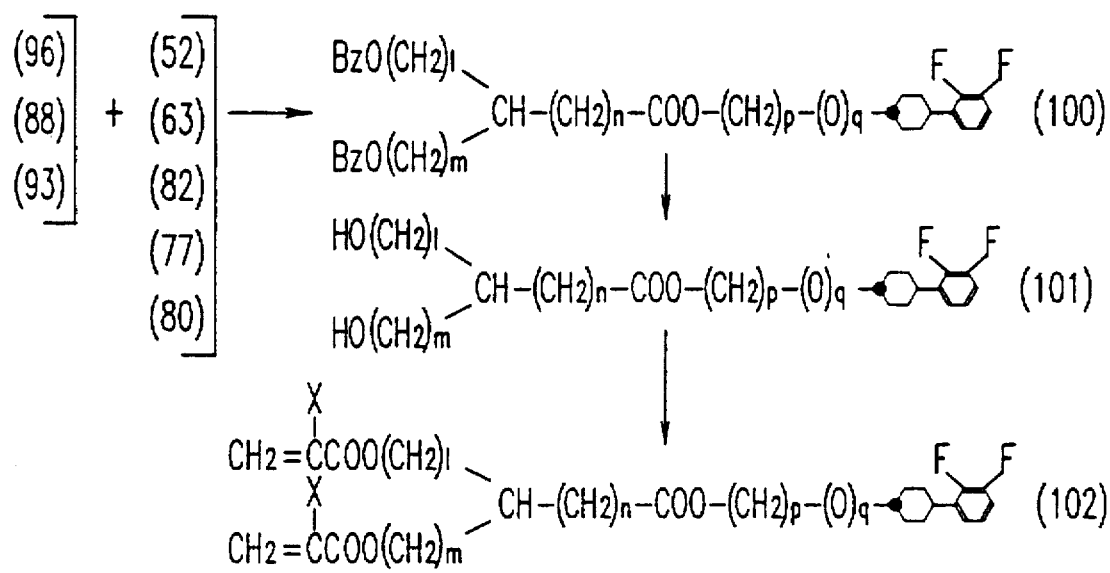

FIG. 8
Synthesis route 6   In the case of Y= −OCO−, $R^A$=◯, s=0
1, m≠1
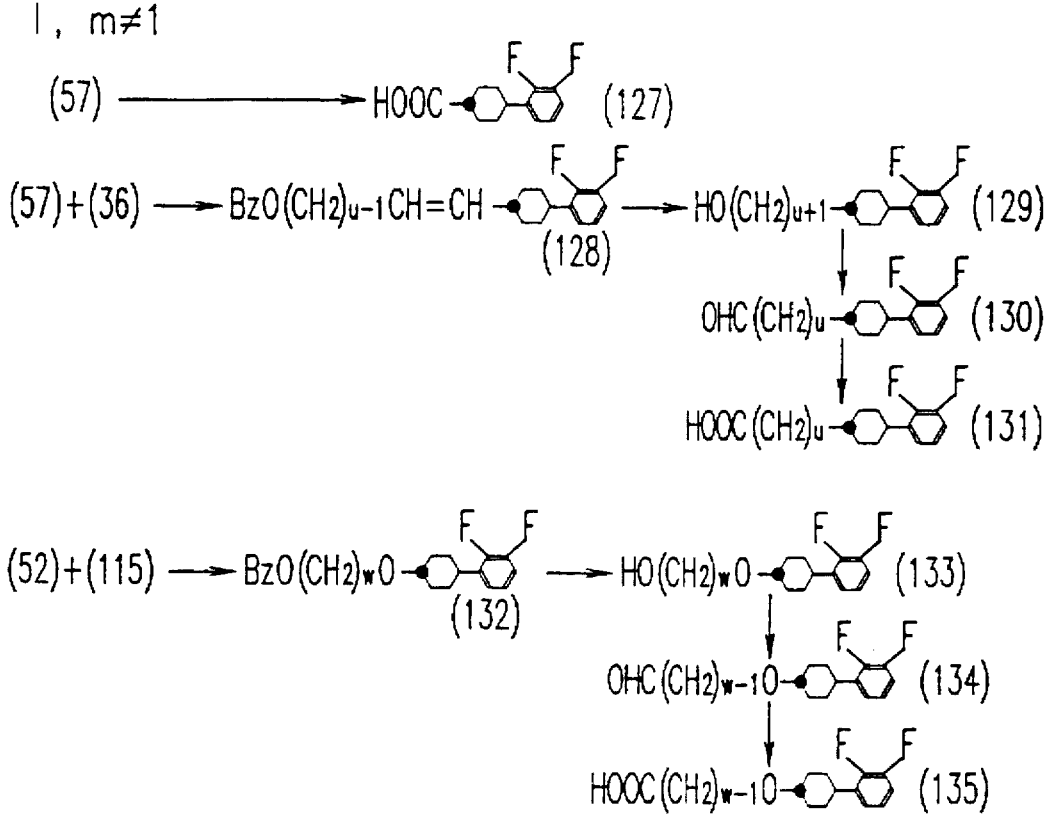
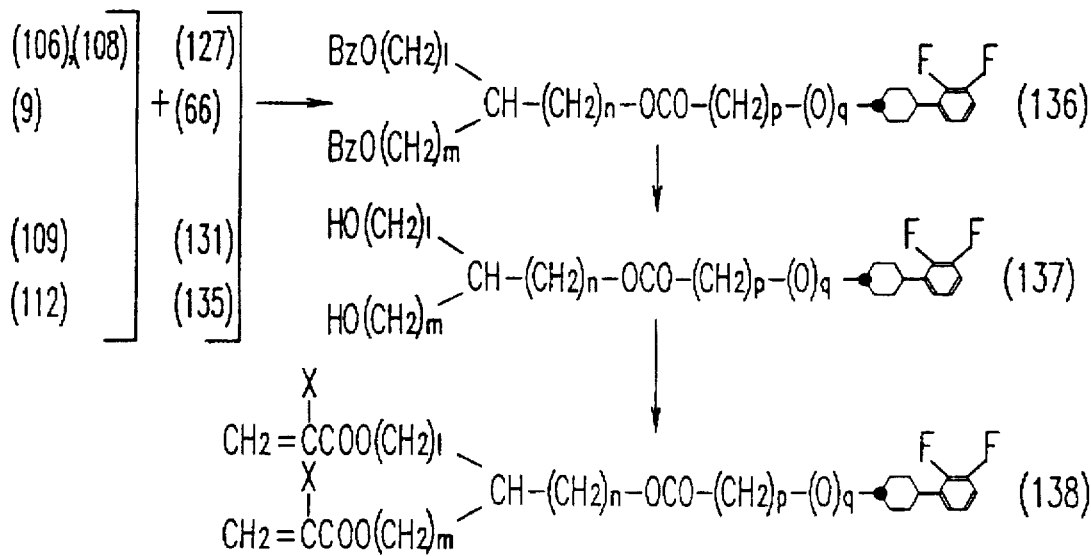

FIG. 9
Synthesis route 7    In the case of $Y = -O-$, $R^A = \bigcirc$, $s = 0$
$l, m \neq 1$
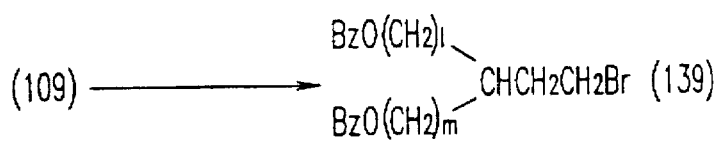
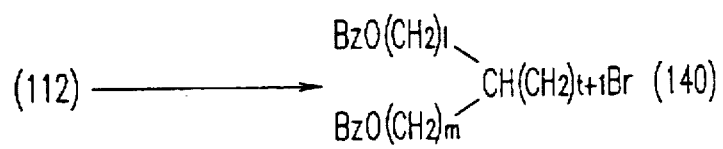
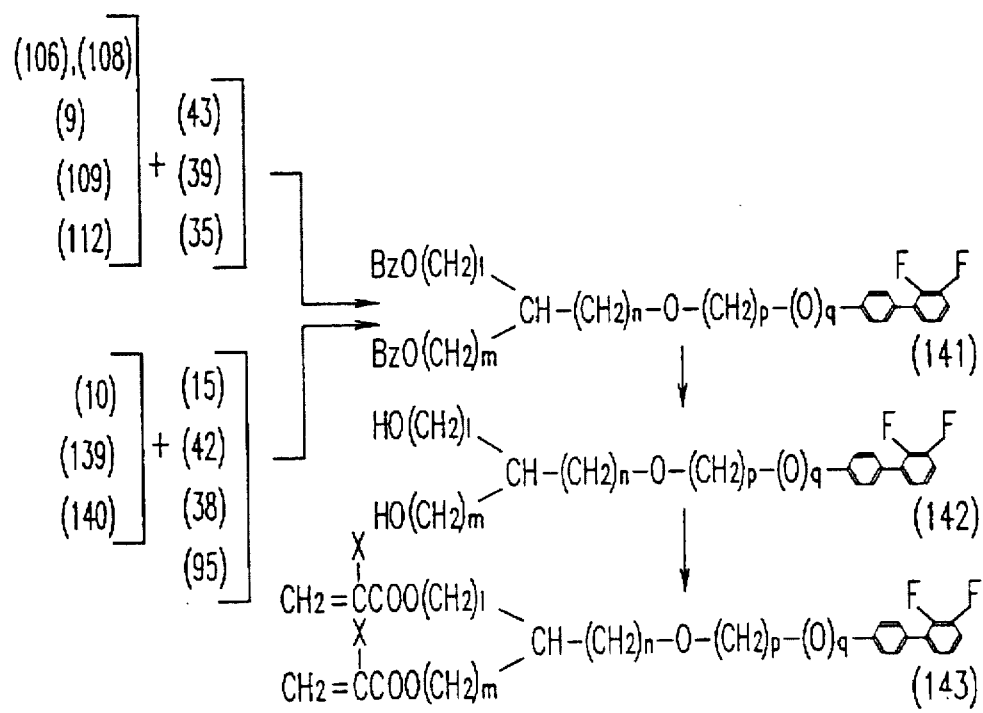

FIG.10
Synthesis route 8  In the case of Y= —O—, $R^A$=, s=0
I, m≠1
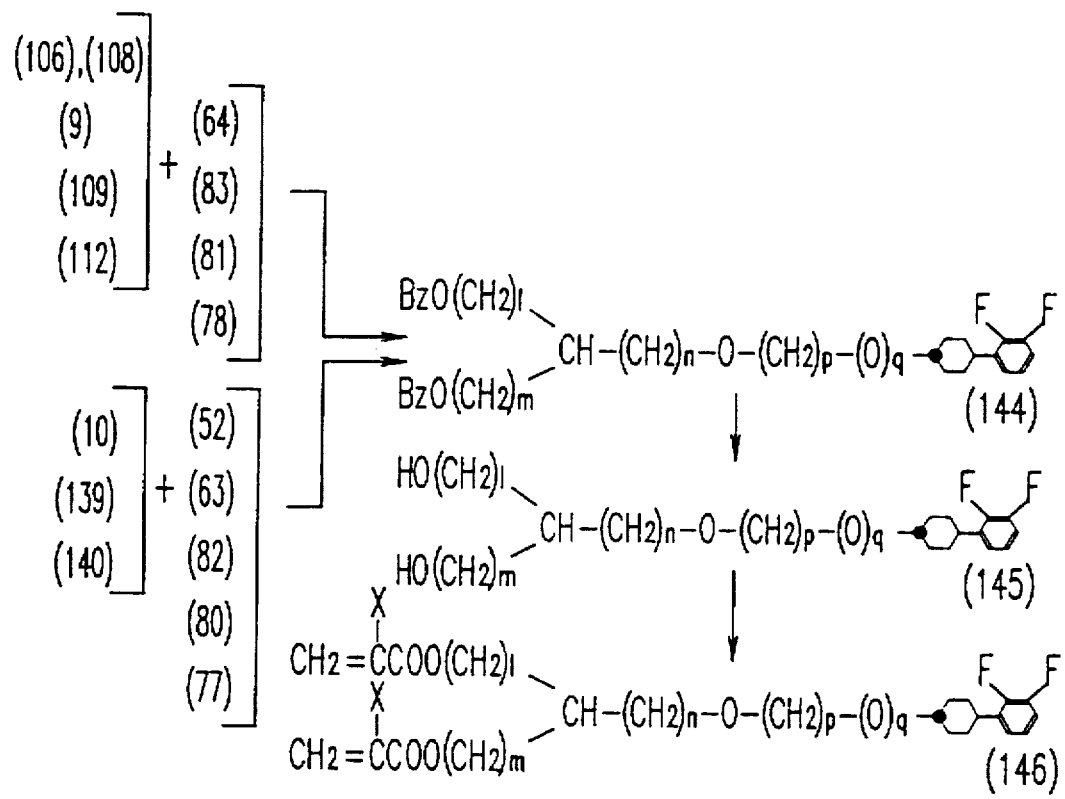

FIG. 13
Synthesis route 10   In the case of Y = Single bond, $R^A$ = ●◯, $R^B$ = ●◯ or ◯
l, m ≠ 1
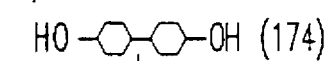 (174)
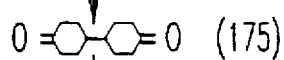 (175)
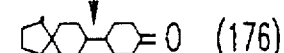 (176)
          (12)
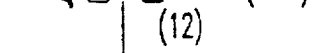 (177)
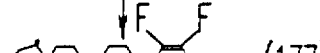 (178)
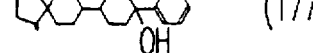 (179)
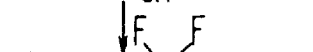 (180)
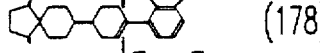 (181)
(47)+(22)
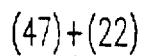 (182)
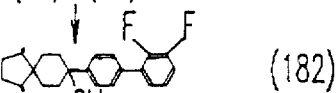 (183)
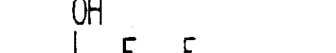 (184)
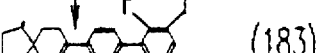 (185)
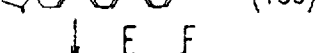 (186)
(17)
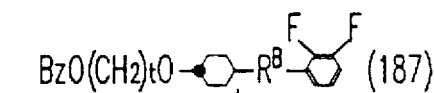 BzO(CH2)tO—◯—$R^B$—◯ (187)
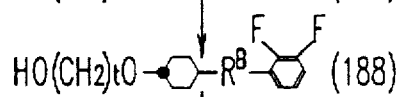 HO(CH2)tO—◯—$R^B$—◯ (188)
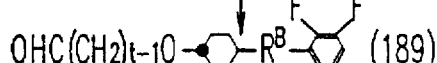 OHC(CH2)t-1O—◯—$R^B$—◯ (189)
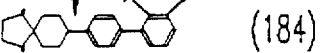 CH3OCH=◯—$R^B$—◯ (190)
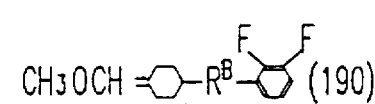 OHC—◯—$R^B$—◯ (191)
          (59)
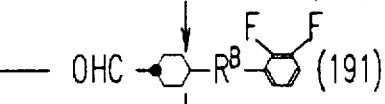 BzO(CH2)v-1CH=CH—◯—$R^B$—◯ (192)
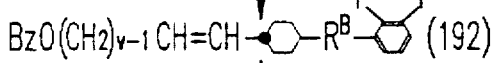 HO(CH2)v+1—◯—$R^B$—◯ (193)
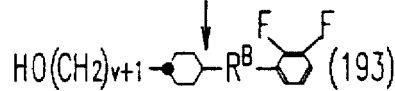 OHC(CH2)v—◯—$R^B$—◯ (194)
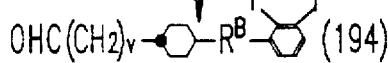 HOCH2—◯—$R^B$—◯ (195)
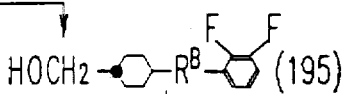 BrCH2—◯—$R^B$—◯ (196)
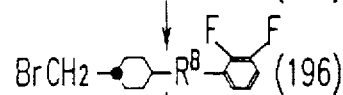 NCCH2—◯—$R^B$—◯ (197)
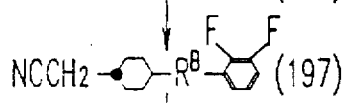 HOOCCH2—◯—$R^B$—◯ (198)
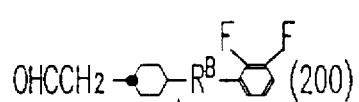 OHCCH2—◯—$R^B$—◯ (200)
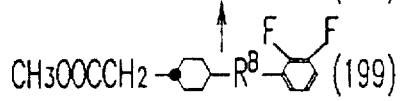 CH3OOCCH2—◯—$R^B$—◯ (199)
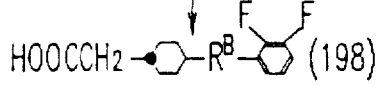

FIG. 14
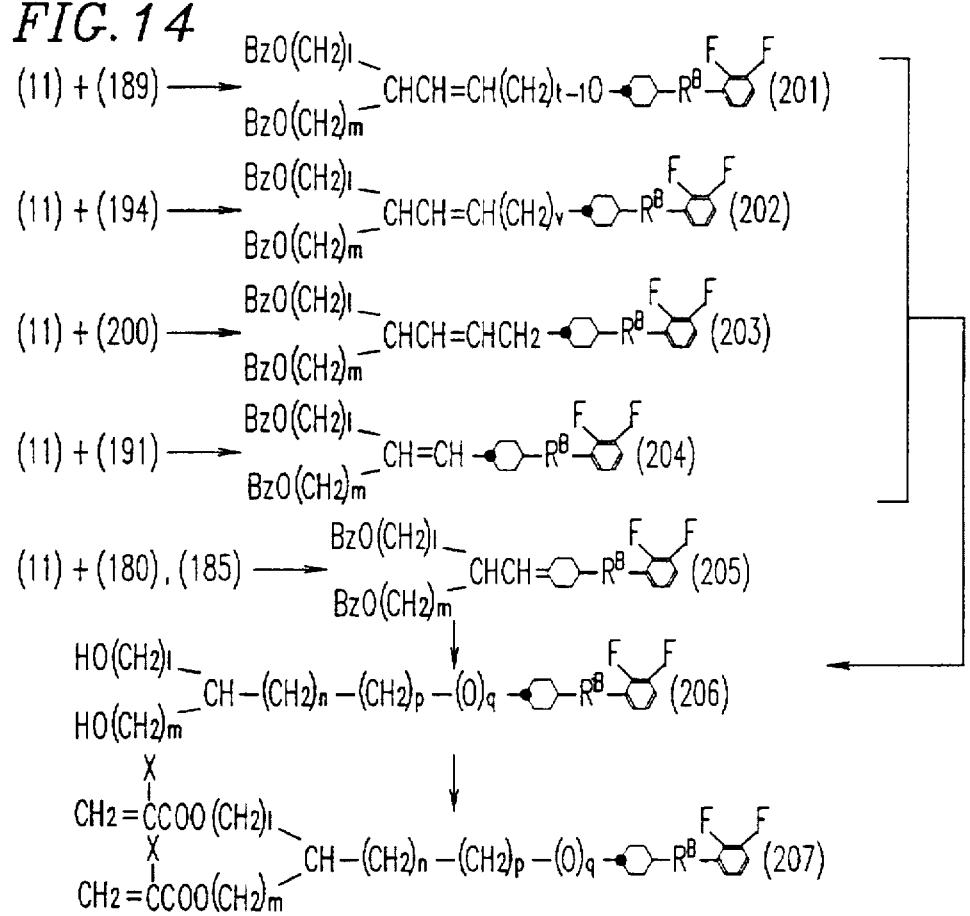
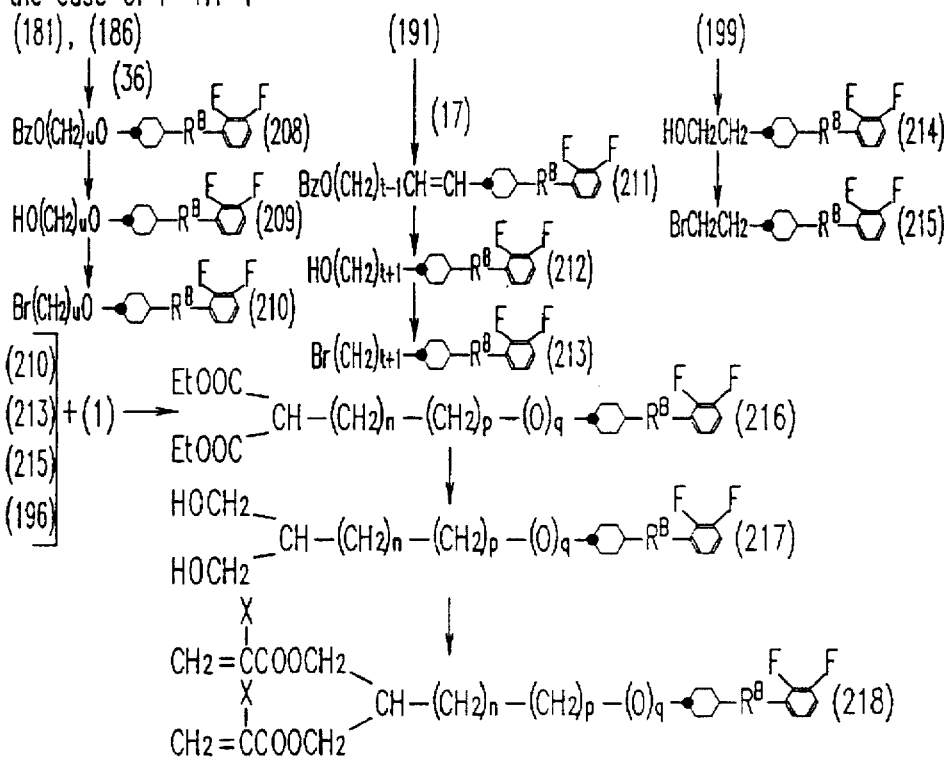

Synthesis route 11    In the case of $Y = -COO-$, $R^A = R^B = \phenyl$ $l, m \neq 1$ Synthesis route 12    In the case of Y=—COO—, $R^A$=⬡, $R^B$=⬡ or ⬡ l, m≠1

FIG. 17
Synthesis route 13   In the case of Y= -OCO-, $R^A = R^B =$ ⬡
I, m≠1
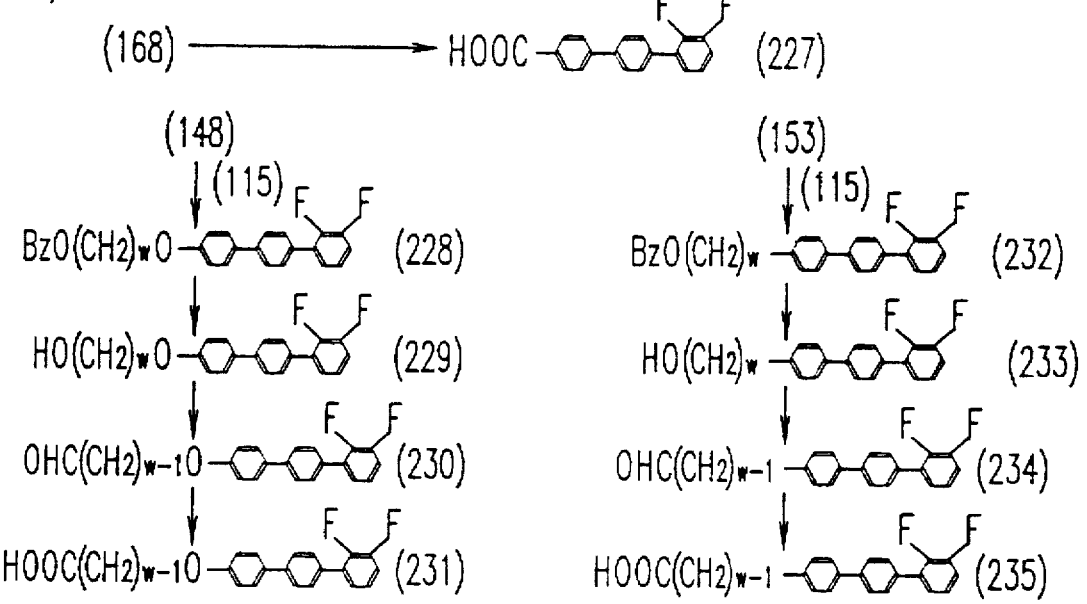
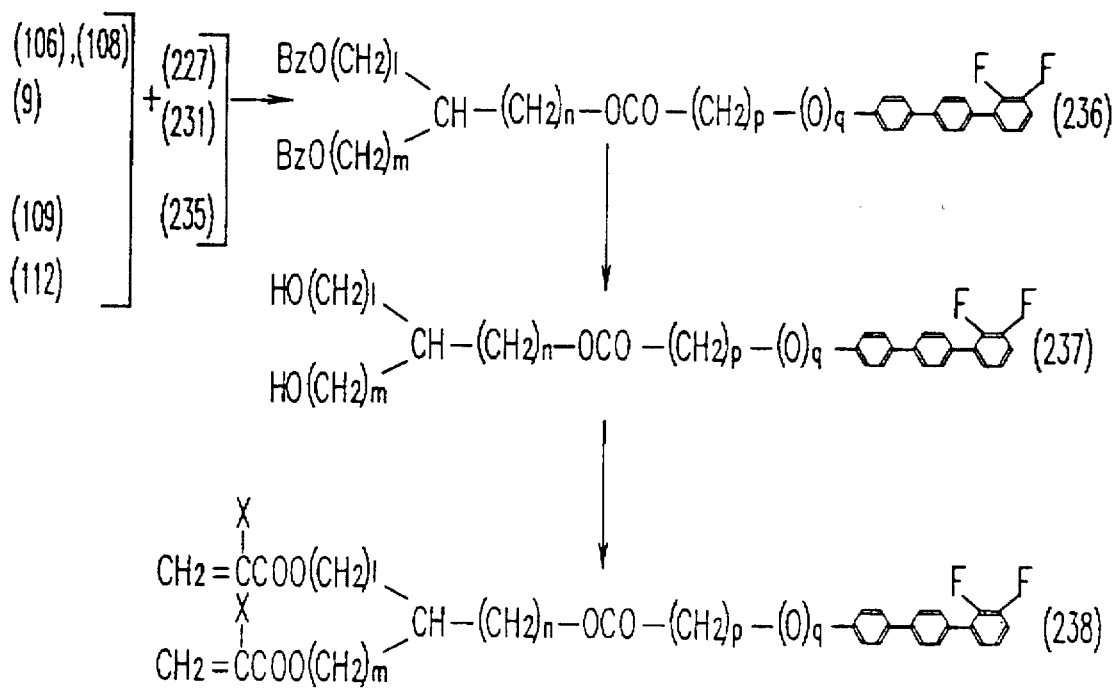

Synthesis route 15  In the case of Y= —O—, $R^A = R^B =$ ⬡

I, m≠1

Synthesis route 16    In the case of Y= —O—, $R^A$=●◯, $R^B$=●◯ or ◯

$l$, $m \neq 1$ (Shaded portions are extinction patterns)

Analyzer transmission axis direction

Polarizer transmission axis direction

FIG.25
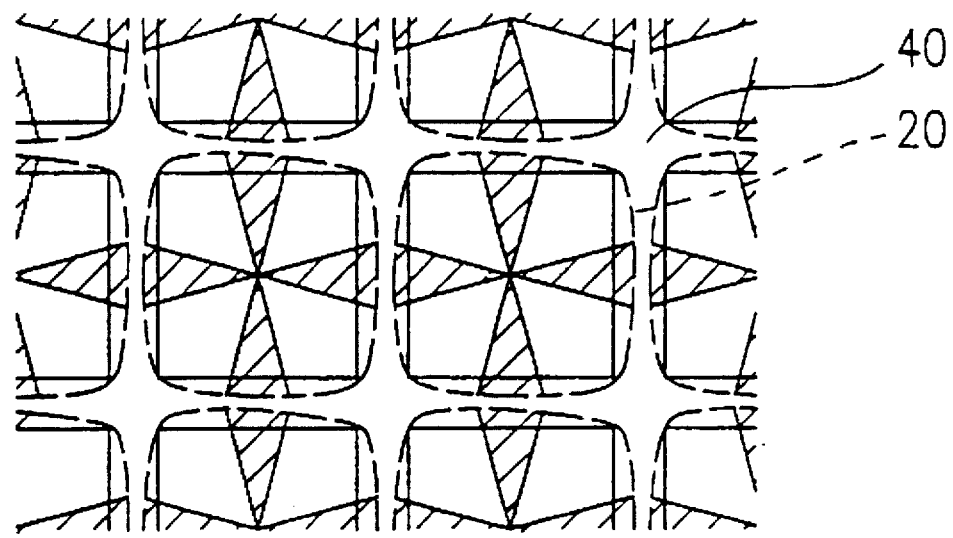
Analyzer transmission
axis direction
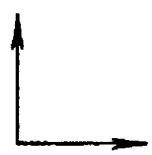
Polarizer transmission
axis direction

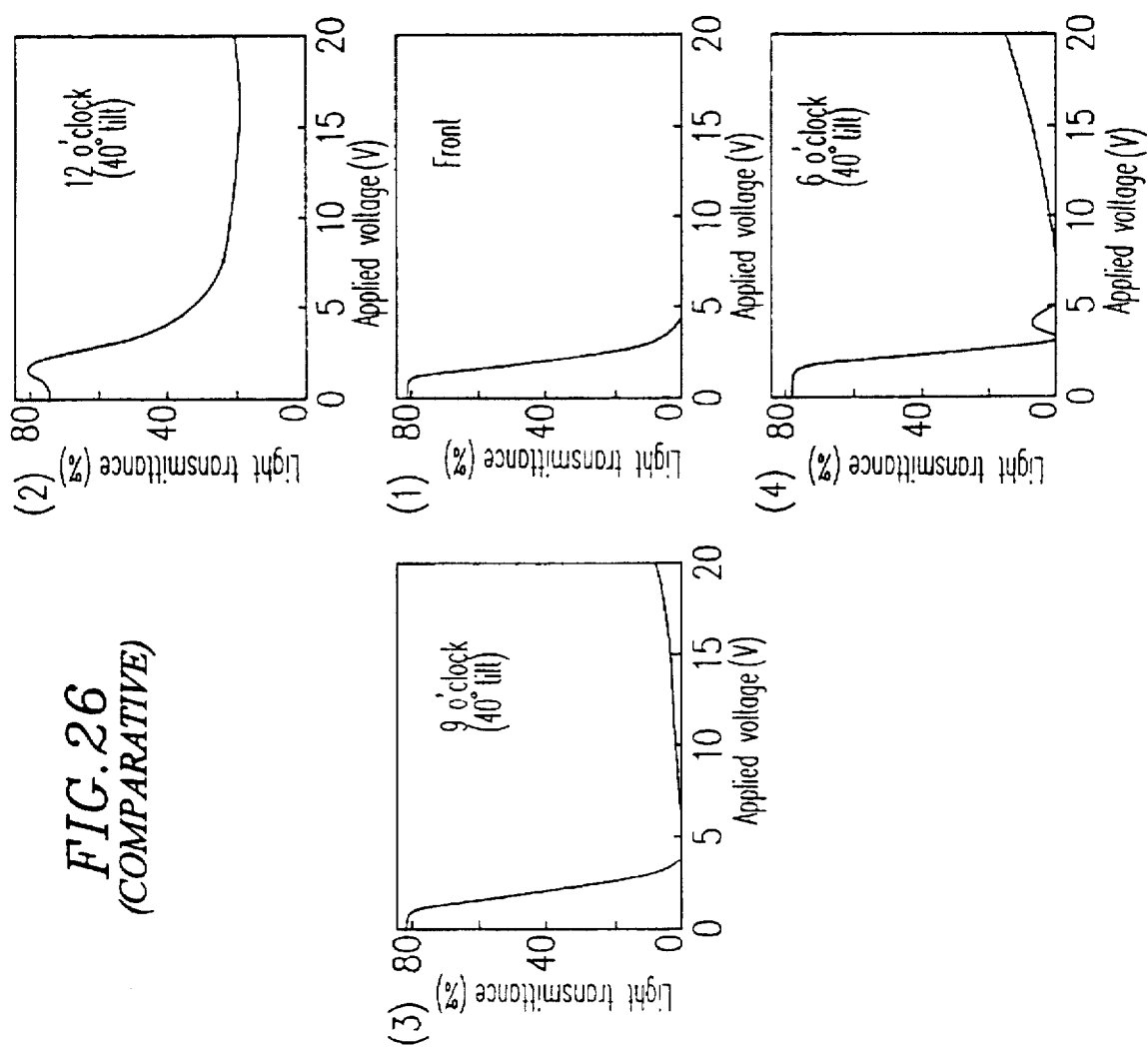
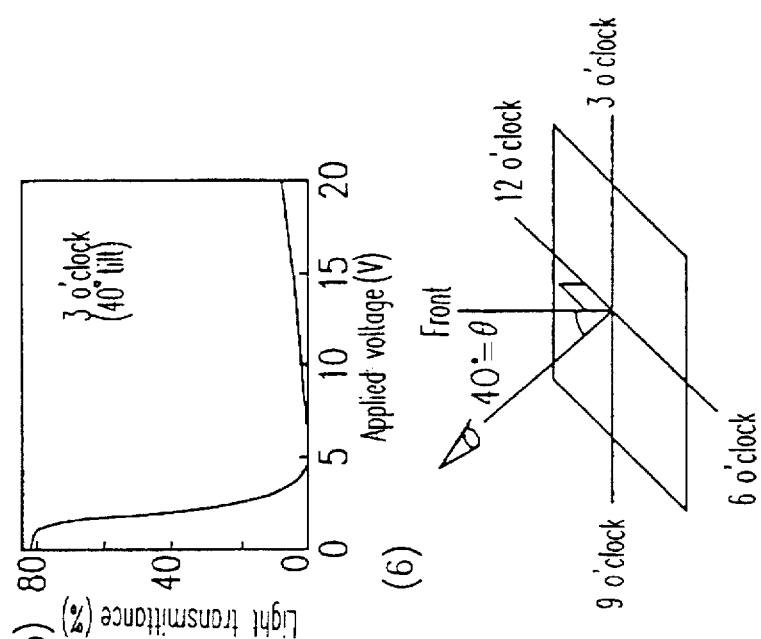
FIG.26 (COMPARATIVE)

POLYMERIZABLE COMPOUND AND LIQUID CRYSTAL DISPLAY DEVICE USING THE SAME

BACKGROUND OF THE INVENTION

1. Field of the Invention

The present invention relates to a polymerizable compound and a liquid crystal display device using the same. More specifically, the present invention relates to a polymerizable compound for enhancing the alignment regulating force of liquid crystal molecules in a liquid crystal region at an interface between a polymer (or a polymer wall) and a liquid crystal region of a liquid crystal display device including a liquid crystal layer surrounded by a polymer (or a polymer wall), and a liquid crystal display device using the same.

2. Description of the Related Art

A liquid crystal display device using a liquid crystal material and a polymer material (i) Japanese Laid-Open National Patent Publication No. 58-501631 discloses a polymer-dispersed liquid crystal display device including a liquid crystal material encapsulated with a polymer material. This liquid crystal display device utilizes the difference in refractive indices between the liquid crystal material and the polymer material, thereby displaying an opaque state or a transparent state. More specifically, when a voltage is not applied to the device, liquid crystal molecules are scattered thereby displaying an opaque state; when a voltage is applied to the device, the refractive index of liquid crystal molecules changes thereby displaying a transparent state.

Japanese Laid-Open National Patent Publication No. 61-502128 discloses a liquid crystal display device having a liquid crystal layer which is formed by irradiating a mixture containing a liquid crystal composition (liquid crystal material) and a photocurable resin with UV light so as to three-dimensionally phase-separate the mixture into the liquid crystal material and cured resin. In these devices, basically, changes between a scattering (opaque) state and a transmission (transparent) state of incident light of a liquid crystal layer are electrically regulated.

(ii) Japanese Laid-Open Patent Publication No. 1-269922 discloses a technique of selectively irradiating a mixture containing a liquid crystal composition (liquid crystal material) and a photocurable resin (polymer material) with UV light through a photomask (first step) and further irradiating it with UV light after the photomask is removed, whereby regions having different characteristics are formed (second step). The device thus obtained is basically a scattering type device.

Japanese Laid-Open Patent Publication No. 5-257135 discloses a liquid crystal device having a liquid crystal layer which is obtained by injecting a mixture containing a liquid crystal composition and a photocurable resin between substrates each provided with an alignment film having the alignment regulating force and irradiating the mixture with UV light through a photomask formed on the substrate. In this device, the pattern of the photomask is reflected onto the liquid crystal layer, utilizing the difference in optical characteristics between a portion of a liquid crystal region covered with a photomask and a portion of the liquid crystal region not covered with a photomask. This device is a static drive type liquid crystal device in which the light transmittance of the liquid crystal layer is regulated by applying a voltage between electrodes provided on the respective substrates. Thus, this device is different from a matrix drive type liquid crystal device of the present invention as will be described later.

Principle of improvement of viewing angle characteristics of a liquid crystal display device In order to improve viewing angle characteristics of a liquid crystal display device, liquid crystal molecules should be aligned in at least 3 directions in each pixel (liquid crystal region). The principle of the improvement of the viewing angle characteristics will be described with reference to FIGS. 27A through 27C and 28A through 28C.

FIGS. 27A through 27C are schematic cross-sectional views of a liquid crystal display device in a TN mode, having no polymer walls. FIGS. 28A through 28C are schematic cross-sectional views of a liquid crystal display device having a liquid crystal region surrounded by a polymer wall. The liquid crystal display device shown in FIGS. 27A through 27C has substrates 1 opposing each other and a liquid crystal layer 10 interposed between the substrates 1. Liquid crystal molecules are aligned in one direction in the liquid crystal layer 10. The liquid crystal display device shown in FIGS. 28A through 28C has substrates 1 opposing each other and a liquid crystal layer 20 interposed between the substrates 1. The liquid crystal layer is composed of a liquid crystal region 20 surrounded by a polymer wall 21. Liquid crystal molecules in the liquid crystal layer 20 are aligned so as to be symmetric with respect to an axis X. FIG. 27A shows a state where a voltage is not applied to the liquid crystal layer 10, and FIG. 28A shows a state where a voltage is not applied to the liquid crystal layer 20. FIG. 27B shows a state where a voltage is applied to the liquid crystal layer 10 to display in gray scales, and FIG. 28B shows a state where a voltage is applied to the liquid crystal layer 20 to display in gray scales. FIG. 27C shows a state where a saturated voltage is applied to the liquid crystal layer 10, and FIG. 28C shows a state where a saturated voltage is applied to the liquid crystal layer 20.

As is understood from FIG. 27B, when a display is conducted in gray scales, the refractive index of the liquid crystal molecules seen from direction A is different from the refractive index of the liquid crystal molecules seen from direction B. Thus, the contrast in direction A is different from that in direction B. On the other hand, as is understood from FIG. 28B, when a display is conducted in gray scales and the liquid crystal molecules are axis-symmetrically aligned, the apparent refractive index of the liquid crystal molecules seen from direction A and the apparent refractive index of the liquid crystal molecules seen from direction B are averaged, whereby the contrast in direction A becomes the same as that in direction B.

As described above, the liquid crystal display device in which the liquid crystal molecules are axis-symmetrically aligned as shown in FIGS. 28A through 28C has improved viewing angle characteristics, compared with those of the liquid crystal display device in a TN mode as shown in FIGS. 27A through 27C.

Examples of devices having a large viewing angle mode (1) Japanese Laid-Open Patent Publication Nos. 4-338923 and 4-212928 disclose techniques regarding a wide viewing angle mode liquid crystal display device incorporating polarizers along with the above-mentioned polymer-dispersed liquid crystal display cell, the polarizers being disposed so that the polarization axes are perpendicular to each other.

(2) Japanese Laid-Open Patent Publication No. 5-27242 discloses a method for improving the viewing angle characteristics of a non-scattering type liquid crystal display device using a polarizing plate. More specifically, this publication discloses a method for producing a composite material of liquid crystal and a polymer, utilizing the phase separation of a mixture containing liquid crystal and a photocurable resin. According to this method, the alignment state of liquid crystal domains becomes random due to produced polymer. Thus, liquid crystal molecules rise in different directions in the respective liquid crystal domains under the application of a voltage. Therefore, the apparent refractive index of the liquid crystal molecules seen from each direction becomes substantially identical, whereby the viewing angle characteristics are improved in gray scales.

(3) Japanese Laid-Open Patent Publication Nos. 6-265902 and 6-324337 disclose techniques of producing a liquid crystal display device with a wide viewing angle mode by conducting a concentric or axially symmetrical alignment treatment for each pixel of a substrate of the liquid crystal display cell. In these techniques, it is important to control the alignment of the liquid crystal molecules in each pixel, which requires a complicated process that results in poor controllability.

(4) The present inventors have proposed in Japanese Laid-Open Patent Publication No. 6-301015 a liquid crystal display device having improved viewing angle characteristics. Such a liquid crystal display device can be produced by radiating light on a liquid crystal display cell containing a liquid crystal composition and a photocurable resin through a photomask. In the liquid crystal display device thus produced, liquid crystal regions are formed in pixel portions corresponding to light-shading regions of a mask and polymer walls are formed in light-passing regions of the mask. In the liquid crystal regions, liquid crystal molecules are omnidirectionally (axis-symmetrically) aligned, and the polymer walls are mainly made of a photocurable resin. In this liquid crystal display device, the viewing angle characteristics improve because of the voltage response behavior as described with reference to FIGS. 28A through 28C.

FIG. 29 is a plan view of the liquid crystal display device shown in FIGS. 28A through 28C under the application of a voltage. In this figure, the portions which are covered with a photomask during the production of the device are represented by a broken line 23. As is understood from FIG. 29, a liquid crystal region 20 is formed substantially in accordance with the pattern of the photomask. In the case where the liquid crystal molecules in the liquid crystal region 20 are aligned so as to be symmetric with respect to an axis (i.e., axis X in FIG. 28A vertical to the substrate surface), disclination lines 22 are generated usually in the outer periphery of the liquid crystal region under the application of a voltage due to the reverse-tilt of the liquid crystal molecules.

(5) In order to solve the problem of the disclination lines, the present inventors have proposed in Japanese Patent Application No. 6-132288 that a linear polymerizable compound having a liquid crystal type structure is added to a mixture containing a liquid crystal composition and a photocurable resin.

(6) Furthermore, in order to solve the problems of response time and steepness of voltage-transmittance characteristics, which cannot be solved in (5), the present inventors have proposed in Japanese Patent Application No. 7-175264 a composition and a liquid crystal display device produced using the same. This composition contains, as a resin component, a linear polymerizable compound having a liquid crystal type structure in which a fluorinated alkyl group such as a perfluoro group is introduced.

On one hand, in the liquid crystal display device described in (4), disclination lines are generated due to the reverse-tilt of liquid crystal molecules at interfaces between polymer walls and liquid crystal regions. The disclination lines are displayed as bright-lines, so that the display characteristics in a black state are deteriorated.

On the other hand, in the liquid crystal display device using the polymerizable compound as proposed in (5) so as to suppress the generation of the disclination lines, there are the following two problems. First, the pretilt of the liquid crystal molecules in the liquid crystal regions increases, resulting in a decrease in brightness under no application of a voltage. Second, the response time of a liquid crystal device and the threshold characteristics and steepness of voltage-transmittance characteristics become insufficient due to interactions between the polymer and the liquid crystal molecules in the polymer-liquid crystal composite region and at the interface between the polymer wall and the liquid crystal region.

Furthermore, in the liquid crystal display device described in (4), there are problems associated with a method for aligning liquid crystal molecules omnidirectionally in a pixel so as to improve viewing angle characteristics and a method for preventing the decrease in contrast due to the depolarization caused by light scattering at an interface between the liquid crystal and the polymer. In theory, the scattering occurring at interfaces between the liquid crystal and the polymer can be reduced by decreasing the area of interfaces between the liquid crystal and the polymer within each pixel. However, in practice, using conventional methods it is very difficult to control the size and position of liquid crystal droplets generated in a three-dimensional polymer matrix.

In order to solve these problems, it is important to select a polymerizable compound in such a manner that the generation of disclination lines is prevented and the deterioration of response time and voltage-transmittance characteristics is preevented. In addition, it is useful to form at least one liquid crystal droplet in a pixel. More specifically, in order to realize a liquid crystal display device which operates in a conventional liquid crystal display mode, either or both of the problems assosiated with the control of liquid crystal alignment and the suppression of the scattering strength should be solved.

Furthermore, the conventional linear polymerizable compound having a liquid crystal type structure has the following problems. (1) An unreacted compound remaining in the liquid crystal region due to the reactivity thereof deteriorates the characteristics of the liquid crystal display device; and (2) The strength of a polymer wall to be formed (e.g., pressure resistance, shock resistance) and heat resistance are insufficient due to the molecular structure of the polymerizable compound. Consequently, the strength and heat resistance of the liquid crystal display device are insufficient.

SUMMARY OF THE INVENTION

The present invention provides a polymerizable compound represented by Formula (I):

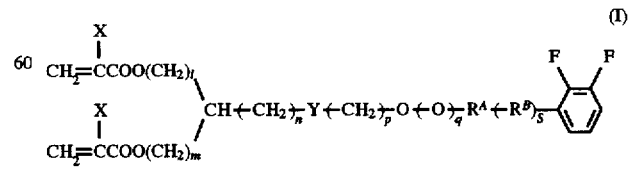

where X is a hydrogen atom or a methyl group; l and m are independently an integer of 0 to 14; Y is a single bond, —COO—, —OCO—, or —O—; n and p are independently an integer of 0 to 18; q and s are independently an integer of 0 or 1; and $R^A$ and $R^B$ are independently represented by Formula (II) or (III);

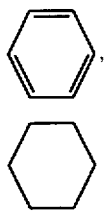

provided that, when $q=1$, $p \geq 2$; and when $R^A$ is represented by the Formula (II), $R^B$ is represented by the Formula (II).

In one embodiment of the invention, $(n+p) \leq 18$ in Formula (I).

In another embodiment of the invention, $(n+p) \leq 18$ and $s=0$ in Formula (I).

In still another embodiment of the invention, $(n+p) \leq 18$ and $s=1$ in Formula (I).

A liquid crystal display device according to the present invention includes a pair of substrates, and a liquid crystal layer interposed between the substrates including a polymer and a liquid crystal region surrounded by the polymer, wherein the polymer is made from a polymerization precursor containing at least the polymerizable compound represented by Formula (I):

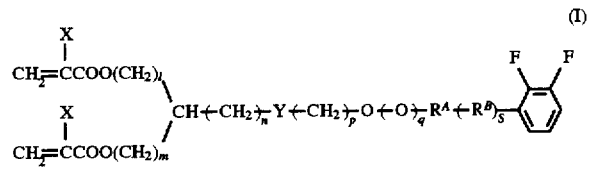

where X is a hydrogen atom or a methyl group; l and m are independently an integer of 0 to 14; Y is a single bond, —COO—, —OCO—, or —O—; n and p are independently an integer of 0 to 18; q and s are independently an integer of 0 or 1; and $R^A$ and $R^B$ are independently represented by Formula (II) or (III);

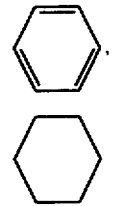

provided that, when $q=1$, $p \geq 2$; and when $R^A$ is represented by the Formula (II), $R^B$ is represented by the Formula (II).

In one embodiment of the invention, liquid crystal molecules in the liquid crystal region are axis-symmetrically, radially or concentrically, spirally, or randomly aligned.

In another embodiment of the invention, the liquid crystal display device includes an insulating film regulating an alignment state of the liquid crystal molecules on the substrate.

In still another embodiment of the invention, the liquid crystal display device further includes an insulating alignment film for realizing a uniaxially uniform alignment state of the liquid crystal molecules so as to correspond to the liquid crystal region, on the substrate, wherein the alignment state of the liquid crystal region and an entire structure of the device are arranged so as to be suitable for TN, STN, ECB, and SSFLC modes.

Thus, the invention described herein makes possible the advantages of (1) providing a liquid crystal display device in which disclination lines are not generated, the response time and voltage-transmittance characteristics are not deteriorated, and brightness is maintained even under no application of a voltage, and which has a high contrast and outstanding strength (e.g., pressure resistance, shock resistance) and heat resistance; and (2) providing a polymerizable compound which allows the liquid crystal display device to be obtained.

These and other advantages of the present invention will become apparent to those skilled in the art upon reading and understanding the following detailed description with reference to the accompanying figures.

BRIEF DESCRIPTION OF THE DRAWINGS

FIG. 2 is a reaction scheme diagram showing the continuation of Synthesis route 1.

FIG. 3 is a reaction scheme diagram showing Synthesis route 2 of a polymerizable compound according to the present invention.

FIG. 5 is a reaction scheme diagram showing Synthesis route 3 of a polymerizable compound according to the present invention.

FIG. 6 is a reaction scheme diagram showing Synthesis route 4 of a polymerizable compound according to the present invention.

FIG. 8 is a reaction scheme diagram showing Synthesis route 6 of a polymerizable compound according to the present invention.

FIG. 9 is a reaction scheme diagram showing Synthesis route 7 of a polymerizable compound according to the present invention.

FIG. 10 is a reaction scheme diagram showing Synthesis route 8 of a polymerizable compound according to the present invention.

FIG. 13 is a reaction scheme diagram showing Synthesis route 10 of a polymerizable compound according to the present invention.

FIG. 14 is a reaction scheme diagram showing the continuation of Synthesis route 10.

FIG. 17 is a reaction scheme diagram showing Synthesis route 13 of a polymerizable compound according to the present invention.

FIG. 25 is a schematic view showing an alignment state of a liquid crystal region in the liquid crystal display device according to the present invention.

FIG. 26 shows graphs and a schematic view illustrating the electrooptical characteristics and viewing angle characteristics of a liquid crystal display device in a TN mode in Comparative Example 1.

DESCRIPTION OF THE PREFERRED EMBODIMENTS

Figure 1:
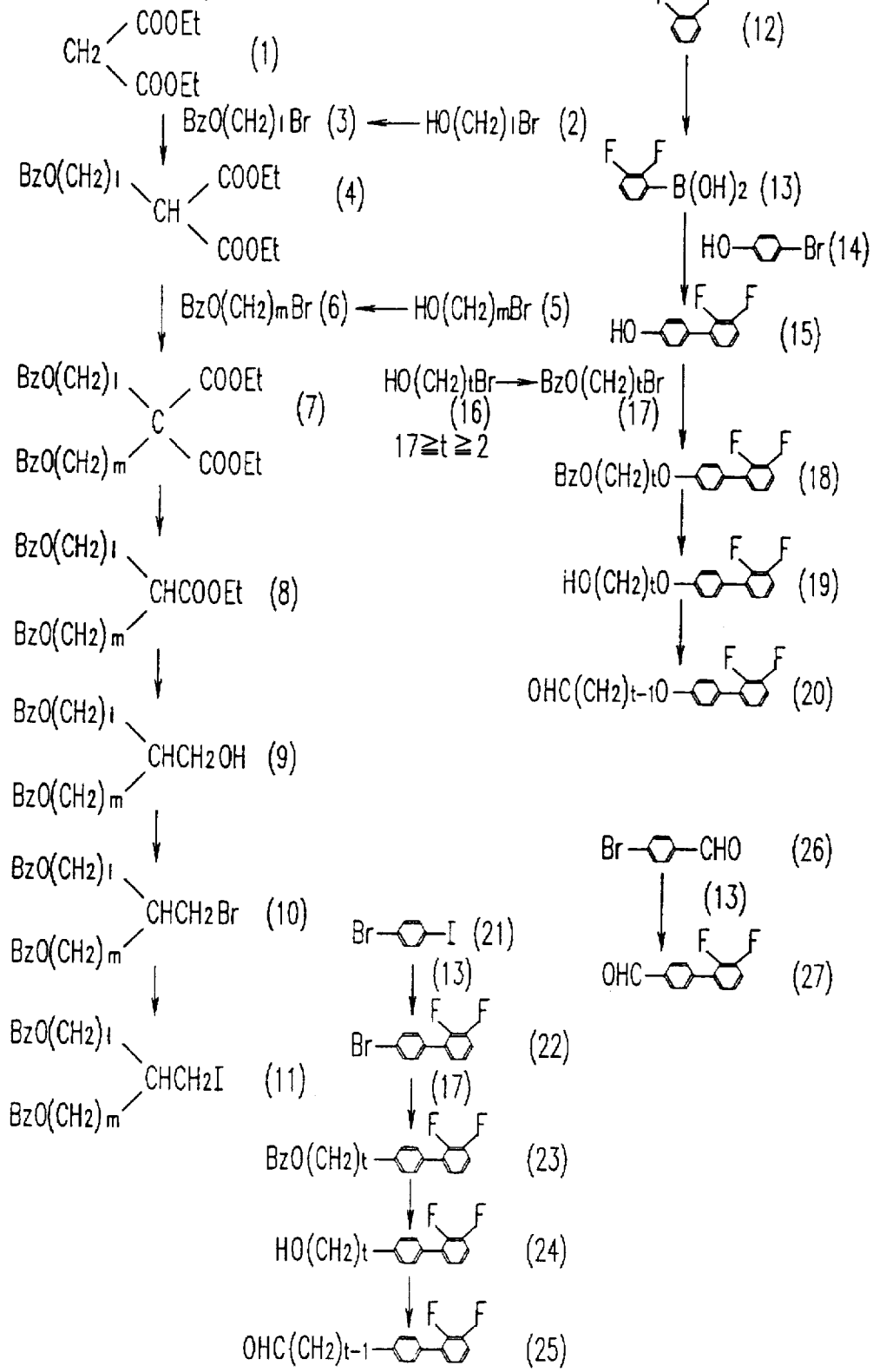
FIG. 1 is a reaction scheme diagram showing Synthesis route 1 of a polymerizable compound according to the present invention.

In the present specification, "a liquid crystal layer including a polymer and a liquid crystal region surrounded by the polymer" refers to any liquid crystal layer having a structure in which a liquid crystal region is partitioned by a polymer and liquid crystal molecules in the liquid crystal region are in contact with the polymer. Examples of the above-defined liquid crystal layer include: liquid crystal layer having a liquid crystal region completely surrounded by or covered with a polymer; a liquid crystal layer having a liquid crystal region partitioned by a columnar or wall-shaped polymer; and a liquid crystal layer having a liquid crystal region partitioned by a three-dimensional network structure made of a polymer.

Polymerizable compound

The polymerizable compound of the present invention is defined as a polyfunctional compound having within its molecule a liquid crystal type structure and a branched polymerizable functional group. Here, "a liquid crystal type structure" means a chemical structure having at least one rigid cyclic structure (e.g., substituted or non-substituted phenyl group, substituted or non-substituted cyclohexyl group, etc.). The polyfunctional compound of the present invention is likely to form a three-dimensional network structure and has outstanding reactivity. Thus, the polyfunctional compound of the present invention maintains properties (e.g., suppression of disclination lines) of a conventional monofunctional "polymerizable compound having within its molecule liquid crystal type structure". In addition, the polymerizable compound of the present invention is capable of suppressing an unreacted compound from degrading the characteristics of a liquid crystal display device and improving a glass transition temperature (Tg) of a polymer.

The structure of the polymerizable compound of the present invention is not particularly limited. However, it preferably has the structure represented by the above Formula (I). The polymerizable compound has a structure in which branched polymerizable functional groups are introduced into the molecule. The branched polymerizable functional groups are bound to mesogen groups having a liquid crystal type structure through linking groups. In Formula (I), X is a hydrogen atom or a methyl group; l and m are independently an integer of 0 to 14; Y is a single bond, —COO—, —OCO—, or —O—; n and p are independently an integer of 0 to 18; q and s are independently 0 or 1; $R^A$ and $R^B$ are independently represented by the above Formula (II) or (III). When q=1, p≧2; when $R^A$ is represented by the above Formula (II), $R^B$ is represented by the above Formula (II).

The polymerizable compound of the present invention has a mesogen backbone having a liquid crystal type structure in molecules. Therefore, a mesogen backbone is introduced in a polymer made from monomers containing the polymerizable compound of the present invention. Because of this, the alignment films exert their alignment regulating force on liquid crystal molecules in a liquid crystal region. Thus, the alignment state of the liquid crystal molecules is stabilized. Furthermore, the liquid crystal molecules are pretilted, so that the disclination lines are prevented from being generated under the application of a voltage. In the case where a compound introducing a cyclohexyl ring as a part of a mesogen group, the refractive index of a polymer becomes identical with or close to an ordinary index ($n_o$) of a liquid crystal material to be used. When a liquid crystal cell is evaluated under the condition that it is placed between two polarizers in crossed-Nicols, the light transmittance decreases due to the matching of refractive indexes at an interface between the liquid crystal and a polymer under the application of a voltage. Because of these factors, a satisfactory display with a high contrast can be realized under the application of a voltage.

The polymerizable compound of the present invention is a polyfunctional compound having within its molecule a liquid crystal type structure and a branched polymerizable functional group. The effect of the polymerizable compound having within its molecule a liquid crystal type structure will be described in detail below.

In general, a liquid crystal display device produced by utilizing phase-separation involving a polymerization reaction from a mixture containing a liquid crystal material and a polymerizable resin material have the problems as shown in Table 1.

TABLE 1

| Problem | Presumable cause |
| --- | --- |
| Low response time | Dissolution of the resin material, a monomer, etc. (i.e., polymerizable compound) in the liquid crystal |

TABLE 1-continued

| Problem | Presumable cause |
| --- | --- |
| Hysteresis | High anchoring strength of the liquid crystal molecules to the polymer |
| High driving voltage | " |
| Light leakage under the application of a saturated voltage | Dissolution of liquid crystal molecules and polymer molecules inside the liquid crystal region Light leakage due to the anchoring control and the mismatching of refractive indexes at an interface between liquid crystal and the polymer |
| Low heat resistance | Low glass transition temperature (Tg) of the polymer |

The above-mentioned problems are mainly caused by the high anchoring strength of liquid crystal molecules with respect to a polymer wall and the satisfactory compatibility between a polymer material (resulting from polymerization of the polymerizable compound) and a liquid crystal material. In order to overcome these problems, it is effective to use a fluorinated polymerizable compound. A polymer portion made of a fluorinated polymerizable compound has a different level of surface free enrgy compared to that of a polymer portion which is not fluorinated. Therefore, the polymer portion made of the fluorinated polymerizable compound appears on the surface of a polymer wall and a polymer layer. Consequently, the surface free energy of the polymer decreases to reduce the anchoring strength between the polymer layer and the liquid crystal molecules, so that the alignment state of liquid crystal can be stabilized. Alternatively, since the fluorinated resin material has a different level of surface free energy compared to that of the liquid crystal material, the compatibility between the polymer material and the liquid crystal material decreases. Thus, it is also effective to fluorinate a part of a mesogen group, as defined in the present invention.

Furthermore, the polymerizable compound of the present invention is a polyfunctional compound having within its molecule a liquid crystal type structure and a branched polymerizable functional group. The polyfunctional compound of the present invention is likely to form a three-dimensional network structure and has outstanding reactivity. Thus, the polyfunctional compound of the present invention possesses properties of a conventional monofunctional "polymerizable compound having within its molecule a liquid crystal type structure" yet also realizes properties of polyfunctional compound (e.g., suppressing an unreacted compound from degrading the characteristics of a liquid crystal display device and improving a glass transition temperature (Tg) of a polymer). Accordingly, the polymerizable compound of the present invention is very effective in terms of display characteristics and strength (e.g., pressure resistance, heat resistance) of a liquid crystal display device.

In the polymerizable compound of the present invention, the mesogen backbone is bound to an ethylenically unsaturated group which functions as a polymerizable functional group through a linking group. As the linking group, a branched structure such as $—(CH_2)_l—[(CH_2)_m]CH—(CH_2)_n—Y—(CH_2)_p—(O)_q—$ is preferable, where l and m are independently an integer of 0 to 14, and more preferably an integer of 0 to 12. Y is a single bond, —COO—, —OCO—, or —O—; preferably a single bond or —COO—. n and p are independently an integer of 0 to 18, preferably an integer of 0 to 12. Preferably, (n+p) is equal to or smaller than 18. q is an integer of 0 or 1. In the case where l or m is larger than 14, or n or p is larger than 18, a mesogen portion projects from the surface of a polymer forming a polymer wall surrounding a liquid crystal region, thereby degrading the response time of liquid crystal molecules. Furthermore, a polymerizable compound having a longer chain provides stronger effect of suppressing the generation of disclination lines, even when used in a small amount. However, in this case, pretilt angles increase, resulting in the decrease in transmittance of a cell. Thus, it is important to select the added amount and kind of a compound in such a manner that disclination lines are prevented from being generated and pretilt angles are prevented from increasing.

In the case of obtaining a polymer forming a polymer wall surrounding a liquid crystal region, using the polymerizable compound of the present invention, the polymerizable compound of the present invention can be homopolymerized or copolymerized with another polymerizable compound such as a polymerizable monomer. Examples of another polymerizable monomer include acrylic acid having an alkyl group or a benzene ring, a monofunctional monomer containing an acrylate and a methacrylate, and a polyfunctional monomer containing 2 or more functional groups, such as bisphenol A diacrylate, bisphenol A dimethacrylate, 1,4-butanediol diacrylate, 1,6-hexanediol diacrylate, trimethylolpropane triacrylate, tetramethylolmethane tetraacrylate, and R-684 (produced by Nippon Kayaku Co., Ltd.).

In the case where the polymerizable compound of the present invention is copolymerized with another polymerizable compound, the polymerizable compound of the present invention can be used preferably in an amount of 3% to 60% by weight, more preferably in an amount of 3% to 40% by weight based on the total weight of the compounds which polymerize.

A method for synthesizing a polymerizable compound of the present invention

Hereinafter, methods for synthesizing the polymerizable compound of the present invention will be specifically described. The following synthesis routes are exemplary, and the present invention is not limited thereto.

Synthesis route 1

An embodiment where, in Formula (I), Y is a single bond, $R^4$ is represented by Formula (II), and s=0 will be described. FIGS. 1 and 2 schematically show Synthesis route 1.

In the case of l, m≠1: a commercially available compound (1) and a compound (3) obtained by benzylating a commercially available compound (2) are condensed with each other under alkaline conditions to obtain a compound (4). The compound (4) and a compound (6) obtained by benzylating the compound (5) are condensed with each other in the same manner as the above to obtain a compound (7). The compound (7) is decarboxylated with lithium chloride and dimethylsulfoxide to obtain a compound (8). Thereafter, the compound (8) is reduced with lithium aluminium hydride or the like to obtain a compound (9). The compound (9) is brominated with carbon tetrabromide to obtain a compound (10). Thereafter, sodium iodide is allowed to react with the compound (10) to obtain a compound (11).

Butyllithium and trimethyl borate are allowed to react with a commercially available compound (12), and a reaction product is hydrolyzed with dilute sulfuric acid to obtain a compound (13). The compound (13) is subjected to a coupling reaction with a commercially available compound (14) in the presence of a palladium catalyst to obtain a compound (15). Separately, benzyl chloride is allowed to react with a compound (16) to obtain a compound (17). The compound (17) and the compound (15) are subjected to an etherification under alkaline conditions to obtain a compound (18). The compound (18) is debenzylated with hydrogen gas in the presence of a palladium catalyst to produce a compound (19). Thereafter, the compound (19) is oxidized with pyridinium chlorochromate (PCC) to obtain a compound (20).

A commercially available compound (21) and the compound (13) are subjected to a coupling reaction in the presence of a palladium catalyst to obtain a compound (22). A Grignard reagent of the compound (22) is prepared. Then, the Grignard reagent thus obtained is subjected to a coupling reaction with the compound (17) in the presence of a copper catalyst to obtain a compound (23). The compound (23) is debenzylated with hydrogen gas in the presence of a palladium catalyst to obtain a compound (24). Thereafter, the compound (24) is oxidized with PCC to obtain a compound (25).

A commercially available compound (26) is subjected to a coupling reaction with the compound (13) in the presence of a palladium catalyst to obtain a compound (27).

The compound (11) is subjected to a Wittig reaction with the compounds (20), (25), and (27), respectively, whereby compounds (28), (29), and (30) are obtained. On the other hand, the Grignard reagent of the compound (22) is allowed to react with the compound (10) in the presence of a copper catalyst to obtain a compound (31). The compounds (28), (29), (30), and (31) are hydrogenated in the presence of a palladium catalyst to obtain a compound (32). Acryloyl chloride or methacryloyl chloride is allowed to react with the compound (32) to obtain a compound (33). The compound (33) can also be obtained via condensation using dicyclohexylcarbodiimide (DCC) or Mitsunobu reaction between the compound (32) and acrylic acid or methacrylic acid.

In the case of l=m=1: a compound (35) is obtained by Mitsunobu reaction between the compound (15) and a compound (34).

A benzylated product (36) of the compound (34) and the Grignard reagent of the compound (22) are subjected to a coupling reaction in the presence of a copper catalyst to obtain a compound (37). Thereafter, the compound (37) is debenzylated with hydrogen gas in the presence of a palladium catalyst to obtain a compound (38). The compound (38) is brominated with carbon tetrabromide to obtain a compound (39).

A commercially available compound (40) and the compound (13) are subjected to a coupling reaction to obtain a compound (41). The compound (41) is reduced with lithium borohydride to obtain a compound (42). Thereafter, the compound (42) is brominated with carbon tetrabromide, phosphorus tribromide, etc. to obtain a compound (43).

The compound (1) is subjected to a condensation with each of the compounds (35), (39), and (43) under alkaline conditions to obtain a compound (44). The compound (44) is reduced with lithium borohydride to obtain a compound (45). Thereafter, acryloyl chloride or methacryloyl chloride is allowed to react with the compound (45) to obtain a compound (46). The compound (46) can also be obtained by condensation using DCC or Mitsunobu reaction between the compound (45) and acrylic acid or methacrylic acid.

Synthesis route 2

Figure 4:
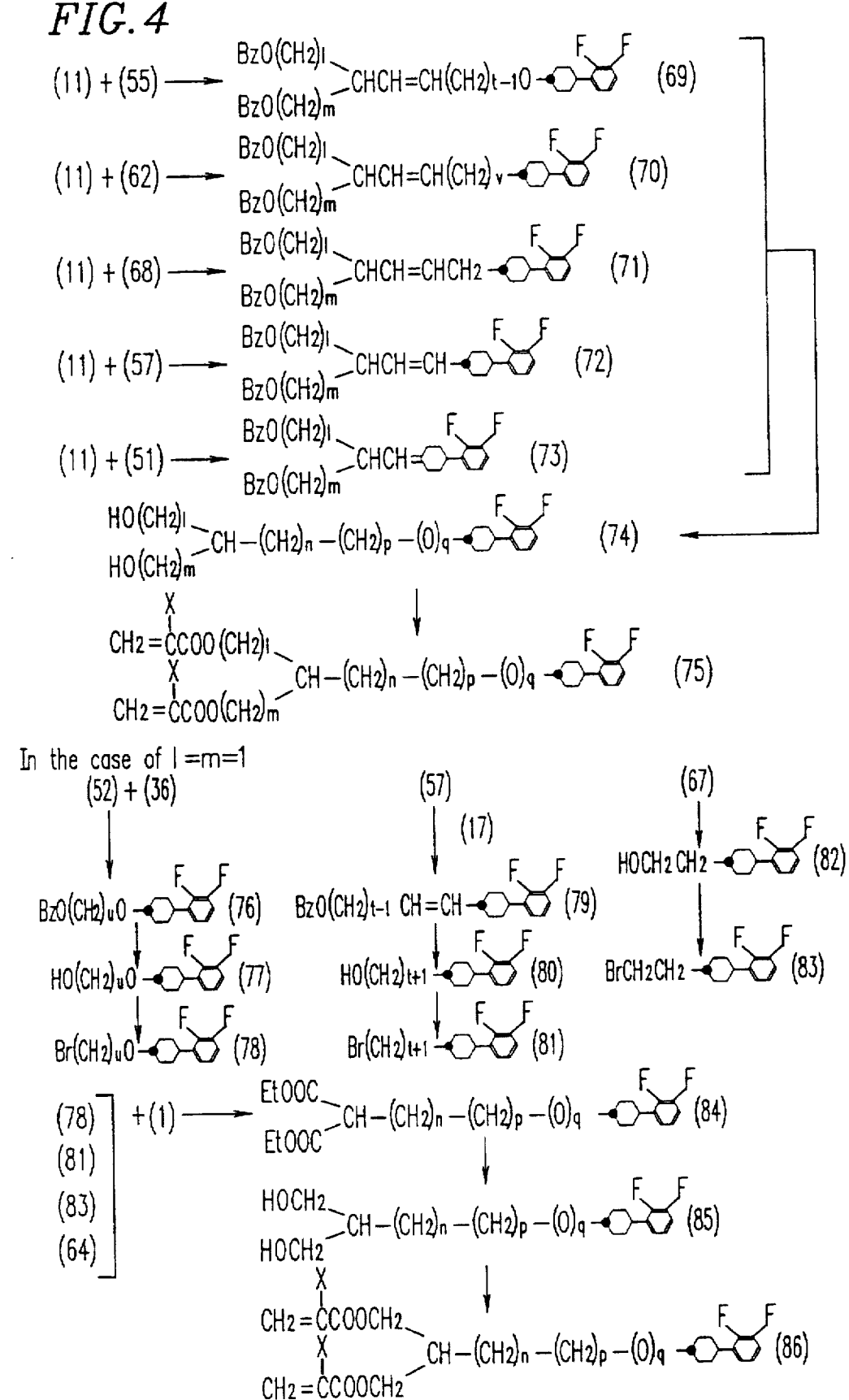
FIG. 4 is a reaction scheme diagram showing the continuation of Synthesis route 2.

An embodiment where, in Formula (I), Y is a single bond, $R^A$ is represented by Formula (III), and s=0 will be described. FIGS. 3 and 4 schematically show Synthesis route 2.

In the case of l, m≠1, butyllithium is allowed to react with the compound (12) to obtain a lithium salt. The lithium salt is condensed with a commercially available compound (47) to obtain a compound (48). The compound (48) is dehydrated with p-toluenesulfonic acid to obtain a compound (49). The compound (49) is hydrogenated in the presence of a palladium catalyst to obtain a compound (50). The protecting group of the compound (50) is removed under acidic conditions to obtain a compound (51). The compound (51) is reduced with sodium borohydride and is purified by recrystallization, column chromatography, etc. to obtain a compound (52). The compound (52) and the compound (17) are subjected to an etherification under alkaline conditions to obtain a compound (53). The compound (53) is hydrogenated in the presence of a palladium catalyst to obtain a compound (54). The compound (54) is oxidized to obtain a compound (55).

(Methoxymethyl)triphenylphosphonium chloride is allowed to react with the compound (51) to obtain a compound (56). Thereafter, the compound (56) is hydrolyzed under acidic conditions and subjected to an isomerization under alkaline conditions to obtain a compound (57). The compound (57) and a compound (59) obtained by benzylating the compound (58) are subjected to a Wittig reaction to obtain a compound (60). The compound (60) is hydrogenated in the presence of a palladium catalyst to obtain a compound (61). The compound (61) is oxidized with PCC to obtain a compound (62).

The compound (57) is reduced with sodium borohydride to obtain a compound (63). Thereafter, the compound (63) is brominated with carbon tetrabromide to obtain a compound (64). The compound (64) is reacted with sodium cyanide to obtain a compound (65). The compound (65) is hydrolyzed under alkaline conditions to obtain a carboxylic acid (compound (66)). Thereafter, the compound (66) is heated in methanol under acidic conditions to obtain a compound (67). The compound (67) is reduced with isobutylaluminium hydride (DIBAH) to obtain a compound (68). The compound (68) can also be obtained by reducing the compound (67) with lithium borohydride to obtain a compound (82) and oxidizing the compound (82) with PCC.

The compound (11) is subjected to a Wittig reaction with the compounds (55), (62), (68), (57), and (51), respectively, whereby compounds (69), (70), (71), (72), and (73) are obtained. These compounds are hydrogenated in the presence of a palladium catalyst to obtain a compound (74). Thereafter, acryloyl chloride or methacryloyl chloride is allowed to react with the compound (74) to obtain a compound (75). The compound (75) can also be obtained by condensation using DCC or Mitsunobu reaction between the compound (74) and acrylic acid or methacrylic acid.

In the case of l=m=1: the compound (52) and the compound (36) are subjected to an etherification under alkaline conditions to obtain a compound (76). The compound (76) is hydrogenated to obtain a compound (77). Thereafter, the compound (77) is brominated with carbon tetrabromide to obtain a compound (78). On the other hand, the compound (57) and the compound (17) are subjected to a Wittig reaction to obtain a compound (79). Hydrogen gas is allowed to react with the compound (79) in the presence of a palladium catalyst to obtain a compound (80). Then, the compound (80) is brominated with carbon tetrabromide or the like to obtain a compound (81).

The compound (67) is reduced to obtain a compound (82) and is brominated in the same as the above to obtain a compound (83).

The compound (1) is subjected to a condensation with the compounds (78), (81), (83), and (64), respectively, under alkaline conditions to obtain a compound (84). The compound (84) is reduced with lithium borohydride to obtain a compound (85). Thereafter, acryloyl chloride or methacryloyl chloride is allowed to react with the compound (85) to obtain a compound (86). The compound (86) can also be obtained by condensation using DCC or Mitsunobu reaction between the compound (85) and acrylic acid or methacrylic acid.

Synthesis route 3

An embodiment where, in Formula (I), Y is —COO—, $R^4$ is represented by Formula (II), and s=0 will be described. FIG. 5 schematically shows Synthesis route 3.

In the case of 1, m≠1: the compound (10) is reacted with sodium cyanide to obtain a compound (87). The compound (87) is hydrolyzed under alkaline conditions to obtain a compound (88).

A hydroxyl group of the compound (34) is protected with 3,4-dihydro-2H-pyran (THP) to obtain a compound (89). A Grignard reagent of the compound (89) is prepared. Thereafter, the Grignard reagent is subjected to a coupling reaction with the compound (10) in the presence of a copper catalyst to obtain a compound (90). The protecting group is removed under acidic conditions to obtain a compound (91). Thereafter, the compound (91) is oxidized with PCC to obtain a compound (92). Furthermore, the compound (92) is oxidized with potassium permanganate or the like to obtain a compound (93).

The compound (15) and the compound (36) are subjected to an etherification to obtain a compound (94). The compound (94) is debenzylated with hydrogen gas in the presence of a palladium catalyst to obtain a compound (95).

The compound (8) is hydrolyzed under alkaline conditions to obtain a compound (96).

The compounds (96), (88), and (93) are respectively converted into an acid chloride thereof and subjected to an esterification with the compounds (15), (42), (38), and (95), whereby a compound (97) is obtained. The compound (97) can also be obtained by condensation using DCC or Mitsunobu reaction between the compounds (96), (88), and (93) and the compounds (15), (42), (38), and (95). The compound (97) is debenzylated with hydrogen gas to obtain a compound (98). Then, acryloyl chloride or methacryloyl chloride is allowed to react with the compound (98) to obtain a compound (99). The compound (99) can also be obtained by condensation using DCC or Mitsunobu reaction between the compound (98) and acrylic acid or methacrylic acid.

Synthesis route 4

An embodiment where, in Formula (I), Y is —COO—, $R^4$ is represented by Formula (III), and s=0 will be described. FIG. 6 schematically shows Synthesis route 4.

In the case of 1, m≠1: the compounds (96), (88), and (93) are respectively converted into an acid chloride thereof and subjected to an esterification with the compounds (52), (63), (82), (77), and (80), whereby a compound (100) is obtained. The compound (100) can also be obtained by condensation using DCC or Mitsunobu reaction between the compounds (96), (88), and (93) and the compounds (52), (63), (82), (77), and (80). The compound (100) is debenzylated with hydrogen gas to obtain a compound (101). Then, acryloyl chloride or methacryloyl chloride is allowed to react with the compound (101) to obtain a compound (102). The compound (102) can also be obtained by condensation using DCC or Mitsunobu reaction between the compound (101) and acrylic acid or methacrylic acid.

Synthesis route 5

Figure 7:
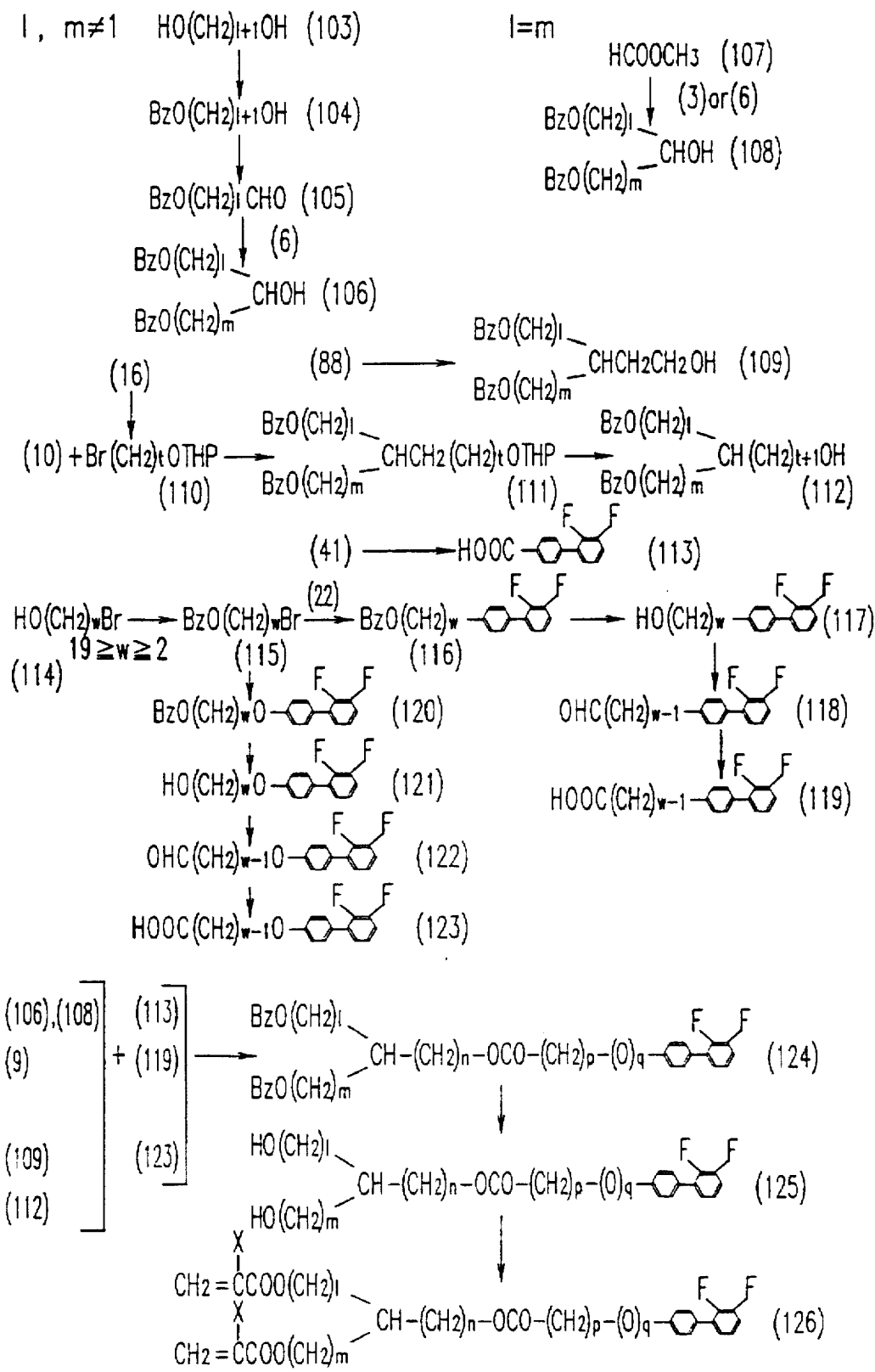
FIG. 7 is a reaction scheme diagram showing Synthesis route 5 of a polymerizable compound according to the present invention.

An embodiment where, in Formula (I), Y is —OCO—, $R^4$ is represented by Formula (II), and s=0 will be described. FIG. 7 schematically shows Synthesis route 5.

In the case of 1, m≠1: one of hydroxyl groups of a commercially available compound (103) is protected with a benzyl group to obtain a compound (104). The compound (104) is oxidized with PCC to obtain a compound (105). Then, a Grignard reagent of the compound (6) is allowed to react with the compound (105) to obtain a compound (106). In the case of l=m, a Grignard reagent of the compound (3) or the compound (6) is allowed to react with a commercially available compound (107) and treated with an acid to obtain a compound (108).

The compound (88) is reduced with lithium aluminium hydride (LAH) to obtain a compound (109).

A compound (110) obtained by protecting a hydroxyl group of the compound (16) with THP and the compound (10) are subjected to a coupling reaction in the presence of a copper catalyst to obtain a compound (111). By removing the protecting group from the compound (111) under acidic conditions, a compound (112) is obtained.

The compound (41) is hydrolyzed under alkaline conditions to obtain a compound (113).

A compound (115) obtained by protecting the compound (114) with a benzyl group and the Grignard reagent of the compound (22) are subjected to a coupling reaction to obtain a compound (116). The compound (116) is hydrogenated to remove the protecting group, thereby obtaining a compound (117). The compound (117) is oxidized with PCC to obtain a compound (118). Thereafter, the compound (118) is oxidized with potassium permanganate or the like to obtain a compound (119). The compound (115) and the compound (15) are subjected to an etherification to obtain a compound (120). Thereafter, the compound (120) is hydrogenated to remove a benzyl group, thereby obtaining a compound (121). The compound (121) is oxidized with PCC to obtain a compound (122). The compound (122) is oxidized with potassium permanganate or the like to obtain a compound (123).

The compounds (113), (119), and (123) are respectively converted into an acid chloride thereof and subjected to an esterification with the compounds (106), (108), (9), (109), and (112), whereby a compound (124) is obtained. The compound (124) can also be obtained by condensation using DCC or Mitsunobu reaction between the compounds (113), (119), and (123) and the compounds (106), (108), (9), (109), and (112). The compound (124) is debenzylated with hydrogen gas to obtain a compound (125). Then, acryloyl chloride or methacryloyl chloride is allowed to react with the compound (125) to obtain a compound (126). The compound (126) can also be obtained by condensation using DCC or Mitsunobu reaction between the compound (125) and acrylic acid or methacrylic acid.

Synthesis route 6

An embodiment where, in Formula (I), Y is —OCO—, $R^4$ is represented by Formula (III), and s=0 will be described. FIG. 8 schematically shows Synthesis route 6.

In the case of 1, m≠1: the compound (57) is oxidized with potassium permanganate or the like to obtain a compound (127). The compound (57) and the compound (36) are subjected to a Wittig reaction to obtain a compound (128). The compound (128) is hydrogenated in the presence of a palladium catalyst to obtain compound (129). The compound (129) is oxidized with PCC to obtain a compound (130). The compound (130) is oxidized with potassium permanganate or the like to obtain a compound (131).

The compound (52) and the compound (115) are subjected to an etherification under alkaline conditions to obtain a compound (132). The compound (132) is debenzylated by hydrogenation to obtain a compound (133). The compound (133) is oxidized with PCC to obtain a compound (134). The compound (134) is oxidized with potassium permanganate to obtain a compound (135).

The compounds (127), (66), (131), and (135) are respectively converted into an acid chloride thereof and subjected to an esterification with the compounds (106), (108), (9), (109), and (112), whereby a compound (136) is obtained. The compound (136) can also be obtained by condensation using DCC or Mitsunobu reaction between the compounds (127), (66), (131), and (135) and the compounds (106), (108), (9), (109), and (112). The compound (136) is debenzylated with hydrogen gas to obtain a compound (137). Then, acryloyl chloride or methacryloyl chloride is allowed to react with the compound (137) to obtain a compound (138). The compound (138) can also be obtained by condensation using DCC or Mitsunobu reaction between the compound (137) and acrylic acid or methacrylic acid.

Synthesis route 7

An embodiment where, in Formula (I), Y is —O—, $R^A$ is represented by Formula (II), and s=0 will be described. FIG. 9 schematically shows Synthesis route 7.

In the case of l, m≠1: the compounds (109) and (112) are brominated with carbon tetrabromide to obtain compounds (139) and (140), respectively. The compounds (106), (108), (9), (109), and (112) are subjected to an etherification with the compounds (43), (39), and (35) to obtain a compound (141). Alternatively, the compounds (10), (139), and (140) are subjected to an etherification with the compounds (15), (42), (38), and (95) to obtain a compound (141). The compound (141) can also be obtained by an etherification using a tosylate instead of the compounds (10), (139), and (140). The tosylate is obtained by allowing p-toluenesulfonyl chloride to react with the compounds (106), (108), (9), (109), and (112). The compound (141) is hydrogenated in the presence of a palladium catalyst to obtain a compound (142). Then, acryloyl chloride or methacryloyl chloride is allowed to react with the compound (142) to obtain a compound (143). The compound (143) can also be obtained by condensation using DCC or Mitsunobu reaction between the compound (142) and acrylic acid or methacrylic acid.

Synthesis route 8

An embodiment where, in Formula (I), Y is —O—, $R^A$ is represented by Formula (III), and s=0 will be described. FIG. 10 schematically shows Synthesis route 8.

In the case of l, m≠1: the compounds (106), (108), (9), (109), and (112) are subjected to an etherification with the compounds (64), (83), (81), and (78) to obtain a compound (144). Alternatively, the compounds (10), (139), and (140) are subjected to an etherification with the compounds (52), (63), (82), (80), and (77) to obtain a compound (144). The compound (144) can also be obtained by an etherification using a tosylate instead of the compounds (10), (139), and (140). The tosylate is obtained by allowing p-toluenesulfonyl chloride to react with the compounds (106), (108), (9), (109), and (112). The compound (144) is hydrogenated in the presence of a palladium catalyst to obtain a compound (145). Then, acryloyl chloride or methacryloyl chloride is allowed to react with the compound (145) to obtain a compound (146). The compound (146) can also be obtained by condensation using DCC or Mitsunobu reaction between the compound (145) and acrylic acid or methacrylic acid.

Synthesis route 9

Figure 11:
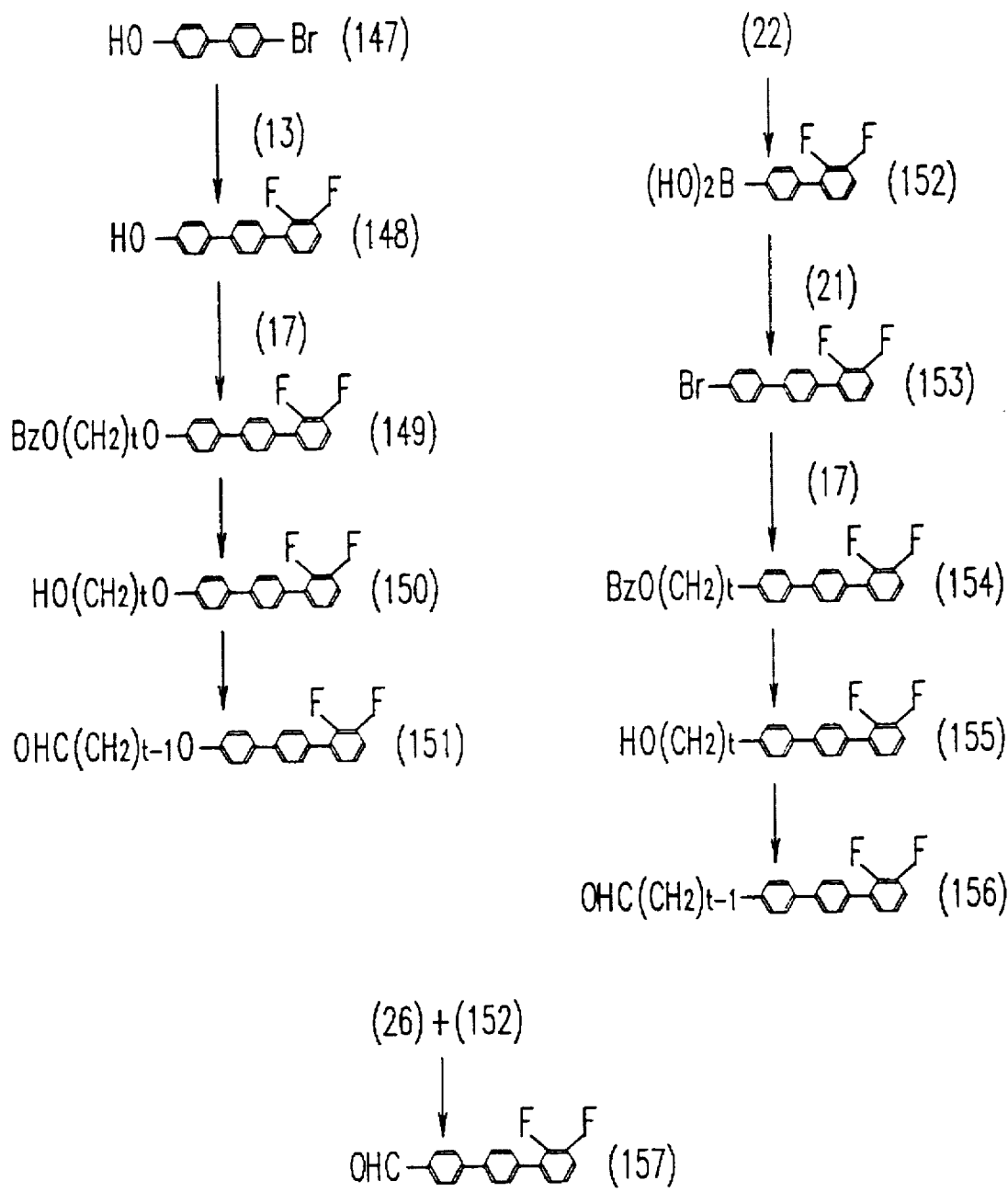
FIG. 11 is a reaction scheme diagram showing Synthesis route 9 of a polymerizable compound according to the present invention.
Figure 12:
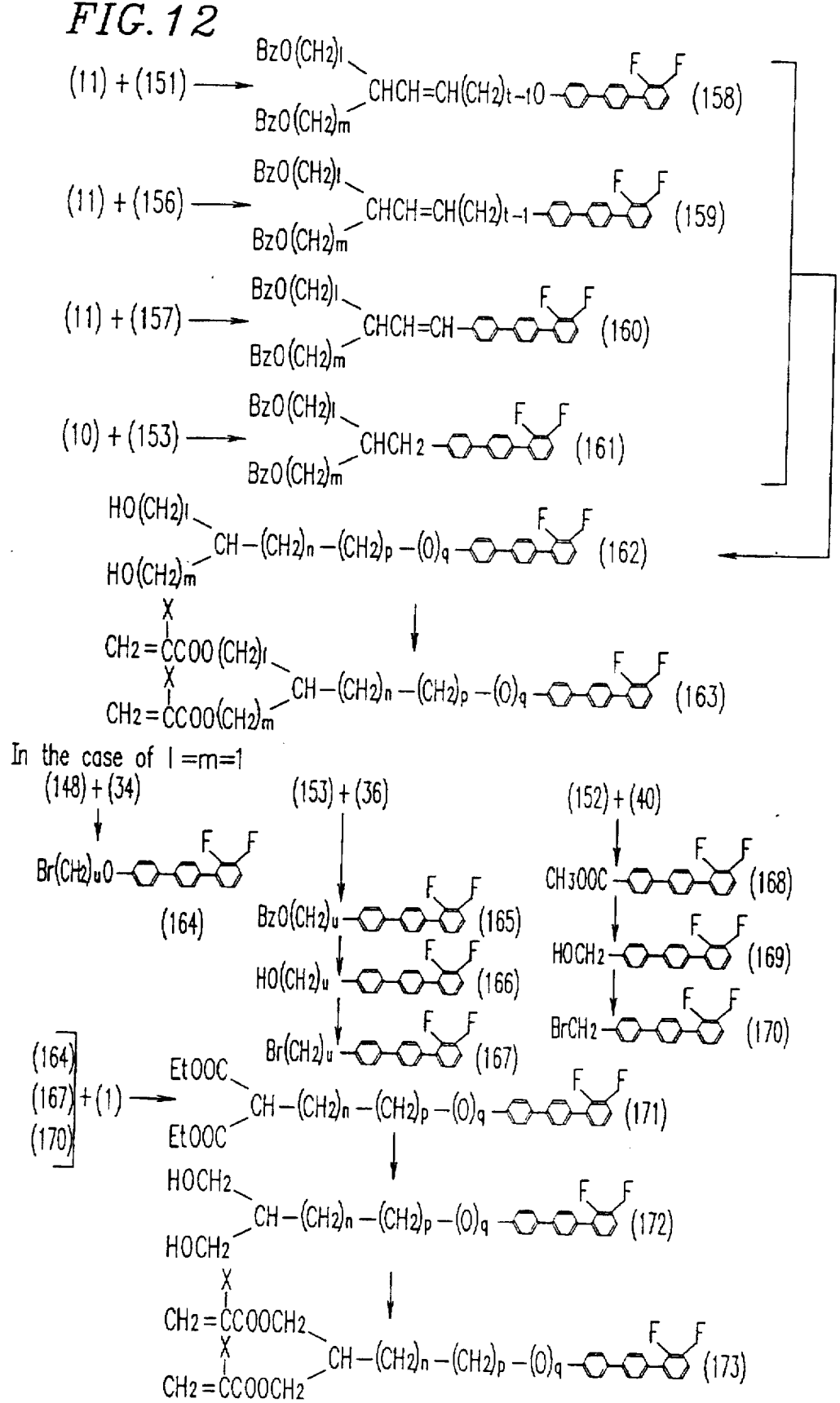
FIG. 12 is a reaction scheme diagram showing the continuation of Synthesis route 9.

An embodiment where, in Formula (I), Y is a single bond, and $R^A$ and $R^B$ are represented by Formula (II) will be described. FIGS. 11 and 12 schematically show Synthesis route 9.

In the case of l, m≠1: a commercially available compound (147) and the compound (13) are subjected to a coupling reaction to obtain a compound (148). The compound (148) and the compound (17) are etherified under alkaline conditions to obtain a compound (149). The compound (149) is debenzylated with hydrogen gas to obtain a compound (150). The compound (150) is oxidized with PCC to obtain a compound (151).

Trimethyl borate is allowed to react with the Grignard reagent of the compound (22) and hydrolyzed with dilute sulfuric acid to obtain a compound (152). The compound (152) and the compound (21) are subjected to a coupling reaction to obtain a compound (153). A Grignard reagent of the compound (153) and the compound (17) are subjected to a coupling reaction in the presence of a copper catalyst to obtain a compound (154). The compound (154) is hydrogenated to remove a benzyl group to obtain a compound (155). The compound (155) is oxidized with. PCC to obtain a compound (156).

The compound (26) and the compound (152) are subjected to a coupling reaction in the presence of a palladium catalyst to obtain a compound (157).

The compound (11) and the compounds (151), (156), and (157) are subjected to a Wittig reaction to obtain compounds (158), (159), and (160), respectively. On the other hand, the Grignard reagent of the compound (153) and the compound (10) are subjected to a coupling reaction to obtain a compound (161). The compounds (158), (159), (160), and (161) are hydrogenated in the presence of a palladium catalyst to obtain a compound (162). Then, acryloyl chloride or methacryloyl chloride is allowed to react with the compound (162) to obtain a compound (163). The compound (163) can also be obtained by condensation using DCC or Mitsunobu reaction between the compound (162) and acrylic acid or methacrylic acid.

In the case of l=m=1: the compound (148) and the compound (34) are subjected to Mitsunobu reaction to obtain a compound (164).

The Grignard reagent of the compound (153) and the compound (36) are subjected to a coupling reaction to obtain a compound (165). The compound (165) is hydrogenated in the presence of a palladium catalyst to obtain a compound (166). The compound (166) is brominated with carbon tetrabromide to obtain a compound (167). On the other hand, the compound (152) and the compound (40) are subjected to a coupling reaction to obtain a compound (168). The compound (168) is reduced with lithium borohydride to obtain a compound (169). The compound (169) is brominated with hydrobromic acid or phosphorus tribromide to obtain a compound (170).

The compounds (164), (167), and (170) are subjected to a condensation with the compound (1) under alkaline conditions to obtain a compound (171). The compound (171) is reduced with lithium borohydride to obtain a compound (172). The compound (172) is esterified with acryloyl chloride or methacryloyl chloride to obtain a compound (173). The compound (173) can also be obtained by condensation using DCC or Mitsunobu reaction between the compound (172) and acrylic acid or methacrylic acid.

Synthesis route 10

An embodiment where, in Formula (I), Y is a single bond, $R^A$ is represented by Formula (III), and $R^B$ is represented by Formula (II) or (III) will be described. FIGS. 13 and 14 schematically show Synthesis route 10.

In the case of l, m≠1: the compound (174) is oxidized with sodium dichromate to obtain a compound (175). One of oxo groups of the compound (175) is protected with ethylene glycol to obtain a compound (176). The compound (176) is condensed with a lithium salt of the compound (12) to obtain a compound (177). The compound (177) is dehydrated with p-toluenesulfonic acid to obtain a compound (178). The compound (178) is hydrogenated in the presence of a palladium catalyst to obtain a compound (179). The protecting group is removed from the compound (179) under acidic conditions to obtain a compound (180).

The compound (180) is reduced with sodium borohydride, and a trans-isomer is isolated from the resultant compound (180) by recrystallization or column chromatography to obtain a compound (181). The compound (47) is condensed with the Grignard reagent of the compound (22) to obtain a compound (182). In the same way as in a process of obtaining the compound (181) from the compound (177), a compound (186) is obtained from the compound (182).

The compounds (181) and (186) and the compound (17) are subjected to an etherification to obtain a compound (187). The compound (187) is debenzylated and oxidized with PCC to obtain a compound (189).

(Methoxymethyl)triphenylphosphonium chloride is allowed to react with the compounds (180) and (185) to obtain a compound (190). Thereafter, the compound (190) is hydrolyzed under acidic conditions and subjected to an isomerization under alkaline conditions to obtain a compound (191). The compound (191) and the compound (59) are subjected to a Wittig reaction to obtain a compound (192). The compound (192) is hydrogenated in the presence of a palladium catalyst to obtain a compound (193). The compound (193) is oxidized with PCC to obtain a compound (194).

The compound (191) is reduced with sodium borohydride to obtain a compound (195). Thereafter, the compound (195) is brominated with carbon tetrabromide to obtain a compound (196). The compound (196) is converted into a compound (197) with sodium cyanide. The compound (197) is hydrolyzed under alkaline conditions to obtain a carboxylic acid (compound (198)). Thereafter, the compound (198) is heated in methanol under acidic conditions to obtain a compound (199). The compound (199) is reduced with diisobutylaluminium hydride (DIBAH) to obtain a compound (200). The compound (200) can also be obtained by reducing the compound (199) with lithium borohydride to obtain a compound (214) and oxidizing the compound (214) with PCC.

The compound (11) is subjected to a Wittig reaction with the compounds (189), (194), (200), (191), and (180) and (185), respectively, whereby compounds (201), (202), (203), (204), and (205) are obtained. These compounds are hydrogenated in the presence of a palladium catalyst to obtain a compound (206). Thereafter, acryloyl chloride or methacryloyl chloride is allowed to react with the compound (206) to obtain a compound (207). The compound (207) can also be obtained by condensation using DCC or Mitsunobu reaction between the compound (206) and acrylic acid or methacrylic acid.

In the case of l=m=1: the compounds (181) and (186) and the compound (36) are subjected to an etherification under alkaline conditions to obtain a compound (208). The compound (208) is hydrogenated to obtain a compound (209). Thereafter, the compound (209) is brominated with carbon tetrabromide to obtain a compound (210).

The compound (191) and the compound (17) are subjected to a Wittig reaction to obtain a compound (211). Hydrogen gas is allowed to react with the compound (211) in the presence of a palladium catalyst to obtain a compound (212). Then, the compound (212) is brominated with carbon tetrabromide or the like to obtain a compound (213).

The compound (199) is reduced to obtain a compound (214). The compound (214) is brominated in the same as the above to obtain a compound (215).

The compound (1) is subjected to a condensation with the compounds (210), (213), (215), and (196), respectively, under alkaline conditions to obtain a compound (216). The compound (216) is reduced with lithium borohydride to obtain a compound (217). Thereafter, acryloyl chloride or methacryloyl chloride is allowed to react with the compound (217) to obtain a compound (218). The compound (218) can also be obtained by condensation using DCC or Mitsunobu reaction between the compound (217) and acrylic acid or methacrylic acid.

Synthesis route 11

Figure 15:
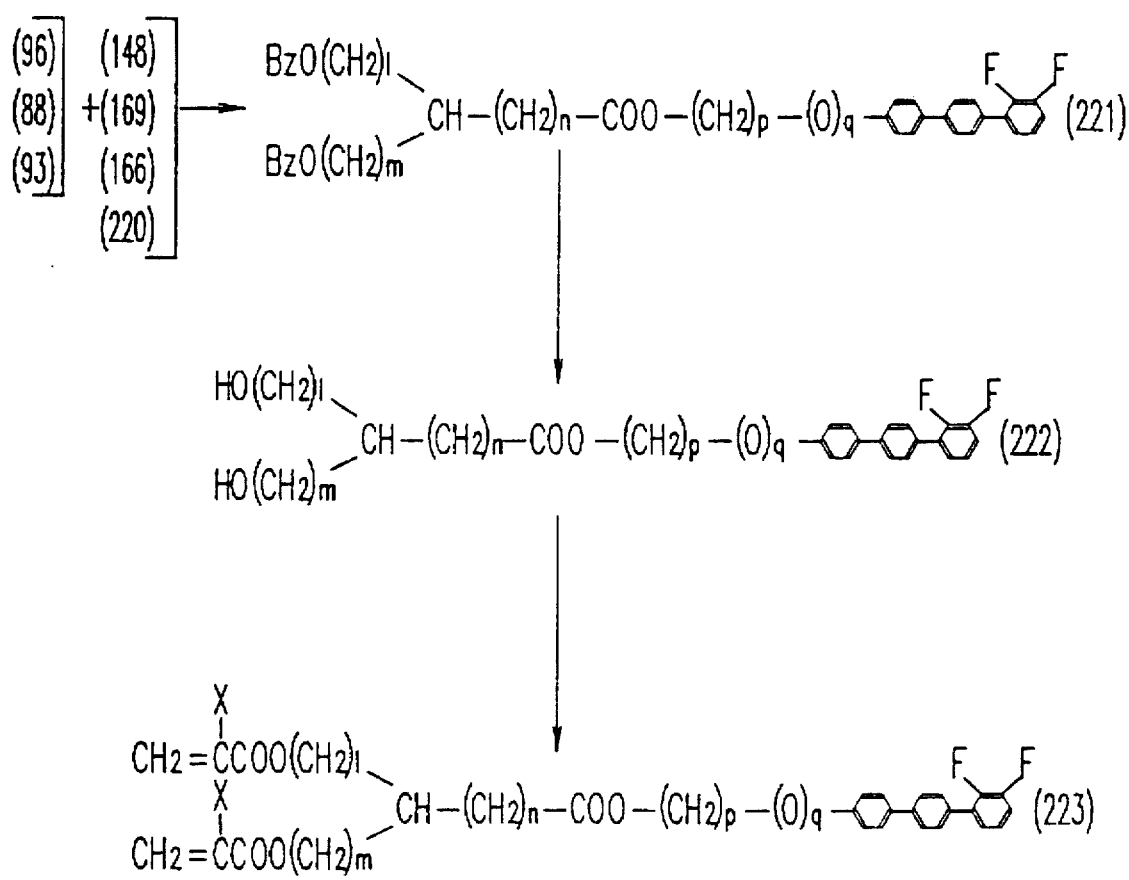
FIG. 15 is a reaction scheme diagram showing Synthesis route 11 of a polymerizable compound according to the present invention.

An embodiment where, in Formula (I), Y is —COO— and $R^A$ and $R^B$ are represented by Formula (II) will be described. FIG. 15 schematically shows Synthesis route 11.

In the case of l, m≠1: the compound (148) and the compound (36) are subjected to an etherification to obtain a compound (219). The compound (219) is debenzylated with hydrogen gas to obtain a compound (220).

The compounds (96), (88), and (93) are respectively converted into an acid chloride thereof and subjected to an esterification with the compounds (148), (169), (166), and (220), whereby a compound (221) is obtained. The compound (221) can also be obtained by condensation using DCC or Mitsunobu reaction between the compounds (96), (88), and (93) and the compounds (148), (169), (166), and (220). The compound (221) is debenzylated with hydrogen gas to obtain a compound (222). Then, acryloyl chloride or methacryloyl chloride is allowed to react with the compound (222) to obtain a compound (223). The compound (223) can also be obtained by condensation using DCC or Mitsunobu reaction between the compound (222) and acrylic acid or methacrylic acid.

Synthesis route 12

Figure 16:
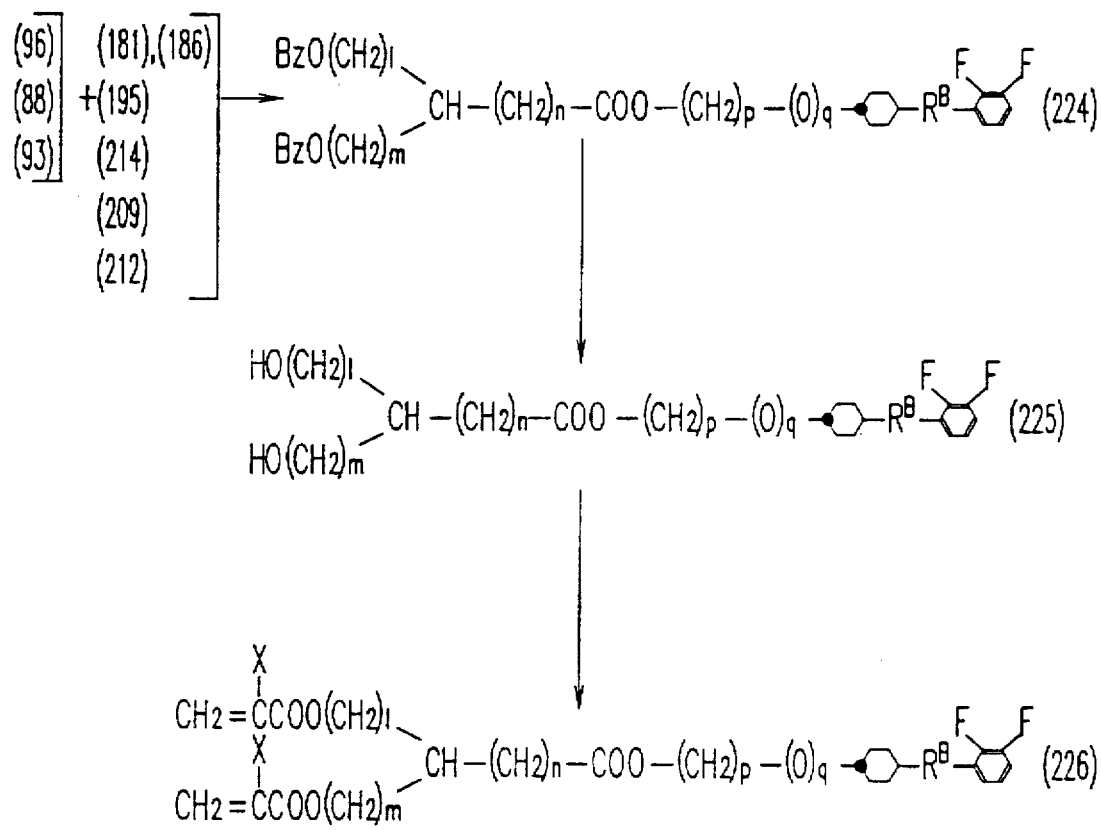
FIG. 16 is a reaction scheme diagram showing Synthesis route 12 of a polymerizable compound according to the present invention.

An embodiment where, in Formula (I), Y is —COO—, $R^A$ is represented by Formula (III), and $R^B$ is represented by Formula (II) or (III) will be described. FIG. 16 schematically shows Synthesis route 12.

In the case of l, m≠1: the compounds (96), (88), and (93) are respectively converted into an acid chloride thereof and subjected to an esterification with the compounds (181), (186), (195), (214), (209), and (212), whereby a compound (224) is obtained. The compound (224) can also be obtained by condensation using DCC or Mitsunobu reaction between the compounds (96), (88), and (93) and the compounds (181), (186), (195), (214), (209), and (212). The compound (224) is debenzylated with hydrogen gas to obtain a compound (225). Then, acryloyl chloride or methacryloyl chloride is allowed to react with the compound (225) to obtain a compound (226). The compound (226) can also be obtained by condensation using DCC or Mitsunobu reaction between the compound (225) and acrylic acid or methacrylic acid.

Synthesis route 13

An embodiment where, in Formula (I), Y is —OCO—, and $R^A$ and $R^B$ are represented by Formula (II) will be described. FIG. 17 schematically shows Synthesis route 13.

In the case of l, m≠1: the compound (168) is hydrolyzed under alkaline conditions to obtain a compound (227).

The compound (115) and the compound (148) are subjected to an etherification to obtain a compound (228). The compound (228) is hydrogenated to remove a benzyl group, whereby a compound (229) is obtained. The compound (229) is oxidized with PCC to obtain a compound (230). The compound (230) is oxidized with potassium permanganate or the like to obtain a compound (231).

The compound (115) and the compound (153) are subjected to a coupling reaction to obtain a compound (232). The compound (232) is hydrogenated to remove a protecting group, whereby a compound (233) is obtained. The compound (233) is oxidized with PCC to obtain a compound (234). Thereafter, the compound (234) is oxidized with potassium permanganate or the like to obtain a compound (235).

The compounds (227), (231), and (235) are respectively converted into an acid chloride thereof and subjected to an esterification with the compounds (106), (108), (9), (109), and (112), whereby a compound (236) is obtained. The compound (236) can also be obtained by condensation using DCC or Mitsunobu reaction between the compounds (227), (231), and (235) and the compounds (106), (108), (9), (109), and (112). The compound (236) is debenzylated with hydrogen gas to obtain a compound (237). Then, acryloyl chloride or methacryloyl chloride is allowed to react with the compound (237) to obtain a compound (238). The compound (238) can also be obtained by condensation using DCC or Mitsunobu reaction between the compound (237) and acrylic acid or methacrylic acid.

Synthesis route 14

Figure 18:
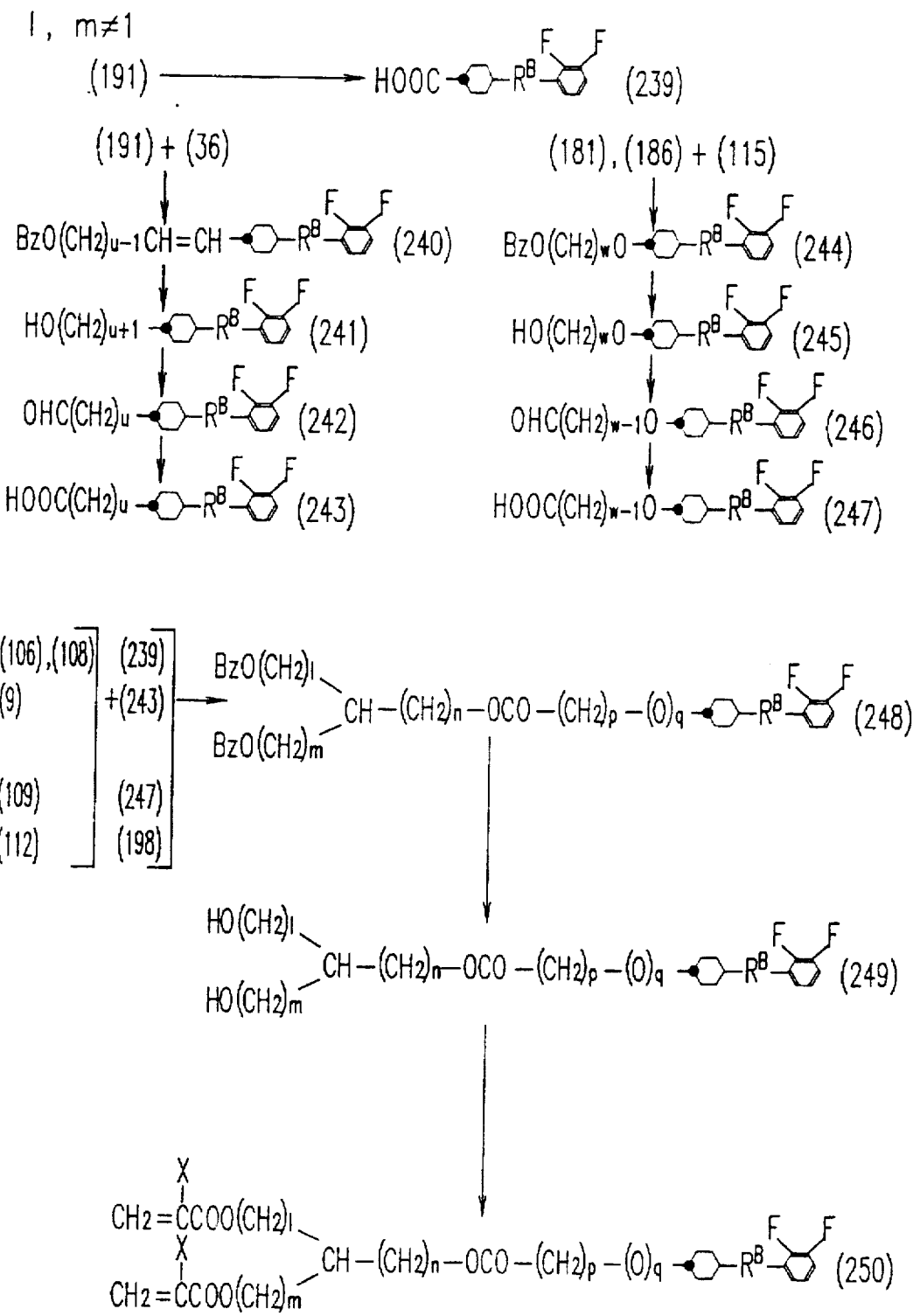
FIG. 18 is a reaction scheme diagram showing Synthesis route 14 of a polymerizable compound according to the present invention.

An embodiment where, in Formula (I), Y is —OCO—, $R^A$ is represented by Formula (III), and $R^B$ is represented by Formula (II) or (III) will be described. FIG. 18 schematically shows Synthesis route 14.

In the case of 1, m≠1: the compound (191) is oxidized with potassium permanganate or the like to obtain a compound (239).

The compound (191) is subjected to a Wittig reaction with the compound (36), whereby a compound (240) is obtained. The compound (240) is hydrogenated in the presence of a palladium catalyst to obtain a compound (241). The compound (241) is oxidized with PCC to obtain a compound (242). The compound (242) is oxidized with potassium permanganate or the like to obtain a compound (243).

The compounds (181) and (186) and the compound (115) are subjected to an etherification under alkaline conditions to obtain a compound (244). The compound (244) is debenzylated by hydrogenation to obtain a compound (245). The compound (245) is oxidized with PCC to obtain a compound (246). The compound (246) is oxidized with potassium permanganate to obtain a compound (247).

The compounds (239), (243), (247), and (198) are respectively converted into an acid chloride thereof and subjected to an esterification with the compounds (106), (108), (9), (109), and (112), whereby a compound (248) is obtained. The compound (248) can also be obtained by condensation using DCC or Mitsunobu reaction between the compounds (239), (243), (247), and (198) and the compounds (106), (108), (9), (109), and (112). The compound (248) is debenzylated with hydrogen gas to obtain a compound (249). Then, acryloyl chloride or methacryloyl chloride is allowed to react with the compound (249) to obtain a compound (250). The compound (250) can also be obtained by condensation using DCC or Mitsunobu reaction between the compound (249) and acrylic acid or methacrylic acid.

Synthesis route 15

Figure 19:
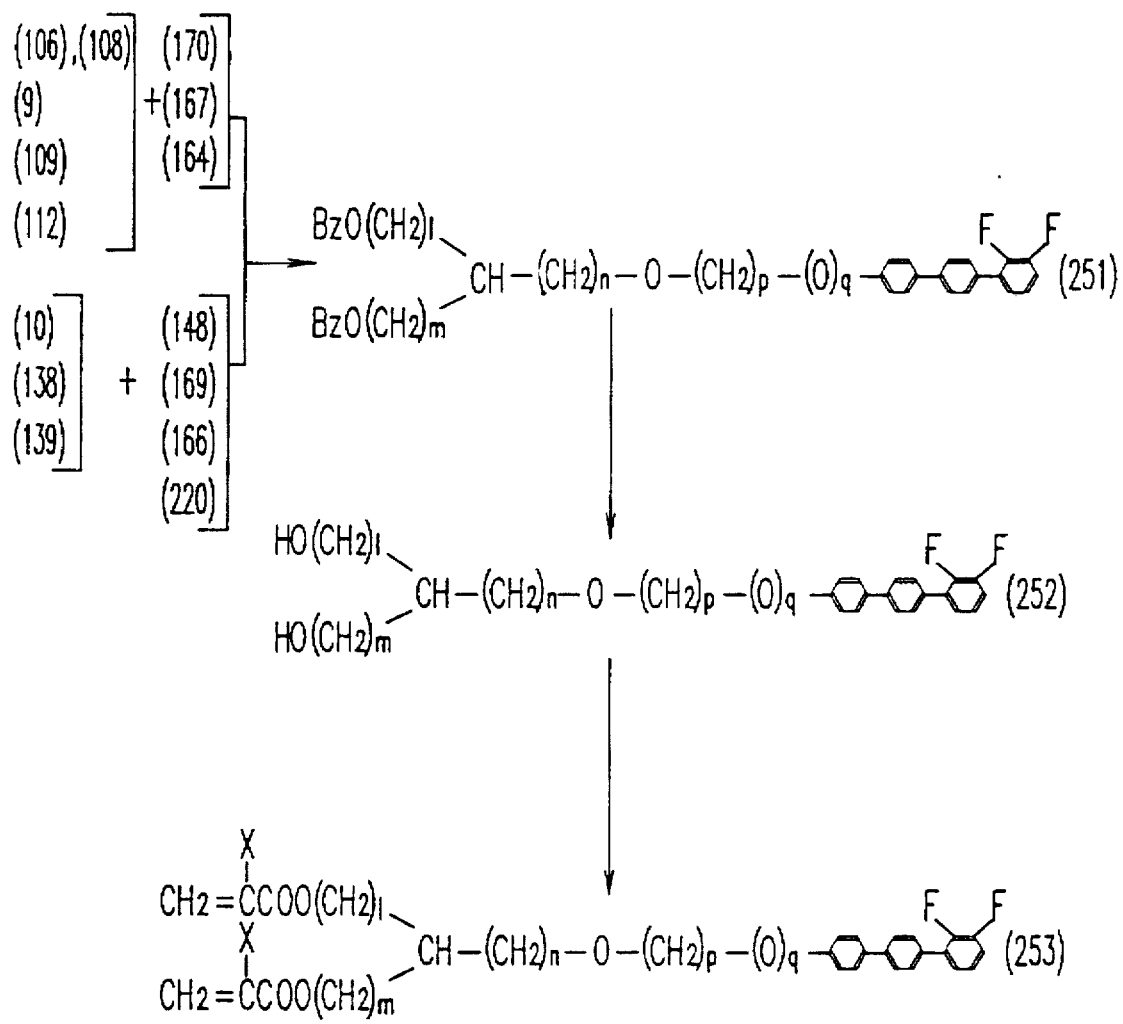
FIG. 19 is a reaction scheme diagram showing Synthesis route 15 of a polymerizable compound according to the present invention.

An embodiment where, in Formula (I), Y is —O—, and $R^A$ and $R^B$ are represented by Formula (II) will be described. FIG. 19 schematically shows Synthesis route 15.

In the case of 1, m≠1: the compounds (106), (108), (9), (109), and (112) are subjected to an etherification with the compounds (170), (167), and (164) to obtain a compound (251). Alternatively, the compounds (10), (139), and (140) are subjected to an etherification with the compounds (148), (169), (166), and (220) to obtain a compound (251). The compound (251) can also be obtained by an etherification using a tosylate instead of the compounds (10), (139), and (140). The tosylate is obtained by allowing p-toluenesulfonyl chloride to react with the compounds (106), (108), (9), (109), and (112). The compound (251) is hydrogenated in the presence of a palladium catalyst to obtain a compound (252). Then, acryloyl chloride or methacryloyl chloride is allowed to react with the compound (252) to obtain a compound (253). The compound (253) can also be obtained by condensation using DCC or Mitsunobu reaction between the compound (252) and acrylic acid or methacrylic acid.

Synthesis route 16

Figure 20:
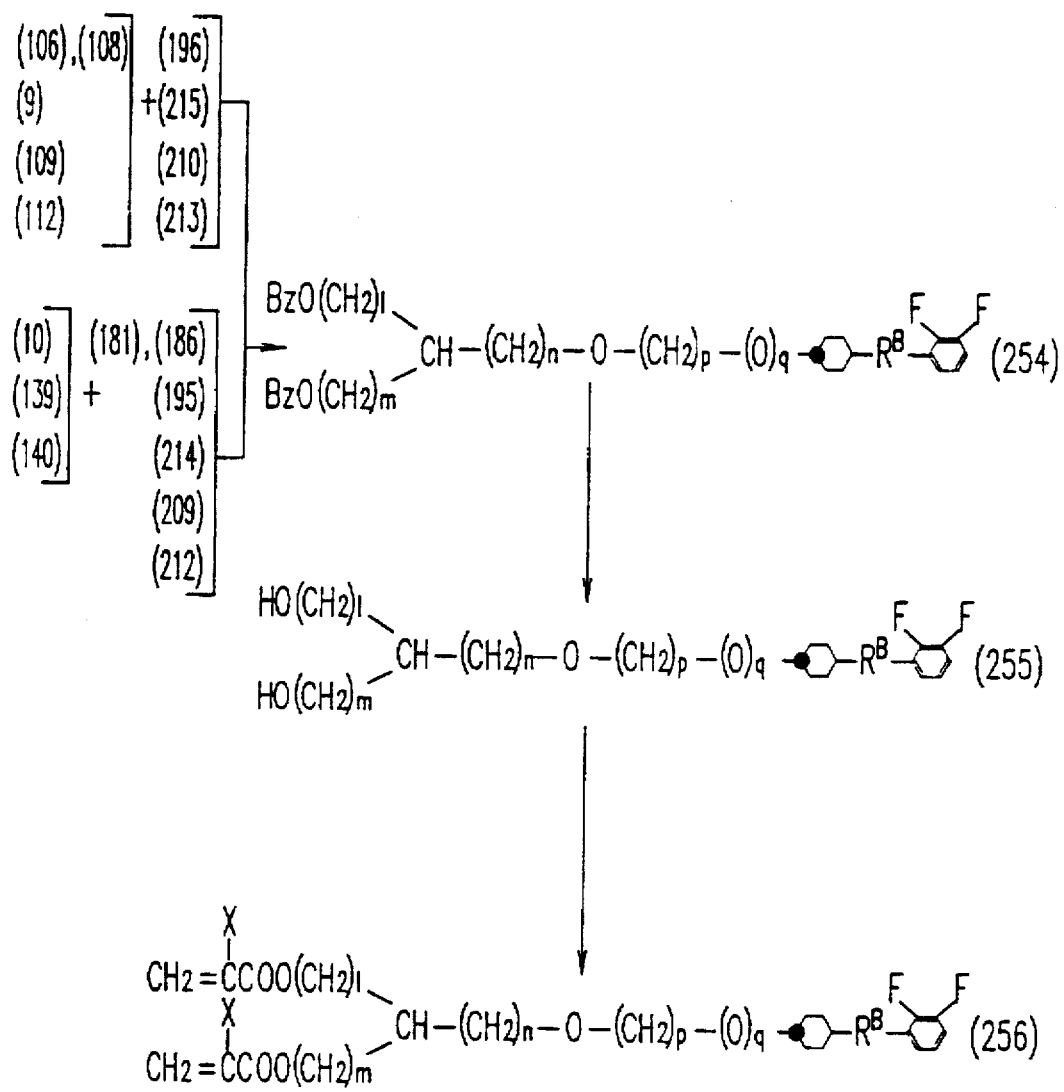
FIG. 20 is a reaction scheme diagram showing Synthesis route 16 of a polymerizable compound according to the present invention.

An embodiment where, in Formula (I), Y is —O—, $R^A$ is represented by Formula (III), and $R^B$ is represented by Formula (II) or (III) will be described. FIG. 20 schematically shows Synthesis route 16.

In the case of 1, m≠1: the compounds (106), (108), (9), (109), and (112) are subjected to an etherification with the compounds (196), (215), (210), and (213) to obtain a compound (254). Alternatively, the compounds (10), (139), and (140) are subjected to an etherification with the compounds (181), (186), (195), (214), (212), and (209) to obtain a compound (254). The compound (254) can also be obtained by an etherification using a tosylate instead of the compounds (10), (139), and (140). The tosylate is obtained by allowing p-toluenesulfonyl chloride to react with the compounds (106), (108), (9), (109), and (112). The compound (254) is hydrogenated in the presence of a palladium catalyst to obtain a compound (255). Then, acryloyl chloride or methacryloyl chloride is allowed to react with the compound (255) to obtain a compound (256). The compound (256) can also be obtained by condensation using DCC or Mitsunobu reaction between the compound (255) and acrylic acid or methacrylic acid.

Liquid crystal display device

The liquid crystal display device of the present invention includes a pair of substrates, at least one of which is transparent, and a liquid crystal layer including a polymer or a polymer wall interposed between the substrates and a liquid crystal region surrounded by the polymer or the polymer wall. The polymer or the polymer wall is made of a monomer containing at least one of the polymerizable compounds of the present invention as a polymerization precursor.

The liquid crystal material used in the present invention is not particularly limited as long as it is an organic mixture exhibiting a liquid crystal state in the vicinity of room temperature. Examples of the preferable liquid crystal material include nematic liquid crystal (liquid crystal for dual frequency driving, including liquid crystal of Δε<0), cholesteric liquid crystal (in particular, liquid crystal having selective reflection characteristics with respect to visible light), smectic liquid crystal, and discotic liquid crystal. Among these, nematic liquid crystal, cholesteric liquid crystal, or nematic liquid crystal with a chiral agent added thereto are particularly preferable because of their characteristics. The chiral agent is preferably added to nematic liquid crystal in such a manner that the liquid crystal molecules have a helical pitch of 10 μm or more, considering the hysteresis, uniformity, coloring due to dΔn (phase difference). Furthermore, since a photopolymerization is effected during the processing, liquid crystal having outstanding resistance against chemical reaction is preferable. Such liquid crystal has a functional group, such as a fluorine atom, in the compound. Examples of the liquid crystal include ZLI-4801-000, ZLI-4801-001, ZLI-4792, and MLC-6419 (produced by Merck KGaA). These liquid crystal materials can be used alone or in combination.

The mixing ratio of the liquid crystal material and the monomer at least containing the polymerizable compound of the present invention is preferably 60:40 to 98:2 in weight. When the amount of the monomer exceeds this ratio, liquid crystal regions which change with respect to a voltage applied to an electrode in a liquid crystal device decrease, so that a contrast is mostly insufficient. On the other hand, when the amount of the monomer is smaller than this ratio, polymer walls cannot be formed sufficiently; consequently, a practical problem of insufficient strength (e.g., pressure resistance, shock resistance) of a liquid crystal display device is caused.

The liquid crystal display device of the present invention can be produced, for example, in the following process. First, a liquid crystal cell having a transparent electrode made of ITO (complex of indium oxide and tin oxide; thickness: 50 nm) is produced. A predetermined photomask is placed on the cell. A homogeneous mixture of a monomer containing at least the polymerizable compound of the present invention and a liquid crystal material is introduced into the cell by capillary-injection, thereby producing a liquid crystal cell. Thereafter, the cell is irradiated with UV light (parallel light) through the photomask by means of a high-pressure mercury lamp while a voltage is applied between transparent electrodes, whereby the monomer is cured. Thus, a liquid crystal cell in which a liquid crystal region is surrounded by a polymer (wall) is produced. Polarizing plates are placed on both sides of the substrates of the liquid crystal cell in such a manner that the respective optical axes form a predetermined angle, whereby a liquid crystal display device is produced.

In a liquid crystal device obtained by using the polymerizable compound of the present invention, (1) since liquid crystal molecules are nearly upright with respect to the substrates (in the case of $\Delta\epsilon > 0$) under the application of a saturated voltage, polarizing plates have viewing angle characteristics; and (2) since a liquid crystal layer has a retardation $d \cdot \Delta n$, a region where viewing angle characteristics are insufficient can be present in the direction of 45° from the polarizing axis of the polarizing plate. The reason for (2) is as follows: Light entering in the axis direction has only an ordinary light component or an extraordinary light component when traversing a refractive index ellipsoid of the liquid crystal layer; however, in the case where light is incident in the direction of 45° from the polarizing axis of the polarizing plate, the light has both an ordinary light component and an extraordinary light component (corresponding to a state where polarizing axes of polarizing plates, disposed perpendicular to each other, seemingly constitute an angle larger than 90°), so that the light becomes elliptically polarized light, causing light leakage. Therefore, it is preferable to prescribe the retardation of the liquid crystal layer to be as small as possible so as to avoid elliptically polarized light. However, a transmittance $T_0$ under no application of a voltage is affected by the retardation of the liquid crystal layer, so that the retardation is preferably in the range of 300 nm to 650 nm in terms of the omnidirectional property of the viewing angle characteristics and the brightness of the cell. (When the retardation is 300 nm or less, the brightness under no application of a voltage cannot be kept, resulting in a dark display). The twist angle is preferably in the range of 45° to 150°, and more preferably in the vicinity of 90° at which the first minimum condition are satisfied so that the brightest display can be obtained.

When a liquid crystal display device is produced using the polymerizable compound of the present invention, the alignment of liquid crystal molecules becomes satisfactory; however, the orientation of the liquid crystal molecules can also be controlled by using various alignment methods. Examples of the alignment method which can be used in the present invention include a rubbing method in which a polymer material such as polyimide or an inorganic material is applied onto a substrate used for producing a liquid crystal cell, and the material is rubbed with a cloth; a vertical alignment method in which a compound having low surface tension is applied onto a substrate; an oblique alignment method in which $SiO_2$ or the like is obliquely vapor-deposited; a method using a horizontal alignment film without conducting a rubbing treatment; and a method using a non-treated substrate (i.e., a substrate merely provided with a transparent electrode).

As the substrate used for the liquid crystal display device of the present invention, either a transparent substrate or a non-transparent substrate can be used. Examples of the transparent substrate include a glass substrate and a plastic substrate made of a polymer film, etc. Examples of the non-transparent substrate include a substrate with a metal thin film formed thereon and a Si substrate. In the case of a reflection-type liquid crystal display device, a substrate with a metal thin film formed thereon is effective. The plastic substrate is preferably made from a material which does not absorb visible light. Examples of the material for the plastic substrate include PET, acrylic polymer, and polycarbonate. In the case of using a plastic substrate, the substrate itself can be provided with polarizing ability. Furthermore, different kinds of substrates can be combined to form a layered substrate. Irrespective of the kind, substrates having different thickness can be combined.

In the case where the liquid crystal display device produced in the above-described manner is further subjected to known liquid crystal orientation techniques such as rubbing or $SiO_2$ oblique deposition, it is possible to sandwich the liquid crystal display device with two polarizers to obtain a liquid crystal device in which any conventional alignment-controlled display mode having a high contrast and steep driving voltage characteristics (e.g., TN, STN, ECB, and ferroelectric liquid crystal devices) is accommodated as well as a liquid crystal layer including liquid crystal regions surrounded by polymer regions.

The liquid crystal molecules in a liquid crystal region of the liquid crystal display device thus produced can have any alignment state. Examples of the alignment state include an axis-symmetrical alignment, a radial or concentrical alignment, a spiral alignment, and a random alignment.

The liquid crystal display device of the present invention is not particularly limited, and can be driven by a simple matrix driving method or an active matrix driving method using an active element such as a-SiTFT, p-SiTFT, and MIM.

Hereinafter, the function of the present invention will be described.

In the case where a liquid crystal display device in a display mode with the alignment on substrates regulated is produced, using a mixture of a liquid crystal material and a polymerizable resin material such as a photocurable resin; a polymer layer including a polymer and liquid crystal is formed between an alignment film and a liquid crystal region. The polymer layer is generally likely to weaken the alignment regulating force of the alignment film with respect to liquid crystal molecules. When a polymer made from a monomer containing the polymerizable compound of the present invention is included in the polymer layer, a portion derived from the polymerizable compound of the present invention in the polymer has a structure similar to that of the liquid crystal material. Therefore, the polymer layer will have an ability to regulate the alignment of the liquid crystal molecules in the liquid crystal region. As a result, the alignment of the liquid crystal molecules is stabilized.

Figure 29:
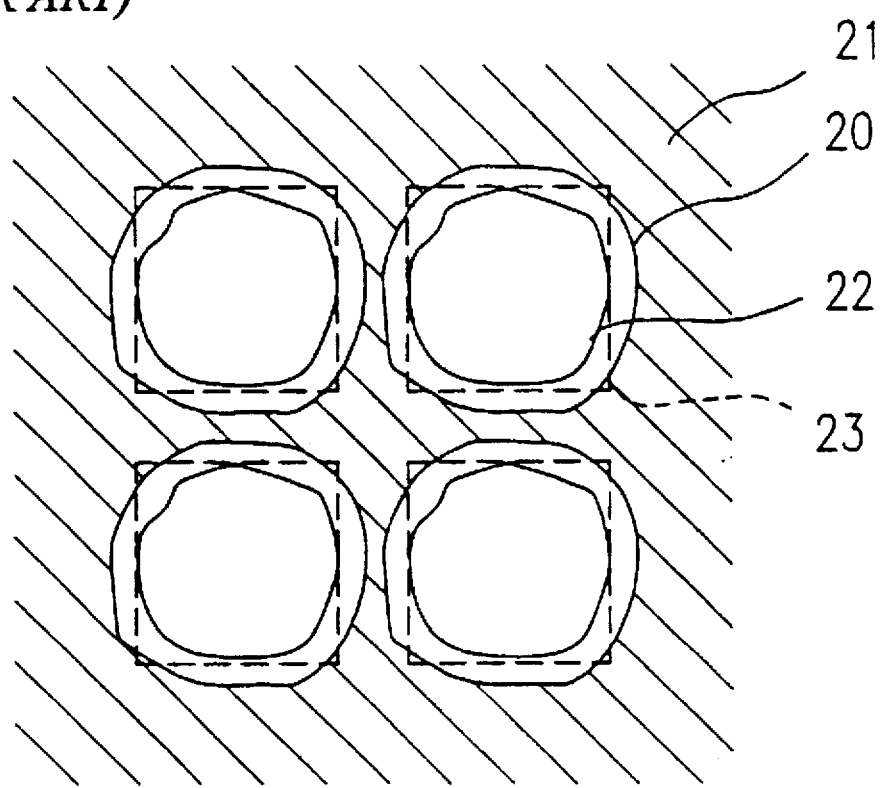
FIG. 29 is a schematic view illustrating the state where disclination lines are generated under the application of a voltage in the conventional liquid crystal display device.

In the liquid crystal display device in which the liquid crystal molecules in the liquid crystal region are aligned so as to be symmetric with respect to an axis (in the vertical direction of a substrate surface), in most cases, disclination lines are generated in the outer periphery of the liquid crystal region due to reverse tilt (see FIG. 29) under the application of a voltage. However, when the polymerizable compound of the present invention is used, the generation of disclination lines which worsen a black display level can be prevented under the application of a voltage. Furthermore, the polymerizable compound of the present invention is a polyfunctional compound having within its molecule a liquid crystal type structure and a branched polymerizable functional group, so that the polymerizable compound of the present invention is likely to form a three-dimensional network structure and has outstanding reactivity. Thus, the polyfunctional compound of the present invention possesses properties of a conventional monofunctional "polymerizable compound having within its molecule a liquid crystal type structure" while suppressing an unreacted compound from degrading the characteristics of a liquid crystal display device and improving a glass transition temperature (Tg) of a polymer. Therefore, the polymerizable compound of the present invention is effective in terms of the display characteristics and strength (e.g., pressure resistance and heat resistance) of the liquid crystal display device. In addition, the polymerizable compound of the present invention is also effective for overcoming conventional problems such as the decrease in response time and the degradation of the threshold characteristics or steepness of the voltage-transmittance characteristics caused by the addition of the polymerizable compound. As described above, by using the polymerizable compound of the present invention, the display characteristics of the liquid crystal display device (e.g., viewing angle characteristics, contrast, response time, threshold characteristics, steepness), strength (e.g., pressure resistance and shock resistance) and heat resistance can remarkably improve.

As well as studying the effects provided by the use of the polymerizable compound of the present invention, the present inventors also studied a process for combining the polymerizable compound with a liquid crystal material, thereby obtaining an arrangement in which a liquid crystal droplet (liquid crystal region) surrounded by a polymer has almost the same size as that of a pixel and about one liquid crystal droplet is placed in one pixel in a regular manner. As a result, the inventors found the following two methods most effective.

(1) a method in which UV light is radiated having a spatial regularity having portions with varying levels of high and low, the portions, having substantially the same size as that of the diameter of liquid crystal droplets and therefore the size of pixels (i.e., UV light is selectively radiated by being partially intercepted in regions substantially corresponding to pixels) so as to form a liquid crystal display device having a liquid crystal layer including liquid crystal regions surrounded by a polymer wall; and (2) a method in which the surface free energy of the substrates is controlled in patterns for forming a liquid crystal display device having a liquid crystal layer including liquid crystal regions surrounded by a polymer wall (e.g., a method in which a material having different levels of surface free energy for the liquid crystal phase (e.g., liquid crystal material) and the isotropic phase (e.g., polymer material) is previously patterned onto a subst rate to form a surface pattern which is utilized in disposing a liquid crystal material on the substrate).

Hereinafter, the present invention will be described by way of illustrative examples. However, the present invention is not limited thereto. The abbreviation used in the examples refer to the following:

GC: gas chromatography
HPLC: high performance liquid chromatography
TLC: thin layer chromatography
IR: infrared absorption spectrum
Mass: mass spectrum
b.p.: boiling point
m.p.: melting point
Y: yield

EXAMPLE 1

A polymerizable compound represented by Chemical Formula (IV) was synthesized.

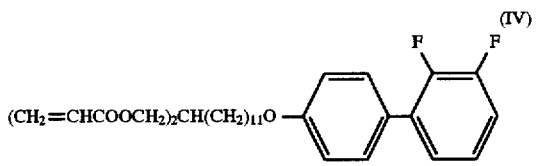

Hereinafter, the synthesis procedure will be described.
(a) Synthesis of a compound represented by the following formula:

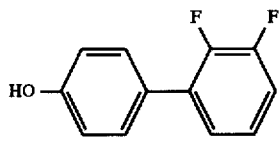

First, 34.6 g of 4-bromphenol, 37.9 g of 2,3-difluorophenylboronic acid, 380 ml of dimethoxyethane, 380 ml of water, 97.8 g of cesium carbonate, and 7 g of tetrakis(triphenylphosphine)palladium were placed in a 1 L flask. The mixture was stirred under reflux for 20 hours. The reaction mixture was poured into water and an organic layer was extracted with ether. The ether layer was washed with water and dried over anhydrous sodium sulfate. Thereafter, the solvent was distilled away. The residue was purified by silica gel column chromatography (eluent: toluene/ethyl acetate=9/1) and recrvstallized from hexane to obtain 30.9 g of 2,3-difluoro-4'-hydroxybiphenyl (Y: 75%). The compound thus obtained had a purity of 99.8% by GC and an m.p. of 132° C. to 134.4° C.

(b) Synthesis of a compound represented by the following formula:

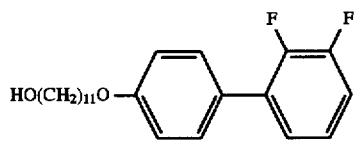

First, 5.0 g of 2,3-difluoro-4'-hydroxybiphenyl, 7.3 g of 11-bromo-1-undecanol, 6.7 g of potassium carbonate, and 150 ml of methyl ethyl ketone were placed in a 200 ml flask. The mixture was stirred under reflux for 20 hours. The reaction mixture was poured into water and an organic layer was extracted with toluene. The toluene layer was washed with water and dried over anhydrous sodium sulfate. Thereafter, the solvent was distilled away. The residue was recrystallized from acetone to obtain 8 g of 2,3-difluoro-4'-(11-hydroxyundecyl)oxybiphenyl (Y: 88%). The compound thus obtained had a purity of 98.8% by GC.

(c) Synthesis of a compound represented by the following formula:

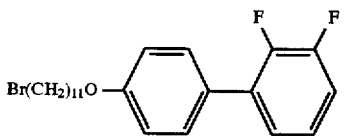

First, 8 g of 2,3-difluoro-4'-(11-hydroxyundecyl) oxybiphenyl and 100 ml of carbon tetrachloride were placed in a 200 ml flask. A solution in which 2.3 g of phosphorus tribromide was dissolved in 50 ml of carbon tetrachloride was added dropwise to the reaction mixture under ice water cooling, and the resultant reaction mixture was stirred at room temperature for 3 hours and under reflux for 2 hours. The reaction mixture was poured into water, and an organic layer was extracted with ether. The ether layer was washed with water and dried over anhydrous sodium sulfate. Thereafter, the solvent was distilled away. The residue was purified by silica gel column chromatography (eluent: toluene/hexane=1/9) and recrystallized from hexane to obtain 4.5 g of 2,3-difluoro-4'-(11-bromoundecyl) oxybiphenyl (Y: 47.8%). The compound thus obtained had a purity of 95.3% by GC.

(d) Synthesis of a compound represented by the following formula:

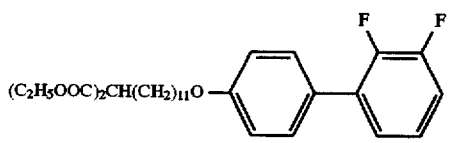

First, 0.62 g of sodium ethoxide, 1.5 g of diethyl malonate, and 50 ml of dry ethanol were placed in a 100 ml flask whose content was replaced with argon. Then, 20 ml of tetrahydrofuran solution in which 4 g of 2,3-difluoro-4'-(11-bromoundecyl)oxybiphenyl was dissolved was added dropwise to the reaction mixture, and the resultant reaction mixture was stirred under reflux for 8 hours. The reaction mixture was poured into diluted hydrochloric acid, and an organic layer was extracted with ether. The ether layer was washed with water and dried over anhydrous sodium sulfate. Thereafter, the solvent was distilled away. The residue was purified by silica gel column chromatography (eluent: toluene) to obtain 4 g of 2,3-difluoro-4'-[12,12-bis (ethoxycarbonyl)dodecyl]oxybiphenyl (Y: 84.7%). The compound thus obtained had a purity of 99.8% by GC.

(e) Synthesis of a compound represented by the following formula:

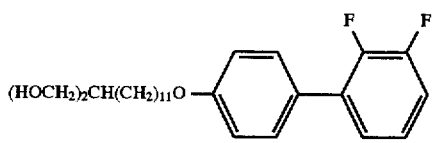

First, 1.7 g of lithium borohydride and 20 ml of tetrahydrofuran were placed in a 100 ml flask. Then, 60 ml of tetrahydrofuran solution in which 4 g of 2,3-difluoro-4'-[12, 12-bis(ethoxycarbonyl)dodecyl]oxybiphenyl was dissolved was added dropwise to the reaction mixture, and the resultant reaction mixture was stirred under reflux for 18 hours. The reaction mixture was poured into cold diluted hydrochloric acid, and an organic layer was extracted with ether. The ether layer was washed with water and dried over anhydrous sodium sulfate. Thereafter, the solvent was distilled away. The residue was purified by silica gel column chromatography (eluent: ethyl acetate/toluene=8/2) and recrystallized from acetone to obtain 2.4 g of 2,3-difluoro-4'-[12,12-bis(hydroxymethyl)dodecyl]oxybiphenyl (Y: 71.6%). The compound thus obtained had a purity of 99.6% by HPLC.

(f) Synthesis of a compound represented by Formula (IV):

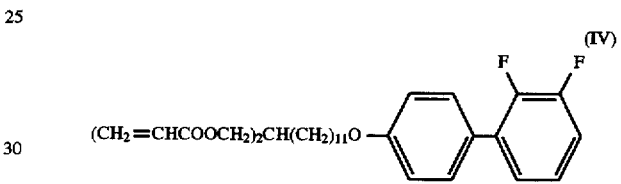

First, 2.4 g of 2,3-difluoro-4'-[12,12-bis(hydroxymethyl) dodecyl]oxybiphenyl, 1.3 g of triethylamine, and 100 ml of tetrahydrofuran were placed in a 200 ml flask. Then, 15 ml of tetrahydrofuran solution in which 1.1 g of acryloyl chloride was dissolved was added dropwise to the reaction mixture under ice water cooling, and the resultant reaction mixture was allowed to warm to room temperature and stirred for 3 hours. The reaction mixture was poured into water, and an organic layer was extracted with ether. The ether layer was washed with diluted hydrochloric acid and water in this order, and then dried over anhydrous sodium sulfate. Thereafter, the solvent was distilled away. The residue was purified by silica gel column chromatography (eluent: toluene/ethyl acetate=20/1) and recrystallized from hexane to obtain 1.7 g of 2,3-difluoro-4'-[12,12-bis (acryloyloxymethyl)dodecyl]oxybiphenyl (Y: 57%). The compound thus obtained had a purity of 99.6% by GC, 100% by HPLC, and 1 spot by TLC. The compound thus obtained had an m.p. of 33.4° C. to 34.4° C.

It was confirmed, from the result of the IR measurement, the molecular ion peak of 542 by the Mass analysis, and the consideration of the materials used, that the resultant compound was one represented by Formula (IV).

EXAMPLE 2

A polymerizable compound represented by Formula (V) was synthesized.

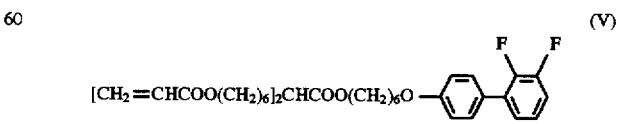

Hereinafter, the synthesis procedure will be described.

(a) Synthesis of a compound represented by the following formula:

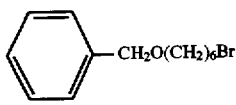

First, 2.4 g of 60% sodium hydride and 100 ml of dry tetrahydrofuran were placed in a 300 ml flask. Then, 15 ml of tetrahydrofuran solution in which 11.3 g of benzyl bromide was dissolved, 15 ml of tetrahydrofuran solution in which 10.9 g of 6-bromohexanol was dissolved, and 0.1 g of tetrabutylammonium iodide were added to the reaction mixture. The resultant reaction mixture was stirred under reflux for 3 hours. The reaction mixture was poured into water, and an organic layer was extracted with toluene. The toluene layer was washed with water and dried over anhydrous sodium sulfate. Thereafter, the solvent was distilled away. The residue was purified by silica gel column chromatography (eluent: toluene/hexane=1/3) and distilled under reduced pressure to obtain 8.6 g of 1-bromo-6-benzyloxyhexane (Y: 52.8%). The compound thus obtained had a purity of 97.9% by GC and a b.p. of 115° C. to 127° C./0.4 mmHg.

(b) Synthesis of a compound represented by the following formula:

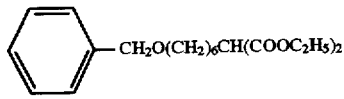

First, 2.7 g of sodium ethoxide and 100 ml of dry ethanol were placed in a 200 ml flask. Then, 20 ml of an ethanol solution containing 7 g of diethyl malonate was added dropwise to the reaction mixture at 60° C., and the resultant reaction mixture was stirred for 2 hours. Then, 20 ml of an ethanol solution containing 9 g of 1-bromo-6-benzyloxyhexane was added dropwise to the reaction mixture, and the resultant reaction mixture was stirred under reflux for 3 hours. The reaction mixture was poured into diluted hydrochloric acid, and an organic layer was extracted with ether. The ether layer was washed with water and dried over anhydrous sodium sulfate. Thereafter, the solvent was distilled away. The residue was purified by silica gel column chromatography (eluent: hexane/ethyl acetate=9/1) to obtain 11.5 g of diethyl 2-(6-benzyloxyhexyl)malonate (Y: 98%). The compound thus obtained had a purity of 86.3% by GC.

(c) Synthesis of a compound represented by the following formula:

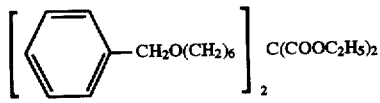

First, 1.5 g of 60% sodium hydride and 30 ml of dry dimethylformamide were placed in a 200 ml flask. Then, 30 ml of a dimethylformamide solution containing 11.5 g of diethyl 2-(6-benzyloxyhexyl)malonate was added dropwise to the reaction mixture under ice water cooling, and the resultant reaction mixture was stirred at room temperature for 1 hour and at 130° C. for 30 minutes. Then, 30 ml of a dimethylformamide solution containing 10 g of 1-bromo-6-benzyloxyhexane was added dropwise to the reaction mixture, and the resultant reaction mixture was stirred for 3 hours. The reaction mixture was poured into diluted hydrochloric acid, and an organic layer was extracted with ether. The ether layer was washed with water and dried over anhydrous sodium sulfate. Thereafter, the solvent was distilled away. The residue was purified by silica gel column chromatography (eluent: hexane/ethyl acetate=9/1) to obtain 14.8 g of diethyl 2,2-bis(6-benzyloxyhexyl)malonate (Y: 91.5%). The compound thus obtained had a purity of 94.7% by GC.

(d) Synthesis of a compound represented by the following formula:

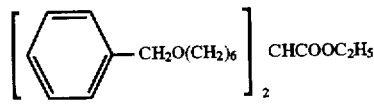

First, 14.8 g of diethyl 2,2-bis(6-benzyloxyhexyl) malonate, 0.5 g of water, 2.3 g of lithium chloride, and 50 ml of dimethyl sulfoxide were placed in a 100 ml flask. Then, the mixture was stirred at 180° C. for 12 hours. The reaction mixture was poured into water, and an organic layer was extracted with methylene chloride. The methylene chloride layer was washed with water and dried over anhydrous sodium sulfate. Thereafter, the solvent was distilled away. The residue was purified by silica gel column chromatography (eluent: hexane/ethyl acetate=9/1) to obtain 9.4 g of ethyl 2,2-bis(6-benzyloxyhexyl)acetate (Y: 72.9%). The compound thus obtained had a purity of 97.9% by GC.

(e) Synthesis of a compound represented by the following formula:

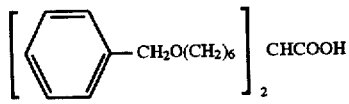

First, 12 g of ethyl 2,2-bis(6-benzyloxyhexyl)acetate, 250 ml of methanol, and 100 ml of an aqueous solution containing 16.8 g of 85% potassium hydroxide were placed in a 500 ml flask. Then, the mixture was stirred under reflux for 2 hours. The reaction mixture was poured into diluted hydrochloric acid, and an organic layer was extracted with ether. The ether layer was washed with water and dried over anhydrous sodium sulfate. Thereafter, the solvent was distilled away. The residue was recrystallized from a mixed solvent of hexane and acetone to obtain 6.2 g of 2,2-bis(6-benzyloxyhexyl)acetic acid (Y: 55%).

(f) Synthesis of a compound represented by the following formula:

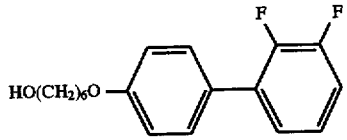

First, 5 g of 6-bromo-1-hexanol, 5.7 g of 2,3difluoro-4'-hydroxybiphenyl, 7.6 g of potassium carbonate, and 70 ml of methyl ethyl ketone were placed in a 100 ml flask. Then, the mixture was stirred under reflux for 20 hours. The reaction mixture was poured into water, and an organic layer was extracted with toluene. The toluene layer was washed with water and dried over anhydrous sodium sulfate. Thereafter, the solvent was distilled away. The residue was recrystallized from acetone to obtain 5.4 g of 2,3-difluoro-4'-(6-hydroxyhexyl)oxybiphenyl (Y: 63.5%). The compound thus obtained had a purity of 99.9% by GC.

(g) Synthesis of a compound represented by the following formula:

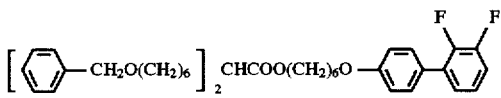

First, 2.47 g of 2,2-bis(6-benzyloxyhexyl)acetic acid, 1.85 g of 2,3-difluoro-4'-[6-hydroxyhexyl]oxybiphenyl, 1.6 g of triphenylphosphine, and 50 ml of tetrahyrofuran were placed in a 100 ml flask. Then, 1.1 g of diethyl azodicarboxylate was added dropwise to the reaction mixture at 5° C. Thereafter, the reaction mixture was allowed to warm to room temperature and stirred for 8 hours. The reaction mixture was concentrated, and the residue was purified by silica gel column chromatography (eluent: ethyl acetate/hexane=1/4) to obtain 4 g of 6-[2,3-difluorobiphenyl-4'-yl]oxyhexyl 2,2-bis(6-benzyloxyhexyl)acetate (Y: 97.8%). The compound thus obtained had a purity of 99% by HPLC.

(h) Synthesis of a compound represented by the following formula:

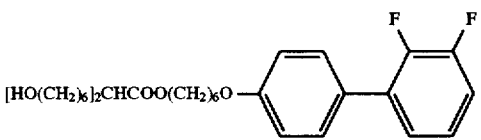

First, 4 g of 6-[2,3-difluorobiphenyl-4'-yl]oxyhexyl 2,2-bis(6-benzyloxyhexyl)acetate, 1.3 g of 10% Pd-C, and 150 ml of tetrahydrofuran were placed in a 300 ml autoclave. The mixture was stirred at room temperature for 2 days under a hydrogen pressure of 10 kg/cm$^2$. The catalyst was filtered away and a filtrate was concentrated. Thereafter, the residue was purified by silica gel column chromatography (eluent: toluene/ethyl acetate=2/3) to obtain 2.6 g of 6-[2,3-difluorobiphenyl-4'-yl]oxyhexyl 2,2-bis(6-hydroxyhexyl)acetate (Y: 90%). The compound thus obtained had a purity of 99.3% by HPLC.

(i) Synthesis of a compound represented by Formula (V):

First, 2.6 g of 6-[2,3-difluorobiphenyl-4'-yl]oxyhexyl 2,2-bis(6-hydroxyhexyl)acetate, 1.2 g of triethylamine, and 100 ml of tetrahydrofuran were placed in a 200 ml flask. Then, a small amount of tetrahydrofuran in which 1.1 g of acryloyl chloride was dissolved was added dropwise to the mixture under ice water cooling. The resultant mixture was allowed to warm to room temperature and stirred for 3 hours. The reaction mixture was poured into water, and an organic layer was extracted with ether. The ether layer was washed with diluted hydrochloric acid and water in this order, and then dried over anhydrous sodium sulfate. Thereafter, the solvent was distilled away. The residue was purified by silica gel column chromatography (eluent: ethyl acetate/toluene=1/9) to obtain 0.9 g of 6-[2,3difluorobiphenyl-4'-yl]oxyhexyl 2,2-bis(6-acryloyloxyhexyl)acetate (Y: 28%). The compound thus obtained was liquid at room temperature. The compound thus obtained had a purity of 99% by HPLC and of 1 spot by TLC.

It was confirmed, from the result of the IR measurement, the molecular ion peak of 656 by the Mass analysis, and the consideration of the materials used, that the resultant compound was one represented by Formula (V).

EXAMPLE 3

A polymerizable compound represented by Formula (VI) was synthesized.

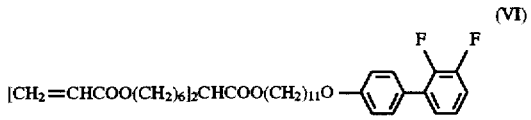

Hereinafter, the synthesis procedure will be described.

(a) Synthesis of a compound represented by the following formula:

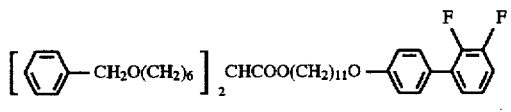

First, 3.0 g of 2,2-bis(6-benzyloxyhexyl)acetic acid, 2.8 g of 2,3-difluoro-4'-[11-hydroxyundecyl]oxybiphenyl, 2.2 g of triphenylphosphine, and 50 ml of tetrahydrofuran were placed in a 100 ml flask. Then, 1.4 g of diethyl azodicarboxylate was added dropwise to the mixture at 5° C. The resultant mixture was allowed to warm to room temperature and stirred for 8 hours. The reaction mixture was concentrated, and the residue was purified by silica gel column chromatography (eluent: ethyl acetate/hexane=1/9) to obtain 5 g of 11-[2,3-difluorobiphenyl-4'-yl]oxyundecyl 2,2-bis( 6-benzyloxyhexyl)acetate (Y: 92.6%). The compound thus obtained had a purity of 98% by HPLC.

(b) Synthesis of a compound represented by the following formula:

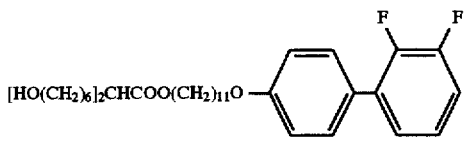

First, 4.9 g of 11-[2,3-difluorobiphenyl-4'-yl]oxyundecyl 2,2-bis(6-benzyloxyhexyl)acetate, 1.5 g of 10% Pd-C, and 100 ml of tetrahydrofuran were placed in a 300 ml autoclave. The mixture was stirred at room temperature for 2 days under a hydrogen pressure of 10 kg/cm$^2$. The catalyst was filtered away and a filtrate was concentrated. Thereafter, the residue was purified by silica gel column chromatography (eluent: toluene/ethyl acetate=7/3) to obtain 3.7 g of 11-[2,3-difluorobiphenyl-4'-yl]oxyundecyl 2,2-bis(6-hydroxyhexyl)acetate (Y: 97.5%). The compound thus obtained had a purity of 98% by HPLC.

(c) Synthesis of a compound represented by Formula (VI):

[CH₂=CHCOO(CH₂)₆]₂CHCOO(CH₂)₁₁O— 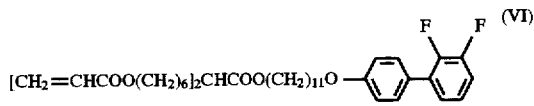 (VI)

First, 3.66 g of 11-[2,3-difluorobiphenyl-4'-yl]oxyundecyl 2,2-bis(6-hydroxyhexyl)acetate, 1.3 g of triethylamine, and 30 ml of benzene were placed in a 100 ml flask. Then, a small amount of benzene in which 1.2 g of acryloyl chloride was dissolved was added dropwise to the reaction mixture under ice water cooling. The resultant reaction mixture was allowed to warm to room temperature and stirred for 3 hours. The reaction mixture was poured into water, and an organic layer was extracted with ether. The ether layer was washed with diluted hydrochloric acid and water in this order, and then dried over anhydrous sodium sulfate. Thereafter, the solvent was distilled away. The residue was purified by silica gel column chromatography (eluent: ethyl acetate/toluene=1/20) to obtain 1.36 g of 11-[2,3difluorobiphenyl-4'-yl]oxyundecyl 2,2-bis(6-acryloyloxyhexyl)acetate (Y: 32%). The compound thus obtained was liquid at room temperature. The compound thus obtained had a purity of 99% by HPLC and of 1 spot by TLC.

It was confirmed, from the result of the IR measurement, the molecular ion peak of 726 by the Mass analysis, and the consideration of the materials used, that the resultant compound was one represented by Formula (VI).

EXAMPLE 4

A polymerizable compound represented by Formula (VII) was synthesized.

[CH₂=CHCOO(CH₂)₆]₂CHCOO(CH₂)₁₆O— 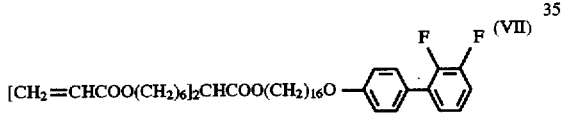 (VII)

Hereinafter, the synthesis procedure will be described.
(a) Synthesis of a compound represented by the following formula:

HO(CH₂)₁₆Br

First, 10 g of 1,16-hexadecanediol, 26 g of 48% hydrobromic acid, and 400 ml of toluene were placed in a 1 L flask. The reaction mixture was stirred under reflux for 48 hours while water in the system was removed. The reaction mixture was washed with water and dried over anhydrous sodium sulfate. Thereafter, the solvent was distilled away. The residue was purified by silica gel column chromatography (eluent: toluene/ethyl acetate=9/1) and recrystallized from hexane to obtain 5.7 g of 16-bromo-1-hexadecanol (Y: 46%). The compound thus obtained had a purity of 95% by GC.

(b) Synthesis of a compound represented by the following formula:

HO(CH₂)₁₆O— 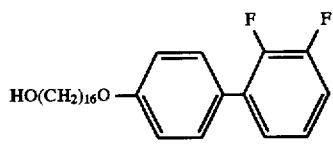

First, 3 g of 16-bromo-1-hexadecanol, 1.9 g of 2,3-difluoro-4'-hydroxybiphenyl, 2.6 g of potassium carbonate, and 50 ml of methyl ethyl ketone were placed in a 100 ml flask. The reaction mixture was stirred under reflux for 32 hours. The reaction mixture was poured into water, and an organic layer was extracted with ether. The ether layer was washed with water and dried over anhydrous sodium sulfate. Thereafter, the solvent was distilled away. The residue was recrystallized from acetone to obtain 3.5 g of 2,3-difluoro-4'-(16-hydroxyhexadecyl)oxybiphenyl (Y: 84%). The compound thus obtained had a purity of 97.4% by GC.

(c) Synthesis of a compound represented by the following formula:

[—CH₂O(CH₂)₆]₂CHCOO(CH₂)₁₆O— 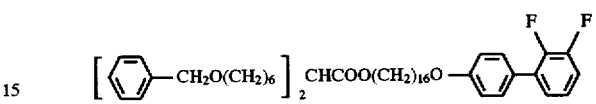

First, 3.4 g of 2,2-bis(6-benzyloxyhexyl)acetic acid, 3.3 g of 2,3-difluoro-4'-[16-hydroxyhexadecyl]oxybiphenyl, 2.3 g of triphenylphosphine, and 50 ml of tetrahyrofuran were placed in a 100 ml flask. Then, 1.5 g of diethyl azodicarboxylate was added dropwise to the reaction mixture at 5° C. Thereafter, the reaction mixture was allowed to warm to room temperature and stirred for 8 hours. The reaction mixture was concentrated, and the residue was purified by silica gel column chromatography (eluent: ethyl acetate/hexane=1/9) to obtain 5.9 g of 16-[2,3-difluorobiphenyl-4'-yl]oxyhexadecyl 2,2-bis(6-benzyloxyhexyl)acetate (Y: 92.1%). The compound thus obtained had a purity of 98.3% by HPLC.

(d) Synthesis of a compound represented by the following formula:

[HO(CH₂)₆]₂CHCOO(CH₂)₁₆O— 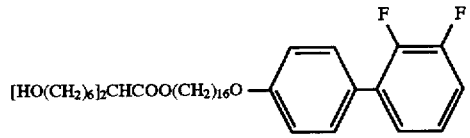

First, 5.8 g of 16-[2,3-difluorobiphenyl-4'-yl]oxyhexadecyl 2,2-bis(6-benzyloxyhexyl)acetate, 1.8 g of 10% Pd-C, and 100 ml of tetrahydrofuran were placed in a 300 ml autoclave. The mixture was stirred at room temperature for 2 days under a hydrogen pressure of 10 kg/cm². A catalyst was filtered away and a filtrate was concentrated. Thereafter, the residue was purified by silica gel column chromatography (eluent: toluene/ethyl acetate=7/3) to obtain 3.9 g of 16-[2,3-difluorobiphenyl-4'-yl]oxyhexadecyl 2,2-bis(6-hydroxyhexyl)acetate (Y: 85.5%). The compound thus obtained had a purity of 99.2% by HPLC and an m.p. of 45.2° C. to 48.8° C.

(e) Synthesis of a compound represented by Formula (VII):

[CH₂=CHCOO(CH₂)₆]₂CHCOO(CH₂)₁₆O— 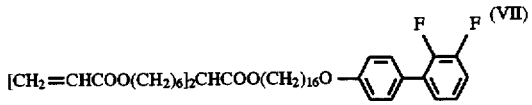 (VII)

First, 3.4 g of 16-[2,3-difluorobiphenyl-4'-yl]oxyhexadecyl 2,2-bis(6-hydroxyhexyl)acetate, 3 g of triphenylphosphine, 0.9 g of acrylic acid, and 30 ml of tetrahydrofuran were placed in a 100 ml flask. Then, 10 ml of a solution in which 2 g of ethyl azodicarboxylate was dissolved in tetrahydrofuran was added dropwise to the mixture under ice water cooling. The resultant mixture was allowed to warm to room temperature and stirred for 3 hours. The reaction mixture was concentrated. Thereafter, the residue was purified by silica gel column chromatography (eluent: ethyl acetate/toluene=1/20) and recrystallized from hexane to obtain 2.7 g of 16-[2,3-difluorobiphenyl-4'-yl]oxyhexadecyl 2,2-bis(6-acryloyloxyhexyl)acetate (Y: 59.7%). The compound thus obtained had a purity of 99% by HPLC and of 1 spot by TLC. The compound had an m.p. of 33.8° C. to 35.5° C.

It was confirmed, from the result of the IR measurement, the molecular ion peak of 796 by the Mass analysis, and the consideration of the materials used, that the resultant compound was one represented by Formula (VII).

EXAMPLE 5

A polymerizable compound represented by Formula (VIII) was synthesized.

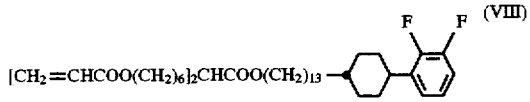

Hereinafter, the synthesis procedure will be described.

(a) Synthesis of a compound represented by the following formula:

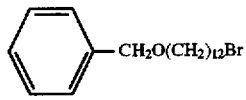

First, 2.4 g of 60% sodium hydride and 100 ml of dry tetrahydrofuran were placed in a 300 ml flask whose content was replaced with argon. Then, 15 ml of a tetrahydrofuran solution containing 11.3 g of benzyl bromide, 15 ml of a tetrahydrofuran solution containing 15.9 g of 12-bromododecanol, and 0.1 g of tetrabutylammonium iodide were added to the reaction mixture. The resultant reaction mixture was stirred under reflux for 2.5 hours. The reaction mixture was poured into water, and an organic layer was extracted with toluene. The toluene layer was washed with water and dried over anhydrous sodium sulfate. Thereafter, the solvent was distilled away. The residue was purified by silica gel column chromatography (eluent: toluene/hexane=1/3) to obtain 14.0 g of 1-bromo-12-benzyloxydodecane (Y: 65.7%). The compound thus obtained had a purity of 98.4% by GC.

(b) Synthesis of a compound represented by the following formula:

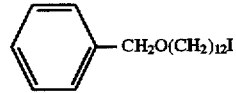

First, 12.4 g of 1-bromo-12-benzyloxydodecane, 6.3 g of sodium iodide, and 125 ml of acetone were placed in a 200 ml flask whose content was replaced with argon. Then, the mixture was stirred under reflux for 5 hours. An insoluble matter was filtered away and a filtrate was concentrated. Thereafter, ether was introduced into the residue. The ether layer was washed with water and dried over anhydrous sodium sulfate. Thereafter, the solvent was distilled away. The residue was purified by silica gel column chromatography (eluent: toluene/hexane=1/1) to obtain 14.7 g of 1-iodo-12-benzyloxydodecane (Y: 100%). The compound thus obtained had a purity of 96.1% by GC.

(c) Synthesis of a compound represented by the following formula:

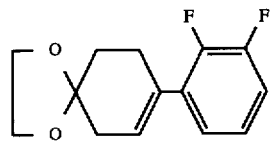

First, 18.3 g of 1,2-difluorobenzene and 150 ml of dry tetrahydrofuran were placed in a 500 ml Schlenk flask whose content was replaced with argon. Then, 102 ml of 1.6M butyllithium-hexane solution was added dropwise to the mixture at −60° C. to −70° C., and the resultant mixture was stirred at the same temperature for 3hours. Then, 80 ml of a tetrahydrofuran solution containing 25.0 g of 1,4-cyclohexanedione-monoethylene ketal was added dropwise to the mixture. The mixture was gradually heated to room temperature and stirred overnight.

Five percent diluted hydrochloric acid was added to the reaction solution so as to make the solution acidic. Thereafter, an organic layer was extracted with toluene. The toluene layer was washed with water and dried over anhydrous sodium sulfate. Thereafter, the solvent was distilled away. Then, 1 g of p-toluenesulfonic acid monohydrate and 300 ml of toluene were added to the residue. The mixture was stirred with heating for 9 hours while generated water was removed. The reaction mixture was washed with water and dried over anhydrous sodium sulfate. Thereafter, the solvent was distilled away to obtain 39.4 g of crude 4-(2, 3-difluorophenyl)-3-cyclohexenone ethylene ketal (Y: 71.8%). The compound thus obtained had a purity of 73.6% by GC.

(d) Synthesis of a compound represented by the following formula:

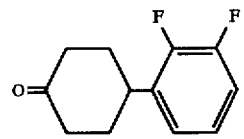

First, 39.4 g of 4-(2,3-difluorophenyl)-3-cyclohexenone ethylene ketal, 150 ml of ethyl acetate, and 1.0 g of 10% Pd-C were placed in a 500 ml autoclave. The mixture was stirred at room temperature for 43 hours under a hydrogen pressure of 10 kg/cm². A catalyst was filtered away and a filtrate was concentrated. Thereafter, 225 ml of 1,4-dioxane, 675 ml of water, and 1 g of p-toluenesulfonic acid monohydrate were added to the residue. The mixture was stirred under reflux for 2 hours. The reaction mixture was extracted with ether. The ether layer was washed with water and dried over anhydrous sodium sulfate. Thereafter, the solvent was distilled away. The residue was purified by silica gel column chromatography (eluent: toluene/hexane=19:1) and distilled under reduced pressure to obtain 17.5 g of 4-(2,3-difluorophenyl)cyclohexanone (Y: 72%). The compound thus obtained had a purity of 98.9% by GC and a b.p. of 125° C. to 128° C./0.6 mmHg.

(e) Synthesis of a compound represented by the following formula:

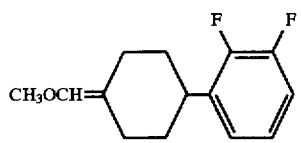

First, 27.4 g of (methoxymethyl)triphenylphosphonium chloride, 9 g of potassium t-butoxide, and 225 ml of dry ether were placed in a 500 ml flask whose content was replaced with argon. The mixture was stirred for 30 minutes under ice water cooling. Then, 50 ml of an ether solution containing 16.8 g of 4-(2,3-difluorophenyl)cyclohexanone was added dropwise to the reaction mixture. The reaction mixture was stirred under ice water cooling for 30 minutes and at room temperature for 8 hours. Thereafter, a precipitate was filtered out. A filtrate was washed with water and dried over anhydrous sodium sulfate. The solvent was distilled away. Thereafter, the residue was purified by silica gel column chromatography (eluent: toluene/hexane=1/4) to obtain 17.1 g of 1-(2,3-difluorophenyl)-4-methoxymethylene cyclohexane (Y: 89.7%). The compound thus obtained had a purity of 99.2% by GC.

(f) Synthesis of a compound represented by the following formula:

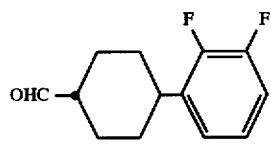

First, 17.1 g of 1-(2,3-difluorophenyl)-4-methoxymethylenecyclohexane, 19 ml of 3N hydrochloric acid, and 80 ml of tetrahydrofuran were placed in a 200 ml flask. The mixture was stirred under reflux for 30 minutes. The reaction mixture was poured into water, and an organic layer was extracted with ether. The ether layer was washed with water and dried over anhydrous sodium sulfate. Thereafter, the solvent was distilled away.

On the other hand, 1 g of potassium hydroxide and 170 ml of methanol were placed in another flask. Then, 85 ml of methanol in which the above residue was dissolved was added dropwise to the reaction mixture at 0° C. to 3° C. The resultant reaction mixture was stirred at 0° C. to 3° C. for 1 hour. Thereafter, the reaction mixture was poured into water, and an organic layer was extracted with ether. The ether layer was washed with water and dried over anhydrous sodium sulfate. Then, the solvent was distilled away to obtain 14.3 g of trans-4-(2,3-difluorophenyl) cyclohexanecarbaldehyde (Y: 88.9%). The compound thus obtained had a purity of 95% by GC.

(g) Synthesis of a compound represented by the following formula:

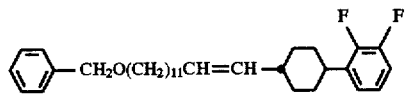

First, 14.7 g of 1-iodo-12-benzyloxydodecane obtained in (b), 9.2 g of triphenylphosphine, and 50 ml of toluene were placed in a 100 ml flask whose content was replaced with argon. The mixture was stirred under reflux for 30 hours. The solvent was distilled away under reduced pressure, and the content of the flask was replaced with argon again. Then, 70 ml of dry tetrahydrofuran was added to the mixture. Thereafter, 22.4 ml of 1.6M butyllithium-hexane solution was added dropwise to the resultant mixture under ice water cooling. The mixture was allowed to warm to room temperature and stirred for 40 minutes. Then, 35 ml of a tetrahydrofuran solution containing 7.85 g of trans- 4-(2,3-difluorophenyl)cyclohexanecarbaldehyde was added dropwise to the mixture under ice water cooling. The mixture was allowed to warm to room temperature and stirred overnight. Thereafter, an insoluble matter was filtered out, and a filtrate was diluted with methylene chloride. The methylene chloride layer was washed with water and dried over anhydrous sodium sulfate. Thereafter, the solvent was distilled away to obtain 11.9 g of 2,3-difluoro-1-|trans-4-{13-benzyloxy-1-tridecenyl}cyclohexyl]benzene (Y: 70.4%). The compound thus obtained had a purity of 96% (mixture of E and Z isomers) by GC.

(h) Synthesis of a compound represented by the following formula:

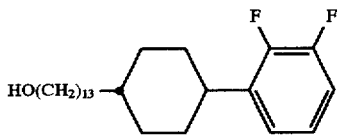

First, 10.9 g of 2,3-difluoro-1-[trans-4-{13-benzyloxy-1-tridecenyl}cyclohexyl]benzene, 1 g of 10% Pd-C, 50 ml of ethanol, and 50 ml of ethyl acetate were placed in a 500 ml autoclave. The mixture was stirred at room temperature for 5 days under a hydrogen pressure of 8 kg/cm$^2$. A catalyst was filtered away and a filtrate was concentrated. Thereafter, the residue was purified by silica gel column chromatography (eluent: toluene/ethyl acetate=4/1) and recrystallized from acetone to obtain 5.7 g of 2,3-difluoro-1-[trans-4-(13-hydroxytridecyl)cyclohexyl]benzene (Y: 64%). The compound thus obtained had a purity of 97.2% by GC and 99.8% by HPLC.

(i) Synthesis of a compound represented by the following formula:

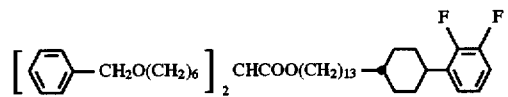

First, 3 g of 2,3-difluoro-1-|trans-4-(13-hydroxytridecyl) cyclohexyl]benzene, 3 g of 2,2-bis(6-benzyloxyhexyl)acetic acid, 2.2 g of triphenylphosphine, and 30 ml of tetrahydrofuran were placed in a 100 ml flask. Then, 1.5 g of ethyl azodicarboxylate was added dropwise to the reaction mixture under ice water cooling. The reaction mixture was allowed to warm to room temperature and stirred for 2 hours. The reaction mixture was concentrated, and the residue was purified by silica gel column chromatography (eluent: hexane/ethyl acetate=9/1) to obtain 5.4 g of 13-[trans-4-(2,3-difluorophenyl)cyclohexyl]tridecyl 2,2-bis(6-benzyloxyhexyl)acetate (Y: 97%). The compound thus obtained had a purity of 93.7% by HPLC.

(j) Synthesis of a compound represented by the following formula:

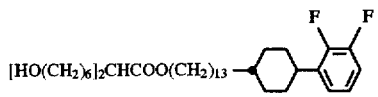

First, 5.3 g of 13-[trans-4-(2,3-difluorophenyl) cyclohexyl]tridecyl 2,2-bis(6-benzyloxyhexyl)acetate, 1.7 g of 10% Pd-C, and 100 ml of tetrahydrofuran were placed in a 300 ml autoclave. The mixture was stirred at room temperature for 2 days under a hydrogen pressure of 10 kg/cm$^2$. A catalyst was filtered away and a filtrate was concentrated. Thereafter, the residue was purified by silica gel column chromatography (eluent: toluene/ethyl acetate= 7/3) to obtain 4.1 g of 13-[trans-4-(2,3-difluorophenyl) cyclohexyl]tridecyl 2,2-bis(6-hydroxyhexyl)acetate (Y: 98%). The compound thus obtained had a purity of 99% by HPLC.

(k) Synthesis of a compound represented by Formula (VIII):

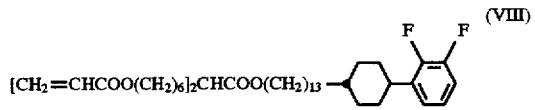

First, 2.8 g of 13-[trans-4-(2,3-difluorophenyl) cyclohexyl]tridecyl 2,2-bis(6-hydroxyhexyl)acetate, 1 g of triethylamine, and 30 ml of benzene were placed in a 100 ml flask. A small amount of benzene in which 0.9 g of acryloyl chloride was dissolved was added dropwise to the reaction mixture under ice water cooling. The reaction mixture was allowed to warm to room temperature and stirred for 3 hours. The reaction mixture was poured into water, and an organic layer was extracted with ether. The ether layer was washed with diluted hydrochloric acid and water in this order, and then dried over anhydrous sodium sulfate. The solvent was distilled away. The residue was purified by silica gel column chromatography (eluent: ethyl acetate/toluene= 1/20) to obtain 1.12 g of 13-[trans-4-(2,3-difluorophenyl) cyclohexyl]tridecyl 2,2-bis(6-acryloyloxyhexyl)acetate (Y: 33%). The compound thus obtained was liquid at room temperature. The compound had a purity of 99.6% by HPLC and of 1 spot by TLC.

It was confirmed, from the result of the IR measurement, the molecular ion peak of 744 by the Mass analysis, and the consideration of the materials used, that the resultant compound was one represented by Formula (VIII).

EXAMPLE 6

A polymerizable compound represented by Formula (IX) was synthesized.

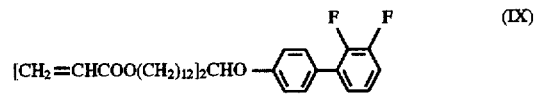

Hereinafter, the synthesis procedure will be described.

(a) Synthesis of a compound represented by the following formula:

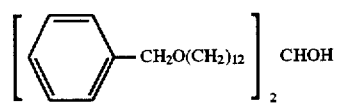

First, 2.6 g of magnesium, a small amount of iodine, and 70 ml of tetrahydrofuran were placed in a 300 ml flask. Then, 60 ml of a tetrahydrofuran solution containing 25.5 g of 1-bromo-12-benzyloxydodecane was added dropwise to the reaction mixture at 40° C. to 50° C. to prepare a Grignard reagent. The Grignard reagent was cooled to 5° C. Then, 20 ml of a tetrahydrofuran solution containing 2.1 g of methyl formate was added dropwise to the Grignard reagent. The mixture was stirred for 2 hours at room temperature and stirred for another 2 hours under reflux.

The reaction mixture was poured into diluted hydrochloric acid, and an organic layer was extracted with ether. The ether layer was washed with water and dried over anhydrous sodium sulfate. Thereafter, the solvent was distilled away. The residue was purified by silica gel column chromatography (eluent: toluene) and recrystallized from acetone to obtain 6.25 g of bis(12-benzyloxydodecyl)methanol (Y: 30.7%). The compound thus obtained had a purity of 94.7% by HPLC.

(b) Synthesis of a compound represented by the following formula:

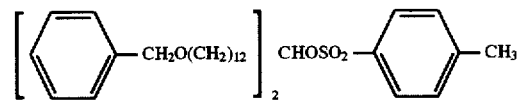

First, 3 g of bis(12-benzyloxydodecyl)methanol and 20 ml of pyridine were placed in a 100 ml flask. Then, 1.15 g of p-toluenesulfonylchloride was added to the reaction mixture. The reaction mixture was stirred at room temperature for 3 days. The reaction mixture was diluted with ether. The diluted mixture was washed with diluted hydrochloric acid, aqueous sodium bicarbonate, and water in this order, and then dried over anhydrous sodium sulfate. The solvent was distilled away, and the residue was recrystallized from acetone to obtain 1.6 g of bis(12-benzyloxydodecyl)methyl p-toluenesulfonate (Y: 42%). The compound thus obtained had a purity of 98.5% by HPLC.

(c) Synthesis of a compound represented by the following formula:

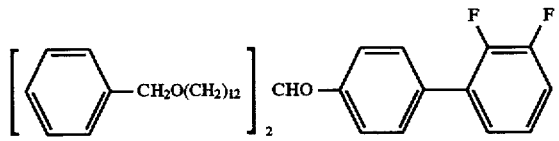

First, 0.1 g of 60% sodium hydride and 20 ml of dimethylformamide were placed in a 100 ml flask. Then, 5 ml of a dimethylformamide solution containing 0.42 g of 2,3-difluoro-4'-hydroxybiphenyl was added dropwise to the reaction mixture under ice water cooling. The resultant reaction mixture was stirred for a while. Then, 1.5 g of bis(12-benzyloxydodecyl)methyl p-toluenesulfonate was added to the reaction mixture. The mixture was stirred under reflux for 12 hours. Thereafter, the reaction mixture was poured into water, and an organic layer was extracted with ether. The ether layer was washed with water and dried over anhydrous sodium sulfate. The solvent was distilled away. The residue was purified by silica gel column chromatography (eluent: hexane/ethyl acetate=20/1) to obtain 0.45 g of 2,3-difluoro-4'-bis(12-benzyloxydodecyl)methoxybiphenyl (Y: 29%). The compound thus obtained had a purity of 98.7% by HPLC.

(d) Synthesis of a compound represented by the following formula:

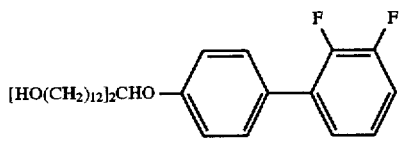

First, 0.39 g of 2,3-difluoro-4 1-bis(12-benzyloxydodecyl) methoxybiphenyl, 0.5 g of 10% Pd-C, and 30 ml of tetrahydrofuran were placed in a 100 ml autoclave. The mixture was stirred at room temperature for 3 days under a hydrogen pressure of 10 kg/cm$^2$. A catalyst was filtered away and a filtrate was concentrated. Thereafter, the residue was purified by silica gel column chromatography (eluent: toluene/ethyl acetate=1/1) to obtain 0.23 g of 2,3-difluoro-4'-bis(12-hydroxydodecyl)methoxybiphenyl (Y: 77%). The compound thus obtained had a purity of 100% by HPLC.

(e) Synthesis of a compound represented by Formula (IX):

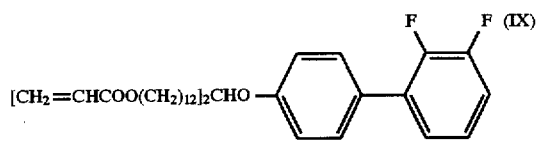

First, 0.23 g of 2,3-difluoro-4 1-bis(12-hydroxydodecyl) methoxybiphenyl, 0.06 g of acrylic acid, 0.26 g of triphenylphosphine, and 20 ml of tetrahydrofuran were placed in a 50 ml flask. Then, 0.17 g of ethyl azodicarboxylate was added dropwise to the reaction mixture under ice water cooling. The reaction mixture was allowed to warm to room temperature and stirred for 2 hours. The reaction mixture was concentrated, and the residue was purified by silica gel column chromatography (eluent: toluene/ethyl acetate=20/1) to obtain 0.14 g of 2,3-difluoro-4'-bis(12-acryloyloxydodecyl)methoxybiphenyl (Y: 51.4%). The compound thus obtained was liquid at room temperature. The compound had a purity of 99% by HPLC and 1 spot by TLC.

It was confirmed, from the result of the IR measurement, the molecular ion peak of 696 by the Mass analysis, and the consideration of the materials used, that the resultant compound was represented one by Formula (IX).

EXAMPLE 7

A polymerizable compound represented by Formula (X) was synthesized.

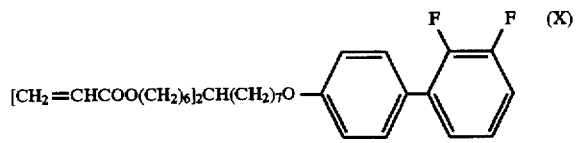

Hereinafter, the synthesis procedure will be described.

(a) Synthesis of a compound represented by the following formula:

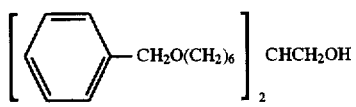

First, 0.44 g of lithium aluminium hydride and 50 ml of diethyl ether were placed in a 100 ml flask. Then, 5.4 g of ethyl 2,2-bis(6-benzyloxyhexyl)acetate obtained in Example 2-(d) was added dropwise to the reaction mixture under ice water cooling. The reaction mixture was stirred for 1 hour at room temperature and for 1 hour under reflux. The reaction mixture was poured into cold diluted hydrochloric acid. An ether layer was washed with water and dried over anhydrous sodium sulfate. Thereafter, the solvent was distilled away. The residue was purified by silica gel column chromatography (eluent: toluene/ethyl acetate=4/1) to obtain 4.7 g of 2,2-bis(6-benzyloxyhexyl)ethanol (Y: 96%). The compound thus obtained had a purity of 97.1% by GC.

(b) Synthesis of a compound represented by the following formula:

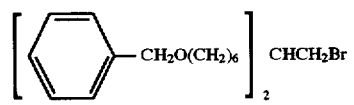

First, 13.8 g of 2,2-bis(6-benzyloxyhexyl)ethanol, 10.2 g of triphenylphosphine, and 50 ml of methylene chloride were placed in a 200 ml flask. Then, 50 ml of a methylene chloride solution containing 16.1 g of carbon tetrabromide was added dropwise to the reaction mixture at room temperature, and the reaction mixture was stirred for 1 hour. The reaction mixture was washed with an aqueous solution of sodium bicarbonate and water in this order. The resultant reaction mixture was dried over anhydrous sodium sulfate. Thereafter, the solvent was distilled away. The residue was purified by silica gel column chromatography (eluent: toluene) to obtain 11 g of 2,2-bis(6-benzyloxyhexyl)ethyl bromide (Y: 69%). The compound thus obtained had a purity of 97.5% by GC.

(c) Synthesis of a compound represented by the following formula:

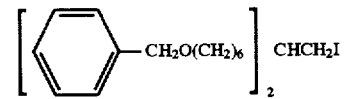

First, 6 g of 2,2-bis(6-benzyloxyhexyl)ethyl bromide, 2.19 g of sodium iodide, and 150 ml of 2-butanone were placed in a 300 ml flask. The mixture was stirred under reflux for 16 hours. The reaction mixture was poured into water, and an organic layer was extracted with ether. The ether layer was washed with water and dried over anhydrous sodium sulfate. The solvent was distilled away. The residue was purified by silica gel column chromatography (eluent: toluene) to obtain 6 g of 2,2-bis(6-benzyloxyhexyl)ethyl iodide (Y: 91.2%). The compound thus obtained had a purity of 95.3% by HPLC.

(d) Synthesis of a compound represented by the following formula:

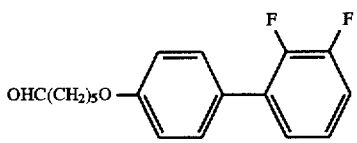

First, 6.4 g of pyridinium chlorochromate, 0.48 g of sodium acetate, and 10 ml of methylene chloride were placed in a 200 ml flask. Then, 50 ml of a methylene chloride solution containing 6 g of 2,3-difluoro-4'-(6-hydroxyhexyl)oxybiphenyl obtained in Example 2-(f) was added dropwise to the reaction mixture. The reaction mixture was stirred for 18 hours. The reaction mixture was concentrated. The residue was purified by silica gel column chromatography (eluent: toluene) and recrystallized from a mixed solvent of hexane and acetone to obtain 2.56 g of 2,3-difluoro-4'-(5-formylpentyl)oxybiphenyl (Y: 42.9%). The compound thus obtained had a purity of 95.1% by GC.

(e) Synthesis of a compound represented by the following formula:

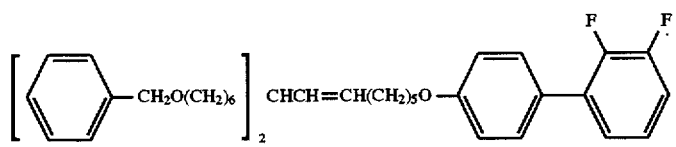

First, 4.3 g of 2,2-bis(6-benzyloxyhexyl)ethyl iodide, 2.1 g of triphenylphosphine, and 50 ml of toluene were placed in a 100 ml flask. The mixture was stirred under reflux for 36 hours. Thereafter, toluene was distilled away to obtain a phosphonium salt. Then, 30 ml of tetrahydrofuran was added to the phosphonium salt so as to dissolve it. Thereafter, 20 ml of a tetrahydrofuran solution containing 1.93 g of 2,3-difluoro-4'-(5-formylpentyl)oxybiphenyl and then 1 g of potassium t-butoxide were added to the solution under ice water cooling. The resultant solution was stirred at the same temperature for 4 hours and at room temperature for 24 hours. The reaction mixture was poured into water, and an organic layer was extracted with ether. The ether layer was washed with water and dried over anhydrous sodium sulfate. Thereafter, the solvent was distilled away. The residue was purified by silica gel column chromatography (eluent: toluene/hexane=9/1) to obtain 3.3 g of 2,3-difluoro-4'-[8,8-bis(6-benzyloxyhexyl)-6-octene-1-yl]oxybiphenyl (Y: 74.5%). The compound thus obtained had a purity of 98.9% by HPLC.

(f) Synthesis of a compound represented by the following formula:

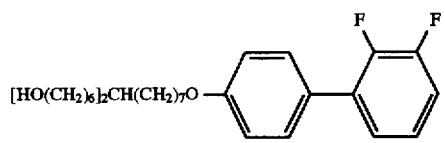

First, 3.3 g of 2,3-difluoro-4'-[8,8-bis(6-benzyloxyhexyl)-6-octene-1-yl]oxybiphenyl, 1 g of 10% Pd-C, and 100 ml of tetrahydrofuran were placed in a 200 ml autoclave. The mixture was stirred at room temperature for 2 days under a hydrogen pressure of 10 kg/cm$^2$. A catalyst was filtered away and a filtrate was concentrated. Thereafter, the residue was purified by silica gel column chromatography (eluent: toluene/ethyl acetate=3/2) to obtain 2.3 g of 2,3-difluoro-4'-[8,8-bis(6-hydroxyhexyl)octyl]oxybiphenyl (Y: 93.6%). The compound thus obtained had a purity of 98.8% by HPLC.

(g) Synthesis of a compound represented by Formula (X):

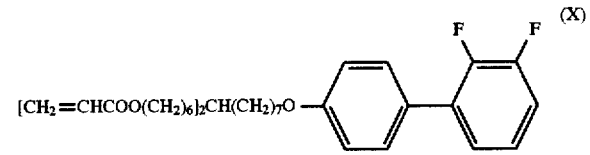

First, 2.3 g of 2,3-difluoro-4'-[8,8-bis(6-hydroxyhexyl)octyl]oxybiphenyl, 0.8 g of acrylic acid, 2.9 g of triphenylphosphine, and 50 ml of tetrahydrofuran were placed in a 100 ml flask. Then, 1.93 g of ethyl azodicarboxylate was added dropwise to the reaction mixture under ice water cooling. Thereafter, the reaction mixture was allowed to warm to room temperature and stirred for 2 hours. The reaction mixture was concentrated, and the residue was purified by silica gel column chromatography (eluent: benzene) to obtain 1.31 g of 2,3-difluoro-4'-[8,8-bis(6-acryloyloxyhexyl)octyl]oxybiphenyl (Y: 47.1%). The compound thus obtained was liquid at room temperature. The compound had a purity of 99.5% by HPLC and 1 spot by TLC.

It was, confirmed, from the result of the IR measurement, the molecular ion peak of 627 (CI method) by the Mass analysis, and the consideration of the materials used, that the resultant compound was one represented by Formula (X).

EXAMPLE 8

A liquid crystal display device using the polymerizable compound of the present invention was produced by mask pattern exposition. Hereinafter, a method for producing the device will be described.

Figure 21:
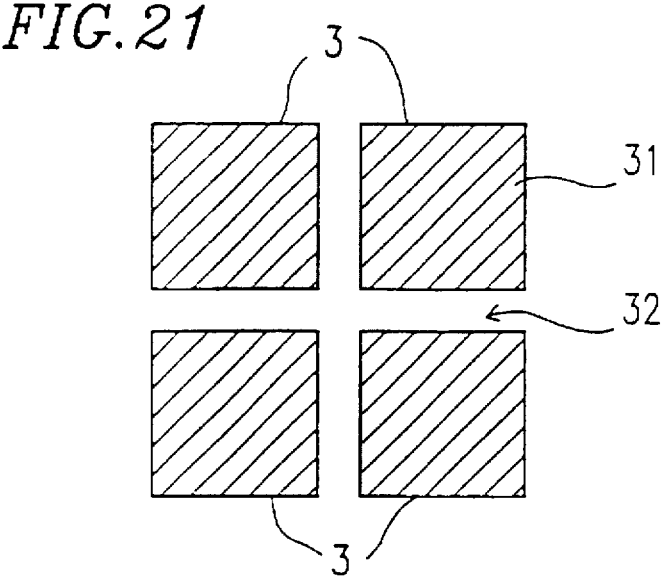
FIG. 21 is a schematic view of a photomask used in an example of the present invention.

First, two glass substrates (thickness: 1.1 mm) each having a transparent electrode made of ITO (mixture of indium oxide and zinc oxide; thickness: 50 nm) were placed so as to oppose each other. Spacers with an average particle size of 5 μm were placed between the substrates to produce a cell with a predetermined cell thickness. A photomask 3 having a light-shading portion 31 and a light-transmitting portion 32 as shown in FIG. 21 was placed on one surface of the cell in such a manner that the light-shading portions 31 correspond to pixels.

A mixture was prepared by homogeneously mixing the following substances: a resin composition (which forms a polymer (wall)) containing 0.65 g of isobornyl acrylate, 0.25 g of 1,4-butanediol diacrylate, 0.15 g of p-phenylstyrene, 0.15 g of a polymerizable compound D shown in Table 2; 12.0 g of a liquid crystal composition MLC-6419 (produced by Merck KGaA; Δn=+0.0977, n$_o$=1.4802, with a chiral agent added thereto so as to have d/p=0.25); and 0.04 g of a photopolymerization initiator (Irgacure 651). Thereafter, the mixture was injected into the cell by capillary-action to obtain a liquid crystal cell.

TABLE 2

Polymerizable compounds used in Examples 8 through 11

| Compound D | Example No. |
|---|---|
| [CH$_2$=CHCOO(CH$_2$)$_6$]$_2$CHCOO(CH$_2$)$_{11}$O—⟨Ph⟩—⟨Ph(F,F)⟩ | 8 |
| [CH$_2$=CHCOO(CH$_2$)$_6$]$_2$CHCOO(CH$_2$)$_{13}$—⟨Cy⟩—⟨Ph(F,F)⟩ | 9 |
| [CH$_2$=CHCOO(CH$_2$)$_6$]$_2$CH(CH$_2$)$_7$O—⟨Ph⟩—⟨Ph(F,F)⟩ | 10 |
| [CH$_2$=CHCOO(CH$_2$)$_6$]$_2$CHCOO(CH$_2$)$_{16}$O—⟨Ph⟩—⟨Ph(F,F)⟩ | 11 |

Thereafter, the cell was irradiated with UV light (parallel light) through the photomask by using a highpressure mercury lamp (8 mW/cm$^2$) at 80° C. for 8 minutes under the application of a voltage of ±3 volts between the transparent electrodes. Thus, UV-light was radiated onto the cell in a pattern having spatial regularity.

Then, the liquid crystal cell was cooled to 25° C. (at which liquid crystal exhibits a nematic state) at a rate of 10° C./hr under the application of a voltage. The cell was further irradiated with UV light continuously for 3 minutes so as to cure the resin composition.

Figure 22:
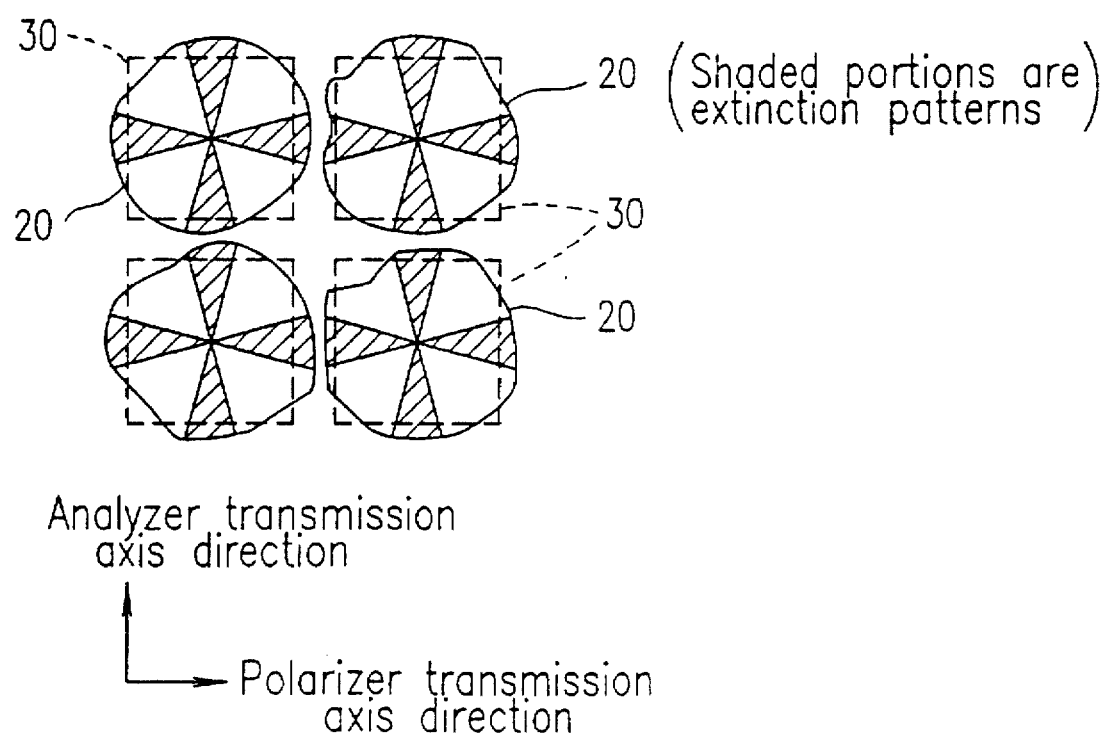
FIG. 22 is a schematic view showing the result obtained by observing a liquid crystal cell of a liquid crystal display device according to the present invention by a polarizing microscope.

The liquid crystal cell in which the resin composition had been cured was observed with a polarizing microscope. As shown in FIG. 22, liquid crystal regions 20 almost reflecting the shape of the light-shading portions of the photomask were formed, and liquid crystal molecules were axis-symmetrically aligned in the liquid crystal regions 20.

Polarizing plates were attached to the liquid crystal cell so as to interpose it in such a manner that optical axes were orthogonal to each other. Thus, a liquid crystal display device was produced.

The electrooptical characteristics of the liquid crystal display device were evaluated by using a liquid crystal characteristics evaluating system LCD-5000 (produced by Ohtsuka Electronics Inc.). More specifically, the above-mentioned glass substrates were attached to each other, and polarizing plates were placed in parallel Nicols so as to interpose the substrates. This cell was used as a reference. The voltage-transmittance characteristic and the response time of the liquid crystal cell were measured. Here, the response time was evaluated by the sum $\tau_r+\tau_d$ (ms), where $\tau_r$ (ms) is a rising response time and $\tau_d$ (ms) is a falling response time. The rising response time is defined as a time amount required for the light transmittance to vary by 90% from the initial transmittance when a voltage of 10 V is applied. The falling response time is defined as a time amount required for the light transmittance to vary by 90% from a transmittance corresponding to a state displaying a black image after the application of a voltage was stopped. The steepness of the driving characteristics was evaluated as an absolute value a of a ratio $V_{90}/V_{10}$, where $V_{90}$ and $V_{10}$ are defined as voltages that cause a 90% change and a 10% change, respectively, in the light transmittance with respect to the entire range of change of light transmittance.

The measurement results of the electrooptical characteristics are shown in Table 3 together with the results of Examples 9, 12 through 15, and Comparative Examples 1 through 4.

Furthermore, the characteristics of the polymerizable compound were evaluated by a glass transition temperature and a heating storage test of a liquid crystal display device. The evaluation results are shown in Table 3. The specific procedure of the measurement is as follows: Tg of a polymer film was defined as a temperature providing the maximum value of a ratio tan $\delta(=E''/E')$; loss tangent) of E' (storage modulus of elasticity) and E" (loss modulus of elasticity) at a measurement frequency of 1 Hz, by using a viscoelastic spectrometer (produced by Seiko Instruments Inc.; DMS210) in a tensile mode (tension module). Furthermore, the lower limit temperature, at which alignment defects are caused, was obtained by the 100-hour heating storage test of the liquid crystal display device. The relationship between the lower limit temperature and Tg was studied.

TABLE 3

Evaluation results of characteristics of liquid crystal device

| | Example 8 | Example 9 | Example 12 | Example 13 | Example 14 | Example 15 | Comparative example 1 | Comparative example 2 | Comparative example 3 | Comparative example 4 |
|---|---|---|---|---|---|---|---|---|---|---|
| Light transmittance (%) under application of no voltage | 69 | 68 | 73 | 74 | 76 | 73 | 94 | 31 | 64 | 66 |

TABLE 3-continued

Evaluation results of characteristics of liquid crystal device

|  | Example 8 | Example 9 | Example 12 | Example 13 | Example 14 | Example 15 | Comparative example 1 | Comparative example 2 | Comparative example 3 | Comparative example 4 |
|---|---|---|---|---|---|---|---|---|---|---|
| Light transmittance (%) under application of voltage of 10 volts | 0.3 | 0.4 | 0.3 | 0.3 | 0.3 | 0.3 | ≦0.1 | 2.5 | 0.7 | 0.8 |
| Inversion phenomenon in gray-scale display | ○ | ○ | ○ | ○ | ○ | ○ | X | Δ | ○ | ○ |
| Saturated voltage $V_{90}$ (V) | 4.4 | 4.3 | 4.2 | 3.9 | 4.0 | 4.1 | 2.9 | 7.0 | 5.2 | 5.3 |
| Response time (10 volts; ms) | 82 | 89 | 73 | 69 | 68 | 75 | 42 | 380 | 132 | 125 |
| Steepness α | 1.8 | 1.7 | 1.7 | 1.5 | 1.6 | 1.7 | 1.2 | 4.0 | 2.0 | 2.2 |
| Tg of film (°C.) | 92 | 85 | 110 | 104 | 112 | 106 | — | 50 | 63 | 72 |
| Heat-resistance upper limit temperature of liquid crystal alignment (°C.) | 80 | 74 | 85 | 83 | 86 | 85 | — | 58 | 60 | 67 |

○: Substantially no inversion phenomenon observed
Δ: Barely observable inversion phenomenon
X: Easily observable inversion phenomenon In the liquid crystal display device of the present example, disclination lines were not observed.

EXAMPLE 9

A liquid crystal display device was produced in the same way as in Example 8, except that the compound shown in Table 2 was used as the polymerizable compound D. The electrooptical characteristics of the device were evaluated. The results are shown in Table 3. Disclination lines were not observed.

EXAMPLE 10

A liquid crystal display device was produced in the same way as in Example 8, except that the compound shown in Table 2 was used as the polymerizable compound D. Disclination lines were not observed.

EXAMPLE 11

A liquid crystal display device was produced in the same way as in Example 8, except that the compound shown in Table 2 was used as the polymerizable compound D. Disclination lines were not observed.

EXAMPLE 12

A liquid crystal display device using the polymerizable compound of the present invention was produced by insulator pattern exposition. Hereinafter, a method for producing the device will be described.

Figure 24A:
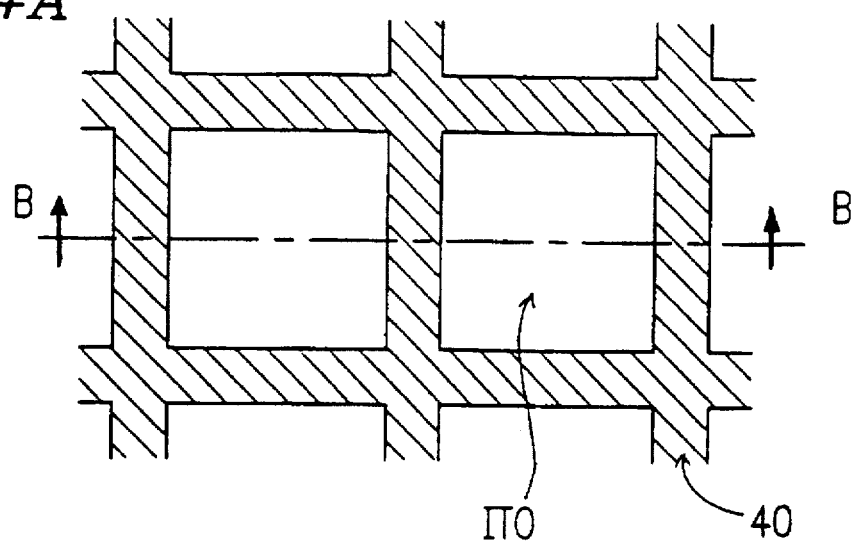
FIG. 24A is a schematic view of a substrate of the liquid crystal display device according to the present invention with a patterning film formed thereon.
Figure 24B:
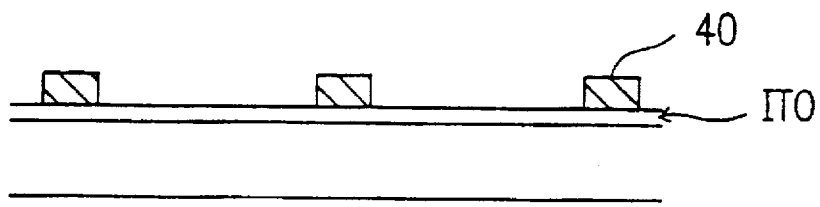
FIG. 24B is a cross-sectional view of the substrate taken along a line B–B' in FIG. 24A.
Figure 27A:
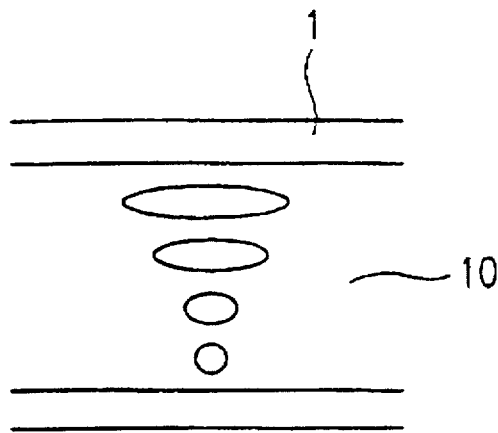
FIGS. 27A through 27C are schematic views illustrating the changes in contrast depending upon the viewing angle of a conventional TN-mode liquid crystal display device.
Figure 27B:
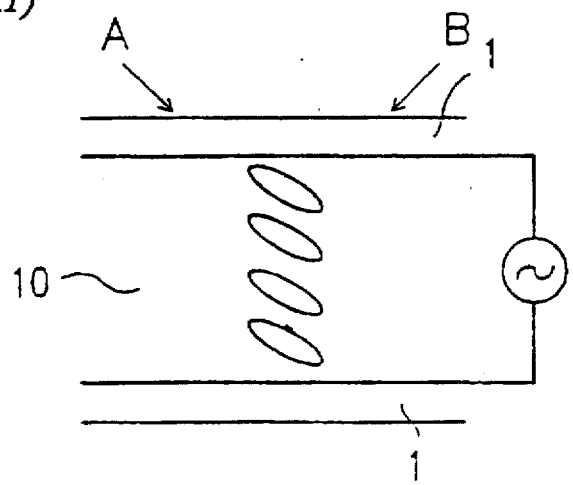
Figure 27C:
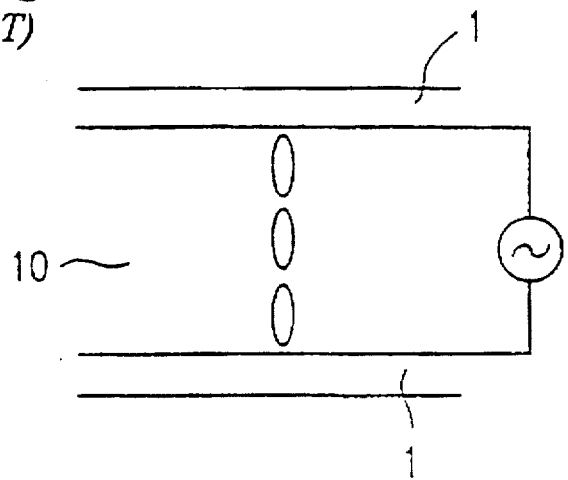
Figure 28A:
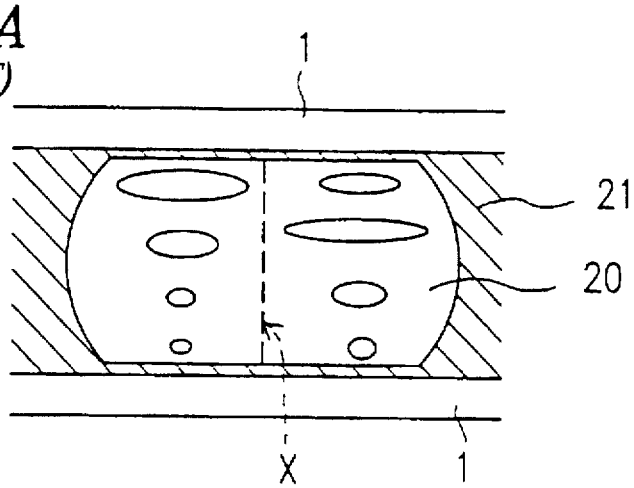
FIGS. 28A through 28C are schematic views illustrating the changes in contrast depending upon the viewing angle of a conventional liquid crystal display device of a wide viewing angle mode.
Figure 28B:
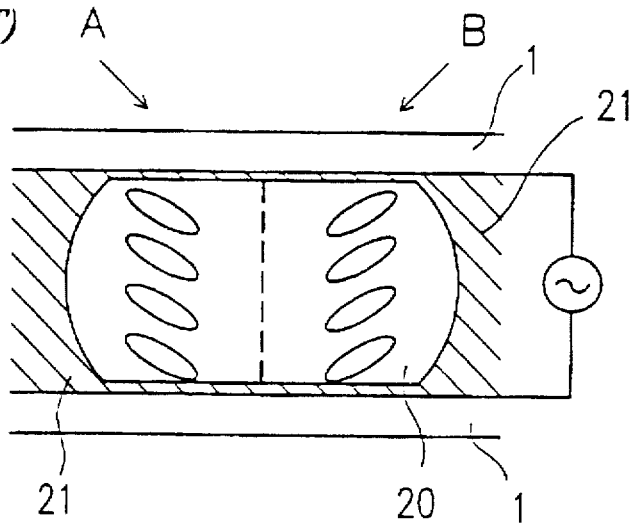
Figure 28C:
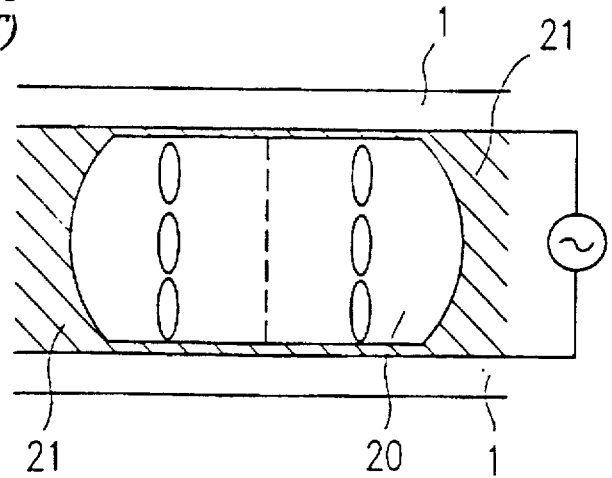

First and second glass substrates (thickness: 1.1 mm) each having a transparent electrode made of ITO (thickness: 50 nm) were used. A patterning film 40 of an insulating material as shown in FIGS. 24A and 24B was formed on the first substrate, using a predetermined resist material (produced by Tokyo Ohka Kogyo Co., Ltd.; OMR83). More specifically, the patterning film 40 was formed by the steps of: coating of a resist material, baking, light exposure using the photomask 3 shown in FIG. 21, development, rinsing, and baking. The patterning film 40 was formed so as to correspond to non-pixel portions. On the other hand, a polyimide insulating film AL4552 (produced by Japan Synthetic Rubber Co., Ltd.) was applied onto the second substrate (a rubbing treatment was not conducted). The first and second substrates thus obtained were placed so as to oppose each other. Spacers with a diameter of 5 μm were placed between the substrates, whereby a cell with a predetermined thickness was obtained. Then, a mixture was prepared by homogeneously mixing the following substances: a resin composition (which forms a polymer (wall)) containing 0.6 g of isobornyl acrylate, 0.3 g of neopentyl diacrylate, 0.15 g of p-methylstyrene, 0.15 g of the polymerizable compound E shown in Table 4; 12.0 g of a liquid crystal composition MLC-6419 (produced by Merck KGaA; Δn=+0.0977, $n_o$=1.4802; a chiral agent S-811 was added so as to have d/p=0.25); and 0.04 g of photopolymerization initiator Irgacure 651. The mixture was vacuum-injected into the cell under reduced pressure. Thus, a liquid crystal cell was produced.

TABLE 4

Polymerizable compounds used in Examples 12 through 15

| Compound E | Example No. |
|---|---|
| [CH$_2$=CHCOOCH$_2$]$_2$CH(CH$_2$)$_{11}$O—⟨phenyl⟩—⟨phenyl-F,F⟩ | 12 |
| [CH$_2$=CHCOO(CH$_2$)$_6$]$_2$CHCOO(CH$_2$)$_6$O—⟨phenyl⟩—⟨phenyl-F,F⟩ | 13 |
| [CH$_2$=CHCOO(CH$_2$)$_{12}$]$_2$CHO—⟨phenyl⟩—⟨phenyl-F,F⟩ | 14 |

TABLE 4-continued

Polymerizable compounds used in Examples 12 through 15

| Compound E | Example No. |
|---|---|
| [CH$_2$=CHCOO(CH$_2$)$_6$]$_2$CH(CH$_2$)$_7$O—〈benzene〉—〈difluorobenzene with F, F〉 | 15 |

Thereafter, the liquid crystal cell was kept at 90° C., and an effective voltage of 2.5 volts was applied between the transparent electrodes at 60 Hz. Under this condition, the cell was irradiated with UV light through the first substrate by a high-pressure mercury lamp at 6 mW/cm$^2$ for 8 minutes, whereby the resin composition was cured.

Then, the liquid crystal cell was cooled down to 40° C. over 5 hours under the application of a voltage. The liquid crystal cell was allowed to cool to room temperature (25° C.), and the cell was irradiated with UV light using the same UV-light irradiating apparatus. Thus, curing of the resin composition was accelerated.

The liquid crystal cell in which the resin composition was cured was observed with a polarizing microscope. The result is schematically shown in FIG. 25. As is apparent from FIG. 25, a polymer was formed in portions where the patterning film of the resist was formed (i.e., non-pixel portions), and a liquid crystal region 20 was formed in each compartment of the ITO region. The liquid crystal region 20 was in a mono-domain state, in which liquid crystal molecules were axis-symmetrically aligned. The proof for this was that, when the liquid crystal display device with the above-mentioned two polarizing plates was rotated, only the polymer walls surrounding the liquid crystal regions 20 were observed to be rotating while the position of the schlieren pattern (light extinction pattern) of the liquid crystal regions 20 appeared stationary.

Polarizing plates were attached to the substrates in such a manner that optical axes were perpendicular to each other, whereby a liquid crystal display device having a liquid crystal region surrounded by a polymer wall was produced.

In the liquid crystal display device of the present example, an inversion phenomenon as seen in a TN-mode liquid crystal display device (Comparative Example 1, described later) not using the polymerizable compound of the present invention was not observed. Furthermore, the transmittance did not increase at higher viewing angle when a saturation voltage was applied. Roughness was not observed in a gray-scale display.

EXAMPLE 13

A liquid crystal display device was produced in the same way as in Example 12, except that the compound shown in Table 4 was used as the polymerizable compound E. The electrooptical characteristics of the device were evaluated. The result is shown in Table 3.

Figure 23:
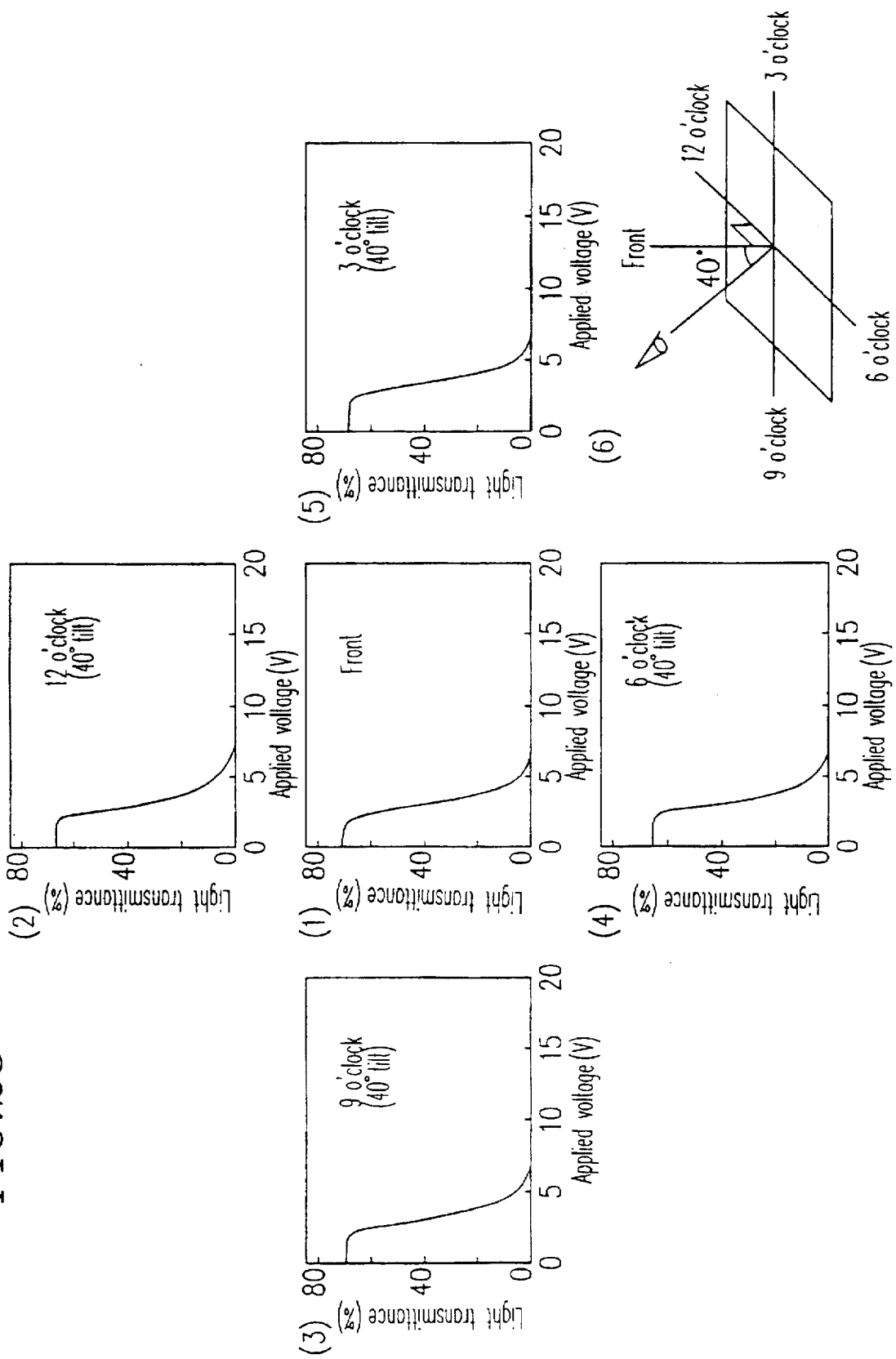
FIG. 23 shows graphs and a schematic view illustrating the electrooptical characteristics and viewing angle characteristics of a liquid crystal display device according to the present invention.

The voltage-transmittance characteristic of the liquid crystal display device thus obtained is shown in FIG. 23. This characteristic was almost the same as those of the liquid crystal display devices obtained in other examples.

Furthermore, in the liquid crystal display device of the present example, an inversion phenomenon as seen in a TN-mode liquid crystal display device (Comparative Example 1, described later) not using the polymerizable compound of the present invention was not observed. Furthermore, the transmittance did not increase at higher viewing angle when a saturation voltage was applied. Roughness was not observed in a gray-scale display.

EXAMPLE 14

A liquid crystal display device was produced in the same way as in Example 12, except that the compound shown in Table 4 was used as the polymerizable compound E. The electrooptical characteristics of the device were evaluated. The result is shown in Table 3.

In the liquid crystal display device of the present example, an inversion phenomenon as seen in a TN-mode liquid crystal display device (Comparative Example 1, described later) not using the polymerizable compound of the present invention was not observed. Furthermore, the transmittance did not increase at higher viewing angle when a saturation voltage was applied. Roughness was not observed in a gray-scale display.

EXAMPLE 15

A liquid crystal display device was produced in the same way as in Example 12, except that the compound shown in Table 4 was used as the polymerizable compound E. The electrooptical characteristics of the device were evaluated. The result is shown in Table 3.

In the liquid crystal display device of the present example, an inversion phenomenon as seen in a TN-mode liquid crystal display device (Comparative Example 1, described later) not using the polymerizable compound of the present invention was not observed. Furthermore, the transmittance did not increase at higher viewing angle when a saturation voltage was applied. Roughness was not observed in a gray-scale display.

EXAMPLE 16

A TN-mode liquid crystal display device was produced by using the polymerizable compound of the present invention. Hereinafter, a method for producing the device will be described.

A polyimide alignment film (produced by Japan Synthetic Rubber Co., Ltd.; AL4552) was applied onto a glass substrate (thickness: 1.1 mm) having a transparent electrode made of ITO (thickness: 50 nm) by a spin coating method. The polyimide alignment film was subjected to a predetermined rubbing treatment with a nylon cloth. Two substrates thus obtained were attached to each other with LCD spacers with an average particle size of 5 μm interposed therebetween, in such a manner that the rubbing directions of the substrates were perpendicular to each other.

A photomask shown in FIG. 21 was placed on the substrates thus attached to each other. A resin composition similar to that of Example 13, a liquid crystal material ZLI-4792 (produced by Merck KGaA; Δn=0.094), and a photopolymerization initiator Irgacure 651 were mixed in the same ratio as that of Example 13. The mixture was capillary-injected between the substrates. Then, a liquid crystal cell having a liquid crystal region surrounded by a polymer was produced in the same manner as that of Example 8.

Polarizing plates were attached to the liquid crystal cell in such a manner that polarizing axes were identical with the rubbing directions, whereby a TN-mode liquid crystal display device was obtained.

In the liquid crystal display device of the present example, liquid crystal molecules were in a TN alignment having a uniform alignment state. In this device, the changes in display characteristics were not recognized even when the display screen was pushed with a pen or the like. More specifically, since the liquid crystal regions were surrounded by the polymers, it was confirmed that the pressure resistance of the device remarkably improved, compared with the conventional TN-mode liquid crystal display device (Comparative Example 1, described later).

EXAMPLE 17

An STN-mode liquid crystal display device was produced by using the polymerizable compound of the present invention. Hereinafter, a method for producing the device will be described.

A polyimide alignment film (produced by Nissan Chemical Industries, Ltd.; Sunever) was applied onto a glass substrate (thickness: 1.1 mm) having a transparent electrode made of ITO (thickness: 50 nm) by a spin coating method. The polyimide alignment film was subjected to a predetermined rubbing treatment with a nylon cloth. Two substrates thus obtained were attached to each other with LCD spacers having an average particle size of 9 μm interposed therebetween, in such a manner that the rubbing directions of the substrates formed an angle of 240°.

A photomask shown in FIG. 21 was placed on the substrates thus attached to each other. A resin composition similar to that of Example 13, a liquid crystal material ZLI-4427 (produced by Merck KGaA), and a photopolymerization initiator Irgacure 651 were mixed in the same ratio as that of Example 13. The mixture was capillary-injected between the substrates. Then, a liquid crystal cell having a liquid crystal region surrounded by a polymer was produced in the same manner as that of Example 8.

Polarizing plates were attached to the liquid crystal cell in such a manner that polarizing axes thereof constituted 45° with their corresponding rubbing directions and constituted 105° with each other, whereby an STN-mode liquid crystal display device was obtained.

In the liquid crystal display device of the present example, liquid crystal molecules were in an STN alignment having a uniform alignment state. In this device, the changes in display characteristics were not recognized even when the display screen was pushed with a pen or the like. More specifically, since the liquid crystal regions were surrounded by the polymers, it was confirmed that the pressure resistance of the device remarkably improved, compared with the conventional STN-mode liquid crystal display device.

EXAMPLE 18

An SSFLC-mode liquid crystal display device was produced by using the polymerizable compound of the present invention. Hereinafter, a method for producing the device will be described.

A polyimide alignment film (produced by Nissan Chemical Industries, Ltd.; Sunever) was applied onto a glass substrate (thickness: 1.1 mm) having a transparent electrode made of ITO (thickness: 50 nm) by a spin coating method. The polyimide alignment film was subjected to a predetermined rubbing treatment with a nylon cloth. Two substrates thus obtained were attached to each other with LCD spacers having an average particle size of 2 μm interposed therebetween, in such a manner that the rubbing directions of the substrates were perpendicular to each other.

A photomask shown in FIG. 21 was placed on the substrates thus attached to each other. Then, 0.005 g of polyethylene glycol diacrylate (produced by Shin-Nakamura Chemical Co., Ltd.; NK ESTER A-200), 0.13 g of lauryl acrylate, 0.01 g of styrene, and 0.05 g of the compound E of Example 13 as a resin composition; 0.80 g of ZLI-4003 (produced by Merck KGaA) as a liquid crystal material, and 0.005 g of a photopolymerization initiator Irgacure 651 were homogeneously mixed. The mixture was vacuum-injected between the substrates under reduced pressure while heating. Then, a liquid crystal cell having a liquid crystal region surrounded by a polymer was produced in the same manner as that of Example 8.

Polarizing plates were attached to the liquid crystal cell in such a manner that polarizing axes thereof constituted 90° with each other, whereby an FLC-mode (SSF-type alignment) liquid crystal display device was obtained.

In the liquid crystal display device of the present example, liquid crystal molecules were in an SSFLC alignment having a uniform alignment state. In this device, the changes in display characteristics were not recognized even when the display screen was pushed with a pen or the like. Furthermore, alignment disturbance due to an external force was not recognized, which was a problem of a conventional FLC-mode liquid crystal display device. More specifically, since the liquid crystal regions were surrounded by the polymers, it was confirmed that the pressure resistance of the device remarkably improved, compared with conventional FLC-mode liquid crystal display devices.

Comparative Example 1

A conventional TN-mode liquid crystal display device was produced.

In the same way as in Example 8, two substrates each having a transparent electrode were attached to each other. A liquid crystal material MLC-6419 (produced by Merck KGaA; with a chiral agent S-811 added thereto so as to have d/p=0.25) similar to that of Example 8 was injected between the substrates to produce a liquid crystal cell. Polarizing plates were attached to the cell so as to interpose it, in such a manner that polarizing axes were perpendicular to each other. Thus, a conventional TN-mode liquid crystal display device was produced.

In the same way as in Example 8, the electrooptical characteristics of the liquid crystal display device thus obtained were evaluated. The evaluation results are shown in Table 3. The viewing angle characteristics of the device are shown in FIG. 26.

Comparative Example 2

In the same way as in Example 8, two substrates each having a transparent electrode were attached to each other to obtain a cell. A photomask 3 having a light-shading portion 31 and a light-transmitting portion 32 as shown in FIG. 21 was placed on one surface of the cell in such a manner that each light-shading portion 31 corresponded to each pixel. Then, 0.65 g of stearyl acrylate, 0.25 g of 1,4-butanediol diacrylate, 0.10 g of p-phenylstyrene, 10 g of a liquid crystal material MLC-6419 (produced by Merck KGaA; with a chiral agent S-811 added thereto so as to have d/p=0.25), and 0.03 g of photopolymerization initiator Irgacure 651 were homogeneously mixed. The mixture was capillary-injected into the cell to produce a liquid crystal cell. Then, a liquid crystal cell having a liquid crystal region surrounded by a polymer was produced in the same manner as in Example 12.

Polarizing plates were attached to the liquid crystal cell in crossed Nicols, whereby a liquid crystal display device was produced. In the same way as in Example 8, the electrooptical characteristics of the liquid crystal display device thus obtained were evaluated. The evaluation results are shown in Table 3.

In the liquid crystal display device of Comparative Example 2, liquid crystal was not sufficiently phase-separated from a polymer, and some resin material was recognized to be present in a liquid crystal region. Furthermore, display characteristics were not satisfactory due to the generation of disclination lines under the application of a voltage. The light transmittance under the application of a voltage of 10 volts was 2.0%. This value was higher than those of the liquid crystal display devices of Examples 8 through 16. The generation of the disclination lines seemed to cause this problem.

Comparative Example 3

A liquid crystal display device was produced in the same way as in Example 12, except that a homogeneous mixture containing the following substances was used: 0.6 g of isobornyl acrylate, 0.3 g of neopentyl diacrylate, 0.15 g of p-methylstyrene, 0.15 g of a polymerizable compound Z shown in Table 5 as a resin composition; 12 g of a liquid crystal composition MLC-6419 (produced by Merck KGaA; with a chiral agent S-811 added thereto so as to have d/p=0.25); and 0.04 g of photopolymerization initiator Irgacure 651. In the same way as in Example 8, the electrooptical characteristics of the liquid crystal display device thus obtained were evaluated. The evaluation results are shown in Table 3.

TABLE 5

| Polymerizable compounds used in Comparative Examples 3 and 4 | | Comparative example No. |
|---|---|---|
| Compound Z | $Z^1$ | |
| $CH_2=CHCOO-Z^1$ |  | 3 |
| | 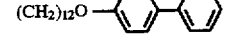 | 4 |

Comparative Example 4

A liquid crystal display device was produced in the same way as in Comparative Example 3, except that the compound shown in Table 5 was used as the polymerizable compound Z. In the same way as in Example 8, the electrooptical characteristics of the liquid crystal display device were evaluated. The evaluation results are shown in Table 3.

The liquid crystal display devices produced in Comparative Examples 3 and 4 were observed with a polarizing microscope. As a result, it was found that the addition of a polymerizable compound having within its molecule a liquid crystal type structure in a molecule suppressed the generation of disclination lines under the application of a voltage. Because of this, the light transmittance under the application of a voltage of 10 volts was about 0.7%, which was a relatively satisfactory display in a black state.

As described above, the liquid crystal display devices of Comparative Examples 3 and 4 exhibited relatively satisfactory characteristics. However, when the liquid crystal display devices of Comparative Examples 3 and 4 were compared with those of Examples of the present invention, the liquid crystal display device of the present invention was recognized to have more outstanding characteristics. This will be described in detail below.

First, the heat-resistance upper limit temperature of the liquid crystal alignment of the polyfunctional polymerizable compound according to the present invention is higher than that of the linear monofunctional compound of Comparative Examples 3 and 4 by about 15° C. to 20° C. It is understood that the heat resistance of the liquid crystal display device of the present invention is remarkably enhanced by using the polymerizable compound in which a branched polymerizable functional group is introduced. As is apparent from Table 3, the following tendency is recognized from the relationship between the glass transition temperature (Tg) and the lower limit temperature at which the alignment defects are caused. More specifically, it is recognized that as the number of atoms in the above-mentioned linking group gets smaller, Tg and the heat resistance temperature increase. (The lower limit temperature was obtained by subjecting the liquid crystal display device to a heating storage test for 100 hours.) Furthermore, the transition temperature of the liquid crystal region of the liquid crystal display device was evaluated with a polarizing microscope. For example, the transition temperature was 83° C. in Example 12 and 68° C. in Comparative Example 3. It was confirmed from this result that when the polymerizable compound of the present invention was used, the transition temperature of the liquid crystal region was very close to the transition temperature (i.e., 87° C.) obtained by using only a liquid crystal material. This shows that the polyfunctional compound of the present invention has more outstanding reactivity than the linear monofunctional compounds of Comparative Examples 3 and 4. Thus, the polyfunctional compound of the present invention is more excellent in terms of display characteristics.

Furthermore, the liquid crystal display device using the polyfunctional compound of the present invention is almost equal to that using the linear monofunctional compounds of Comparative Examples 3 and 4 in terms of the electrooptical characteristics and display characteristics.

As described above, it was confirmed that the liquid crystal display device using the polymerizable compound of the present invention does not allow disclination lines to be generated. Furthermore, the device has less deterioration of response time and voltage-transmittance characteristics, brightness under no application of a voltage, a high contrast, outstanding strength and heat resistance.

As is apparent from the above description, the polymerizable compound of the present invention is a polyfunctional compound having within its molecule a liquid crystal type structure and a branched polymerizable functional group. The polyfunctional compound of the present invention is likely to form a three-dimensional network structure and has outstanding reactivity. Thus, the polyfunctional compound of the present invention possesses the property of the conventional monofunctional "polymerizable compound having within its molecule a liquid crystal type structure". In addition, the compound of the present invention can realize the feature of the polyfunctional compound that the characteristics of the liquid crystal display device are prevented from decreasing due to an unreacted compound and the glass transition temperature (Tg) of a polymer improves. Therefore, the polymerizable compound of the present invention is very effective in terms of the display characteristics of the liquid crystal display device (e.g., pressure resistance, shock resistance) and heat resistance. In particular, in the liquid crystal display device produced by using a liquid crystal-polymer composite, the storage heat resistance temperature and operating temperature region of the device remarkably improve. Therefore, the polymerizable compound of the present invention is very effective in terms of the reliability of the heat resistance of the liquid crystal display device. Furthermore, when the polymerizable compound of the present invention is used for the liquid crystal display device, the generation of disclination lines is prevented under the application of a voltage. Thus, in the liquid crystal display device, a display with a high contrast can be realized.

The polymerizable compound of the present invention improves the phase separation between liquid crystal and a resin material in the course of the production of a liquid crystal display device; in this manner, the polymerizable compound prevents the resin material from being present in the liquid crystal material and decreases the anchoring between the polymer and the liquid crystal molecules. Thus, the polymerizable compound of the present invention is effective for the stabilization of the alignment of the liquid crystal molecules.

Furthermore, by using the polymerizable compound of the present invention for the liquid crystal display device, the deterioration of response time, threshold characteristics or steepness of the voltage-transmittance characteristics are remarkably improved. More specifically, the use of the polymerizable compound of the present invention improves the display characteristics of the liquid crystal display device. Such a liquid crystal display device has the following features: (1) Since the liquid crystal molecules are axis-symmetrically aligned, the viewing angle characteristics are satisfactory. Polymer walls are present in the cell, so that shock resistance is outstanding. In particular, the liquid crystal display device can be widely applied to a large screen display, a pen-input type liquid crystal display device, etc. (2) In the liquid crystal display device in which the alignment regulation force on the substrates can be exerted in the liquid crystal regions, the alignment state is made uniform and pressure resistance against external pressure such as a pen input improves.

As described above, the liquid crystal display device of the present invention includes a polymerizable compound having an effect of improving the alignment regulation force of liquid crystal molecules. Therefore, the axis-symmetrical alignment state of the liquid crystal molecules in the liquid crystal regions become more outstanding than conventional liquid crystal display device. Thus, the liquid crystal display device of the present invention has improved viewing angle characteristics and a high display quality. Furthermore, the liquid crystal display device has outstanding heat resistance. Such a liquid crystal display device can be preferably used for a display utilizing large viewing angle characteristics (e.g., a personal computer, a word processor, a liquid crystal TV, a display panel for car navigation).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polymerizable compound represented by Formula (I):

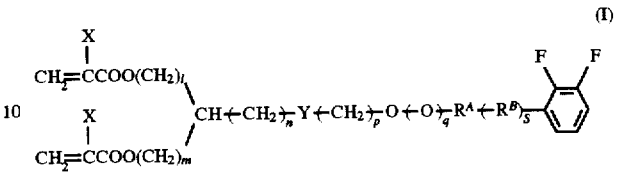

where X is a hydrogen atom or a methyl group; l and m are independently an integer of 0 to 14; Y is a single bond, —COO—, —OCO—, or —O—; n and p are independently an integer of 0 to 18; q and s are independently an integer of 0 or 1; and $R^A$ and $R^B$ are independently represented by Formula (II) or (III);

provided that, when q=1, p≧2; and when $R^A$ is represented by the Formula (II), $R^B$ is represented by the Formula (II).

2. A polymerizable compound according to claim 1, wherein (n+p)≦18 in Formula (I).

3. A polymerizable compound according to claim 1, wherein (n+p)≦18 and s=0 in Formula (I).

4. A polymerizable compound according to claim 1, wherein (n+p)≦18 and s=1 in Formula (I).

5. A liquid crystal display device comprising: a pair of substrates; and a liquid crystal layer interposed between the substrates including a polymer and a liquid crystal region surrounded by the polymer,
wherein the polymer is made from a polymerization precursor containing at least the polymerizable compound of claim 1.

6. A liquid crystal display device according to claim 5, wherein liquid crystal molecules in the liquid crystal region are axis-symmetrically, radially or concentrically, spirally, or randomly aligned.

7. A liquid crystal display device according to claim 5, comprising an insulating film regulating an alignment state of the liquid crystal molecules on the substrate.

8. A liquid crystal display device according to claim 5, further comprising an insulating alignment film for realizing a uniaxially uniform alignment state of the liquid crystal molecules so as to correspond to the liquid crystal region, on the substrate,
wherein the alignment state of the liquid crystal region and an entire structure of the device are arranged so as to be suitable for TN, STN, ECB, and SSFLC modes.

* * * * *